(12) United States Patent
Rowlette et al.

(10) Patent No.: US 11,803,044 B2
(45) Date of Patent: Oct. 31, 2023

(54) LOW-NOISE SPECTROSCOPIC IMAGING SYSTEM WITH STEERABLE SUBSTANTIALLY COHERENT ILLUMINATION

(71) Applicant: DAYLIGHT SOLUTIONS, INC., San Diego, CA (US)

(72) Inventors: Jeremy A. Rowlette, Escondido, CA (US); Miles James Weida, Poway, CA (US); Edeline Fotheringham, San Diego, CA (US); Justin Kane, San Diego, CA (US); Rudy Bermudez, San Diego, CA (US); William Chapman, San Diego, CA (US)

(73) Assignee: Daylight Solutions, Inc., San Diego, CA (US)

( * ) Notice: Subject to any disclaimer, the term of this patent is extended or adjusted under 35 U.S.C. 154(b) by 129 days.

(21) Appl. No.: 17/543,372

(22) Filed: Dec. 6, 2021

(65) Prior Publication Data
US 2022/0091403 A1  Mar. 24, 2022

Related U.S. Application Data

(63) Continuation-in-part of application No. 17/021,263, filed on Sep. 15, 2020, now Pat. No. 11,194,143,
(Continued)

(51) Int. Cl.
*G02B 21/36* (2006.01)
*G02B 21/00* (2006.01)
(Continued)

(52) U.S. Cl.
CPC ..... *G02B 21/0064* (2013.01); *G02B 21/0032* (2013.01); *G02B 21/0056* (2013.01);
(Continued)

(58) Field of Classification Search
None
See application file for complete search history.

(56) References Cited

U.S. PATENT DOCUMENTS 3,488,118 A  1/1970 Parrent
4,310,852 A  1/1982 Tricoles
(Continued)

FOREIGN PATENT DOCUMENTS

WO  WO-2012150590 A1 * 11/2012 ........... G08B 13/184
WO  WO2013063316 A1  5/2013
(Continued)

OTHER PUBLICATIONS

Chow, J et al., "Laser frequency-noise-limited ultrahigh resolution remote fiber sensing", Opt. Express vol. 14, No. 11, May 29, 2006, [online], [retrieved on Mar. 25, 2014]. Retrieved from the Internet: <URL: https://digitalcollections.anu.edu.au/bitstream/10440/381/1/Chow_Laser2006.pdf>;p. 4621.
(Continued)

*Primary Examiner* — Tyler W. Sullivan
(74) *Attorney, Agent, or Firm* — ROEDER & BRODER LLP; Steven G. Roeder

(57) ABSTRACT

A spectral imaging device (1312) for capturing one or more, two-dimensional, spectral images (1313A) of a sample (1310) including (i) an image sensor (1328), (ii) an illumination source (1314), (iii) a beam path adjuster (1362), and (iv) a control system (1330). The illumination source (1314) that generates an illumination beam (1316) that is directed along an incident sample beam path (1360) at the sample (1310). The beam path adjuster (1362) selectively adjusts the incident sample beam path (1360). The control system (1330) controls (i) the illumination source (1314) to generate the illumination beam during the first capture time, (ii) the image sensor (1328) during the first capture time to capture first information for the first spectral image (1313A), and
(Continued)

(iii) the beam path adjuster (1362) to selectively adjust the incident sample beam path (1360) relative to the sample (1310) during the first capture time while the image sensor (1328) is accumulating the information for the first spectral image (1313A).

20 Claims, 18 Drawing Sheets

Related U.S. Application Data which is a continuation of application No. 16/581,136, filed on Sep. 24, 2019, now Pat. No. 10,795,139, which is a continuation of application No. 15/680,019, filed on Aug. 17, 2017, now Pat. No. 10,437,032, which is a continuation of application No. 15/109,570, filed as application No. PCT/US2015/011884 on Jan. 18, 2015, now Pat. No. 9,784,958, application No. 17/543,372, filed on Dec. 6, 2021 is a continuation-in-part of application No. PCT/US2021/015229, filed on Jan. 27, 2021.

(60) Provisional application No. 61/929,050, filed on Jan. 18, 2014, provisional application No. 62/966,653, filed on Jan. 28, 2020.

(51) Int. Cl.
  *G01J 3/28* (2006.01)
  *G01J 3/12* (2006.01)

(52) U.S. Cl.
  CPC .... *G02B 21/367* (2013.01); *G01J 2003/1226* (2013.01); *G01J 2003/1273* (2013.01); *G01J 2003/2826* (2013.01); *G02B 21/0072* (2013.01)

(56) References Cited

U.S. PATENT DOCUMENTS

| | | | | |
|---|---|---|---|---|
| 4,384,199 | A * | 5/1983 | Ogino | G02B 7/32 250/204 |
| 5,311,021 | A | 5/1994 | Messerschmidt | |
| 6,792,010 | B2 | 9/2004 | Koulikov | |
| 7,050,215 | B1 | 5/2006 | Johnson | |
| 7,599,055 | B2 | 10/2009 | Gollier et al. | |
| 8,115,993 | B2 | 2/2012 | Hauger et al. | |
| 8,534,838 | B2 | 9/2013 | Barth et al. | |
| 8,598,552 | B1 | 12/2013 | Frihauf | |
| 9,086,375 | B2 | 7/2015 | Priest et al. | |
| 9,625,836 | B2 | 4/2017 | Yamaguchi | |
| 9,709,386 | B1 | 7/2017 | Nicolaides | |
| 9,823,451 | B2 | 11/2017 | Rowlette | |
| 11,119,079 | B2 * | 9/2021 | Weida | G01N 30/78 |
| 2002/0195496 | A1 | 12/2002 | Tsikos | |
| 2003/0214379 | A1 * | 11/2003 | Satoh | A61B 8/145 336/200 |
| 2005/0041113 | A1 | 2/2005 | Nayar | |
| 2005/0201660 | A1 | 9/2005 | Grot | |
| 2005/0219469 | A1 | 10/2005 | Chan | |
| 2006/0227316 | A1 | 10/2006 | Gatt | |
| 2006/0251133 | A1 | 11/2006 | Tojo | |
| 2007/0187616 | A1 | 8/2007 | Burroughs | |
| 2008/0018906 | A1 | 1/2008 | Kurukawa | |
| 2008/0018966 | A1 | 1/2008 | Dubois et al. | |
| 2008/0074660 | A1 | 3/2008 | Ye | |
| 2008/0100510 | A1 | 5/2008 | Bonthron | |
| 2008/0204760 | A1 | 8/2008 | Gollier et al. | |
| 2009/0073453 | A1 | 3/2009 | Hasegawa | |
| 2009/0213882 | A1 | 8/2009 | Weida et al. | |
| 2010/0111122 | A1 | 5/2010 | Pusharsky et al. | |
| 2010/0185067 | A1 | 7/2010 | Gupta | |
| 2010/0225924 | A1 | 9/2010 | Kuramoto | |
| 2010/0258722 | A1 * | 10/2010 | Fang | H01J 37/28 250/310 |
| 2011/0051118 | A1 | 3/2011 | Sato | |
| 2011/0235045 | A1 | 9/2011 | Koerner | |
| 2011/0292405 | A1 | 12/2011 | Dunn | |
| 2012/0046668 | A1 | 2/2012 | Gantes | |
| 2012/0206729 | A1 | 8/2012 | Seligson et al. | |
| 2012/0287418 | A1 | 11/2012 | Scherer | |
| 2013/0088723 | A1 | 4/2013 | Feldkhun | |
| 2013/0296710 | A1 | 11/2013 | Zuzak et al. | |
| 2013/0335797 | A1 | 12/2013 | Cooper | |
| 2013/0343632 | A1 | 12/2013 | Urano | |
| 2014/0253714 | A1 | 9/2014 | Weida et al. | |
| 2015/0051498 | A1 | 2/2015 | Darty | |
| 2015/0070756 | A1 | 3/2015 | Priest et al. | |
| 2015/0168125 | A1 | 6/2015 | Arieli | |
| 2015/0230702 | A1 | 8/2015 | Ulhorn et al. | |
| 2015/0241562 | A1 * | 8/2015 | Goldberg | G01S 17/42 356/5.01 |
| 2015/0345906 | A1 | 12/2015 | Varshneya | |
| 2015/0351722 | A1 | 12/2015 | Chen | |
| 2016/0018628 | A1 | 1/2016 | Rowlette | |
| 2016/0209271 | A1 | 7/2016 | Rowlette | |
| 2017/0031319 | A1 | 2/2017 | Bromer | |
| 2017/0042428 | A1 | 2/2017 | Kellnberger | |
| 2017/0343695 | A1 | 11/2017 | Stetson | |
| 2018/0045926 | A1 | 2/2018 | Rowlette | |
| 2018/0283946 | A1 | 10/2018 | Rowlette | |

FOREIGN PATENT DOCUMENTS

| | | |
|---|---|---|
| WO | WO2014209471 A2 | 12/2014 |
| WO | WO2015109274 A1 | 7/2015 |
| WO | WO2016007925 A1 | 1/2016 |
| WO | WO2016177897 A1 | 11/2016 |

OTHER PUBLICATIONS

The International Search Report and Written Opinion of the International Searching Authority for PCT/US2015/011884, Daylight Solutions, Inc., dated Apr. 20, 2015 (related application).

The International Preliminary Report on Patentability issued by the International Bureau on behalf of the International Searching Authority for PCT/US2015/011884, Daylight Solutions, Inc., dated Jul. 19, 2016 (related application).

Extended European Search Report issued by the EPO for application No. 15737504.9, Daylight Solutions, Inc., dated Aug. 3, 2017 (related application).

Francesca Rosi et al, "Noninvasive Analysis of Paintings by Midinfrared Hyperspectral Imaging", Angewandte Chemie International Edition, vol. 52, No. 20, May 10, 2013 (May 10, 2013), pp. 5258-5261, XP055216492, ISSN: 1433-7851, DOI: 10.1002/anie. 201209929 * "Experimental section"; figure 1 *.

Phillips Mark C et al, "Hyperspectral microscopy of explosives particles using an external cavity quantum cascade laser", Optical Engineering, Soc. of Photo-Optical Instrumentation Engineers, Bellingham, vol. 52, No. 6, Jun. 1, 2013 (Jun. 1, 2013), p. 61302, XP060025845, ISSN: 0091-3296, DOI: 10.1117/1.OE.52.6.061302 [retrieved on Dec. 26, 2012] * figure1 ** p. 3, left-hand column*.

Nikodem Michal et al, "Remote mid-infrared sensing using chirped laser dispersion spectroscopy", Advanced Environmental, Chemical, and Biological Sensing Technologies VIII, SPIE, 1000 20th St. Bellingham WA 98225-6705 USA, vol. 8024, No. 1, May 13, 2011 (May 13, 2011), pp. 1-7, XP060016791, DOI: 10.1117/12.883598 [retrieved on Jan. 1, 1901] * Section "Noise performance in CLaDS" *.

Matthew R. Kole et al.: "Discrete Frequency Infrared Microspectroscopy and Imaging with a Tunable Quantum Cascade Laser", Analytical Chemistry, vol. 84, No. 23, Dec. 4, 2012, pp. 10366-10372.

Lowenthal S. et al.: "Speckle Removal by a Slowly Moving Diffuser Associated with a Motionless Diffuser", Journal of the Optical Society of America, American Institute of Physics, New York, US, vol. 61, No. 7, Jul. 1, 1971, pp. 847-851.

(56) References Cited

OTHER PUBLICATIONS

Frank Fuchs et al.: "Imaging Stand-off Detection of Explosives Using Tunable MIR Quantum Cascade Lasers", Optical Sensing II, vol. 7608, Jan. 23, 2010, p. 760809.
European Patent Office Communication pursuant to Article 94(3) EPC, issued in EPO Application Serial No. 15 737 504.9, dated Oct. 1, 2020.

* cited by examiner

Optical Frequency Space

Fourier Space

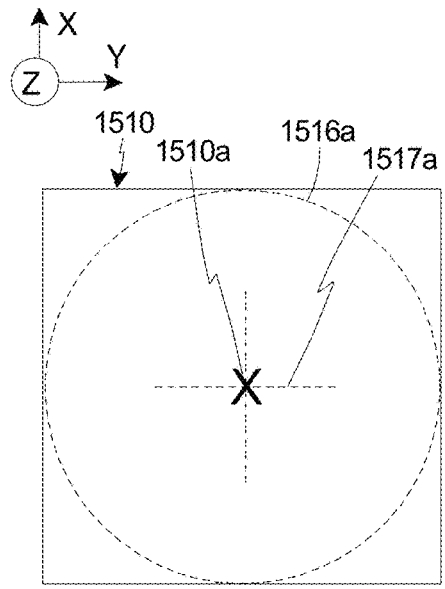
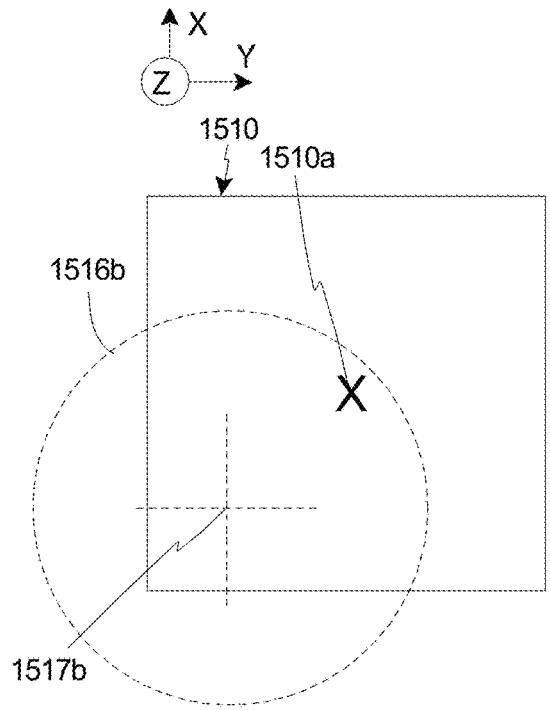
Fig. 15A  Fig. 15B
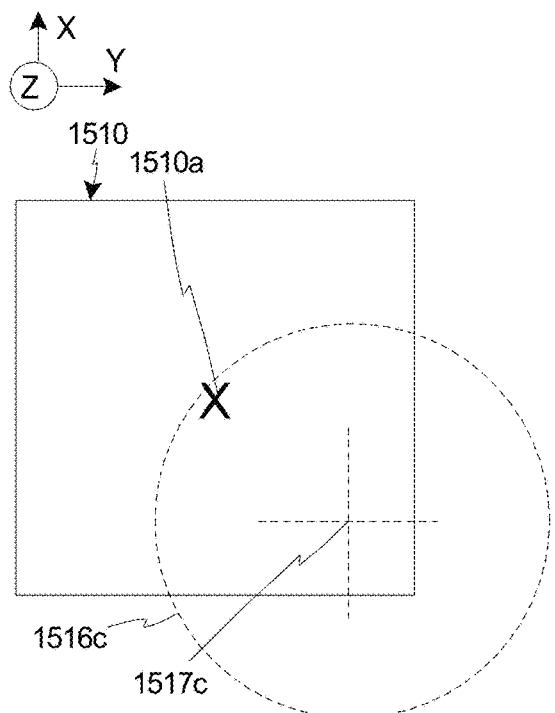
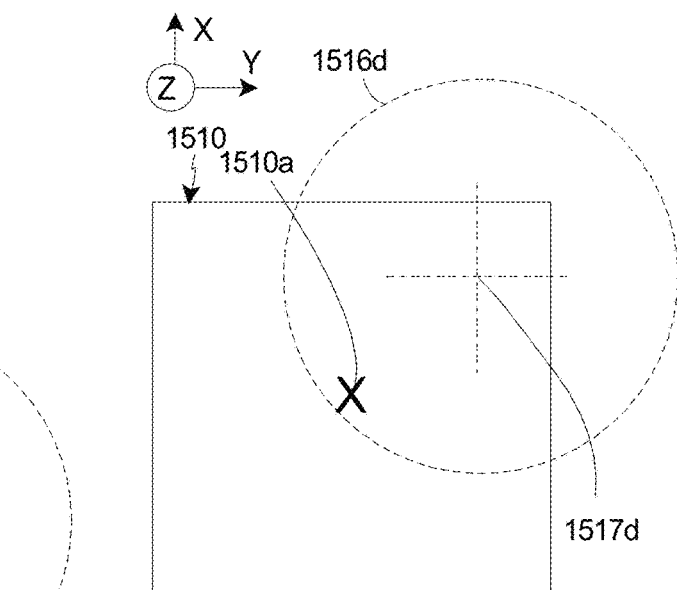
Fig. 15C  Fig. 15D

LOW-NOISE SPECTROSCOPIC IMAGING SYSTEM WITH STEERABLE SUBSTANTIALLY COHERENT ILLUMINATION

RELATED APPLICATIONS

This application is a continuation in part of U.S. application Ser. No. 17/021,263, filed on Sep. 15, 2020, entitled "LOW-NOISE SPECTROSCOPIC IMAGING SYSTEM USING SUBSTANTIALLY COHERENT ILLUMINATION". U.S. application Ser. No. 17/021,263 is a continuation of U.S. application Ser. No. 16/581,136, filed on Sep. 24, 2019, entitled "LOW-NOISE SPECTROSCOPIC IMAGING SYSTEM USING SUBSTANTIALLY COHERENT ILLUMINATION". U.S. application Ser. No. 16/581,136 is a continuation of U.S. application Ser. No. 15/680,019, U.S. patent Ser. No. 10/437,032, filed on Aug. 17, 2017, entitled "LOW-NOISE SPECTROSCOPIC IMAGING SYSTEM USING SUBSTANTIALLY COHERENT ILLUMINATION". U.S. application Ser. No. 15/680,019 is a continuation of U.S. application Ser. No. 15/109,570, U.S. Pat. No. 9,784,958, filed on Jul. 1, 2016, entitled "LOW-NOISE SPECTROSCOPIC IMAGING SYSTEM USING SUBSTANTIALLY COHERENT ILLUMINATION". U.S. application Ser. No. 15/109,570 is a 371 of and claims priority from PCT Application Serial No. PCT/US2015/011884, filed Jan. 18, 2015, entitled "LOW-NOISE SPECTROSCOPIC IMAGING SYSTEM USING SUBSTANTIALLY COHERENT ILLUMINATION". PCT Application Serial No. PCT/US2015/011884 claims priority on U.S. Provisional Application Ser. No. 61/929,050, filed Jan. 18, 2014 and entitled "A LOW-NOISE SPECTROSCOPIC IMAGING SYSTEM USING COHERENT ILLUMINATION". As far as permitted, the contents of U.S. application Ser. No. 17/021,263; U.S. application Ser. No. 16/581,136; U.S. application Ser. No. 15/680,019; U.S. application Ser. No. 15/109,570; PCT Application Serial No. PCT/US2015/011884; and U.S. Provisional Application Ser. No. 61/929,050 are incorporated herein by reference. Further, as far as permitted, the contents of PCT Application Serial No. PCT/US2012/061987 is incorporated herein by reference.

Additionally, this application is a continuation-in-part of PCT Application Serial No. PCT/US21/15229, filed on Jan. 27, 2021, entitled "LASER ASSEMBLY WITH ACTIVE POINTING COMPENSATION DURING WAVELENGTH TUNING". PCT Application Serial No. PCT/US21/15229 claims priority on U.S. Provisional Application No. 62/966,653 filed on Jan. 28, 2020, entitled "LASER ASSEMBLY WITH ACTIVE POINTING COMPENSATION DURING WAVELENGTH TUNING". As far as permitted, the contents of PCT Application Serial No. PCT/US21/15229 and U.S. Provisional Application No. 62/966,653 are incorporated herein by reference.

BACKGROUND

Microscopes are often used to analyze a sample in order to evaluate certain details and/or properties of the sample that would not otherwise be visible to the naked eye. Additional information on the chemical properties of the sample can be obtained by illuminating and observing the sample with discrete optical frequencies of monochromatic laser radiation. Samples that can be analyzed this way include human tissue and cells, explosive residues, powders, liquids, solids, polymers, inks, and other materials. A human tissue sample may be analyzed for the presence of cancerous cells and/or other health related conditions. Other materials may be analyzed for the presence of explosive residues and/or other dangerous substances.

Unfortunately, spectral images generated from the samples with existing spectral microscopes can sometimes be of insufficient quality to enable full and effective analysis of the samples. Thus, it is desired to improve the resolution and quality of the spectral images of the samples that are being generated.

SUMMARY

The present invention is directed toward a spectral imaging device for capturing one or more, two-dimensional, spectral images of a sample, including a first spectral image during a first capture time. In one implementation, the spectral imaging device includes (i) an image sensor that includes a two-dimensional array of sensors that are adapted to capture information; (ii) a tunable illumination source that generates an illumination beam that is directed along an incident sample beam path at the sample; (iii) a beam path adjuster that selectively adjusts the incident sample beam path; and (iv) a control system that includes a processor. In this design, the control system (i) controls the illumination source to generate the illumination beam during the first capture time, (ii) controls the image sensor during the first capture time to capture first information for the first spectral image, and (iii) controls the beam path adjuster to selectively adjust the incident sample beam path relative to the sample during the first capture time while the image sensor is accumulating the information for the first spectral image.

As an overview, a reduction in spurious spectral artifacts in the first spectral image (and subsequent spectral images) is achieved through fast movement (modulation) of the incident sample beam path of the illumination beam relative to the sample during the first capture time (and subsequent capture times). Stated in another fashion, a reduction in noise can be achieved by rapidly moving (dithering) the position of illumination beam relative to the sample, and slowly capturing each spectral image with the image sensor. Further, the fast movement of the illumination beam on the sample can result in a more uniform illumination of the sample during each image capture time. This can improve the quality of each spectral image.

As provided herein, the control system can control the beam path adjuster to selectively move an incident beam center of the illumination beam on a sample plane of the sample during the first capture time.

For example, the control system can control the beam path adjuster to selectively move the incident beam center in a movement pattern relative to the sample plane during the first capture time. In one implementation, the control system can control the beam path adjuster to selectively move the incident beam center to repeat the movement pattern at least one cycle during the first capture time.

In one implementation, the control system controls the beam path adjuster to selectively move the incident beam center between a first beam center position on the sample, and a second beam center position on the sample during the first capture time. In alternative, non-exclusive examples, the first beam center position is spaced apart from the second beam center position at least 1, 2 3, 5, 10, 25, 50, 100, 250, 500, 650, 1000, 2000 or 5000 micrometers (um). Stated differently, in alternative, non-exclusive examples, an angular location of the first beam center position is spaced apart from an angular location of the second beam center position at least 10, 50, 100, 250, 500, 1000, 2000, 3000, 4000, 5000, 10,000 microradians (urad) when referenced to the center of the field of view.

In one implementation, the control system controls the beam path adjuster to selectively move the incident beam center between the first beam center position on the sample, the second beam center position on the sample, and back to the first beam center position during the first capture time.

In one implementation, the control system controls the beam path adjuster to selectively move the incident beam center of the illumination beam on a sample plane of the sample in a modulating fashion during the first capture time.

Additionally, the control system can (i) control the illumination source to generate the illumination beam during a second capture time, (ii) control the image sensor during the second capture time to capture second information for a second spectral image, the second capture time being different from the first capture time, and (ii) control the beam path adjuster to selectively adjust the incident sample beam path relative to the sample during the second capture time. Moreover, the control system can control the illumination source so that the illumination beam has a first target wavenumber during the first capture time, and a second target wavenumber during the second capture time, and the first target wavenumber is different from the second target wavenumber.

In one, non-exclusive implementation, the beam path adjuster includes a beam steering assembly that selectively steers the illumination beam, and the control system controls the beam steering assembly to selectively steer the incident sample beam path relative to the sample during the first capture time.

Additionally or alternatively, the control system can control the tunable illumination source so that the illumination beam has a center wavenumber that is modulated at least one cycle from a first center wavenumber to a second center wavenumber, and back to the first center wavenumber during the first capture time. In this implementation, a difference between the first center wavenumber and the second center wavenumber is at least one wavenumber.

Additionally, or alternatively, the control system (i) controls the image sensor to capture a first preliminary image while controlling the tunable illumination source so that the illumination beam has a first center wavenumber; (ii) controls the image sensor to capture a second preliminary image while controlling the tunable illumination source so that the illumination beam has a second center wavenumber that is different than the first center wavenumber; and (iii) generates the first spectral image using the first preliminary image and the second preliminary image.

Additionally, the spectral imaging device can include an objective lens assembly that collects light from the sample and forms a two-dimensional spectral image of the sample on the image sensor. In this implementation, the illumination beam and the collected light follow an overall beam path have an effective optical path segment; and the effective optical path segment can be adjusted during the first capture time.

In another implementation, a method for spectrally analyzing a sample includes: (i) generating an illumination beam during a first capture time that is directed along an incident sample beam path at the sample with an illumination source; (ii) capturing a two-dimensional array of first information with an image sensor during the first capture time; and (iii) selectively adjusting the incident sample beam path on the sample with a beam path adjuster during the first capture time.

In certain embodiments, tunable illumination source emits a temporally coherent illumination beam and the desired tuning range is the mid-infrared range.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIGS. 15A-15E are simplified schematics of the sample, and the illumination beam at alternative times;

DESCRIPTION

Figure 1A:
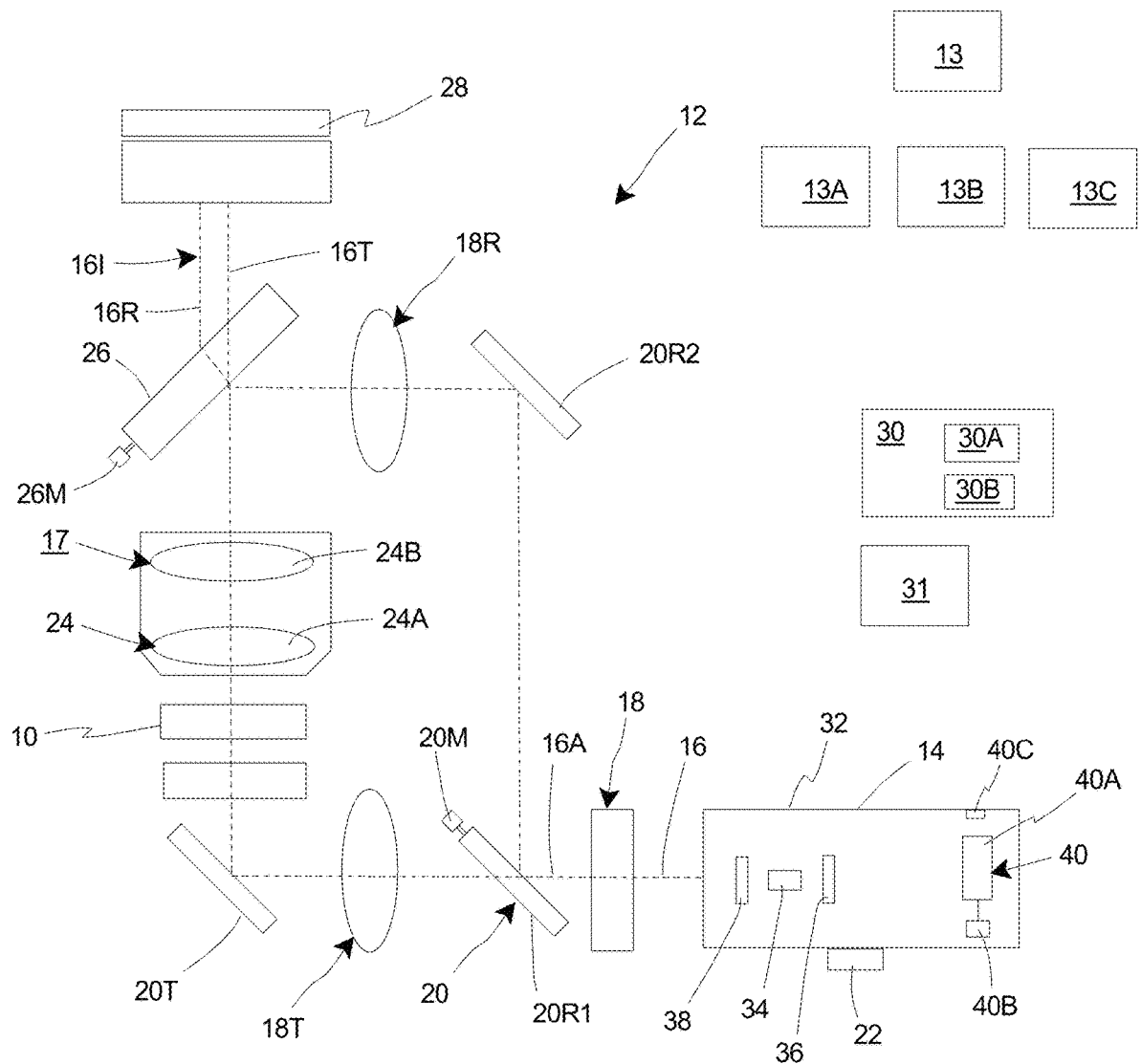
FIG. 1A is a simplified schematic illustration of a sample and an embodiment of a spectral imaging microscope having features of the present invention.

FIG. 1A is a simplified schematic illustration of a sample 10 and an embodiment of a spectral imaging device 12, e.g., a spectral imaging microscope, having features of the present invention. In particular, the spectral imaging device 12 can be used to quickly and accurately acquire a spectral cube 13 (illustrated as a box) of the sample 10 that can be used to analyze and evaluate the various properties of the sample 10. As provided herein, in certain embodiments, the spectral imaging device 12 is uniquely designed to generate a plurality of high resolution, two-dimensional, output spectral images 13A, 13B, 13C (only three are illustrated as boxes) of the sample 10 that are used to create the spectral cube 13 for the sample 10. The term "image" or "spectral image" as used herein shall mean and include a (i) two-dimensional photograph or screen display, or (ii) a two-dimensional array of data (or information) that can be analyzed and/or used to generate the two-dimensional photograph or screen display.

As an overview, as discussed in greater detail herein below, the spectral imaging device 12 includes a Fourier space measurement pass band (defined by the reciprocal of the spectral resolution and referred to herein simply as a "pass band") and the spectral imaging device 12 can include certain structural features that cause certain noise sources to fall outside the measurement pass band. With this design, the spectral imaging device 12 can effectively inhibit noise sources from adversely impacting the spectral resolution and image quality of each output image 13A, 13B, 13C. Additionally and/or alternatively, the spectral imaging device 12 can utilize algorithms and/or methodologies that further inhibit noise sources from adversely impacting the resolution and image quality of each output image 13A, 13B, 13C.

A number of Figures include an orientation system that illustrates an X axis, a Y axis that is orthogonal to the X axis, and a Z axis that is orthogonal to the X and Y axes. It should be noted that any of these axes can also be referred to as the first, second, and/or third axes.

As provided herein, the sample 10 can be analyzed and evaluated in a static sense, i.e., where the properties of the sample 10 are substantially unchanged over the measurement period, and/or in a dynamic sense, i.e., where the properties of the sample 10 are evolving over the measurement period. In the static case, a one-dimensional spectra is produced for every pixel position of the two-dimensional output image 13A, 13B, 13C to yield a three-dimensional spectral cube 13. In the dynamic case, a fourth dimension of time is added to yield a four-dimensional spectral matrix 13.

The fidelity of the data of the spectral cube 13 can be characterized by the repeatability of the spectral data at each pixel location, over multiple trials. Each trial has a unique data collection start time. Because the source intensity may vary strongly across the sample 10 as well as across the optical frequency band of interest, one or more featureless background spectral cubes (without the sample) may be generated and used to normalize the signal spectral cube by taking the ratio of the signal spectral cube to the background spectral cube. If the frequencies are collected in an ordered array, then the ratio is referred to as the image transmittance.

As provided herein, a ratio of two background spectral cubes taken without the sample 10, at different times, can be used to produce a system transmittance spectral cube (not shown). Comparing the pixel-by-pixel transmittance over many trials and over optical frequencies is a suitable means for characterizing the intrinsic signal-to-noise ratio (SNR) of the spectral imaging device 12. A non-exclusive example of an acceptable measure of the intrinsic system SNR is the reciprocal of the variance of the transmittance over a specified spectral range for two randomly selected spectral cube collection trials taken at different times.

The sample 10 can be a variety of things, including mammalian blood, mammalian blood serum, mammalian cells, mammalian tissue, mammalian biofluids, and their animal counterparts, plant matter, bacteria, polymers, hair, fibers, explosive residues, powders, liquids, solids, inks, and other materials commonly analyzed using spectroscopy and microscopy. More particularly, in certain non-exclusive applications, the sample 10 can be human blood serum, and the spectral imaging microscope 12 can be utilized for rapid screening of the serum sample 10 for the presence of disease and/or other health related conditions; and/or the spectral imaging microscope 12 can be utilized in certain forensic applications such as rapid screening of the sample 10 for the presence of explosive residues and/or other dangerous substances. Additionally, when positioned substantially within the spectral imaging microscope 12 for purposes of analysis, the sample 10 can be present by itself, or the sample 10 can be held in place using one or more slides (not shown), e.g., infrared transparent slides.

Further, the sample 10 can be thin enough to allow study through transmission of an illumination beam, e.g., an infrared illumination beam, through the sample 10 (i.e., in transmission mode), or the sample 10 can be an optically opaque sample that is analyzed through reflection of an illumination beam, e.g., an infrared illumination beam, by the sample 10 (i.e., in reflection mode). Still further, the sample 10 can be thin enough to allow study through transflection of an illumination beam, e.g., an infrared illumination beam can pass through the sample, reflect on the surface of a reflective substrate, and again pass through the sample 10, the illumination beam being double attenuated. For example, in the embodiment illustrated in FIG. 1A, the spectral imaging microscope 12 can be utilized in transmission mode and/or reflection mode, and data can be acquired using a transmission, reflection, or transflection methodology.

It should be appreciated that the spectral imaging device 12 can be utilized in a variety of potential applications. For example, such applications can include, but are not limited to, spectral histopathology and cytopathology, hematology, pharmaceutical drug development and process control, detection of biochemical warfare agents and other hazardous materials, materials science, and polymer science development.

The design of components of the spectral imaging device 12 can be varied to achieve the desired characteristics of the spectral imaging device 12. In one embodiment, the spectral imaging device 12 is an infrared spectral imaging microscope that uses tunable laser radiation to interrogate the sample 10.

In the non-exclusive embodiment illustrated in FIG. 1A, the spectral imaging microscope 12 includes (i) a tunable illumination source 14 that generates and/or emits an optical illumination beam 16, (ii) an optical assembly 17 that includes an illumination optical assembly 18 and an objective lens assembly 24, (iii) an element assembly 20 that steers the illumination beam 16 along a desired beam path, (iv) an illumination switch 22 that is controlled by a user (not shown) so that the illumination beam 16 can be alternatively directed at the sample 10 in a transmission mode or a reflection mode, (v) a beam splitter 26, (vi) an image sensor 28 that captures (accumulates) information to create the output images 13A, 13B, 13C during each data capture time, and the spectral cube 13 of the sample 10; and (vii) a control system 30 that is electrically connected to and controls many of the components of the spectral imaging device 12. One or more of these devices can be referred to as a component.

It should be noted that the spectral imaging microscope 12 can be designed with more or fewer components than are illustrated in FIG. 1A, and/or the components can be organized in another fashion than illustrated in FIG. 1A. For example, the spectral imaging microscope 12 can include a multiple position lens turret (not shown) that includes one or more mid-infrared objective lens assemblies with different characteristics, and/or one or more objective lens assemblies that work outside the mid-infrared spectral range. Additionally, for example, the optical assembly 17 can be designed without the illumination optical assembly 18.

Moreover, the spectral imaging device 12 can include an image display 31 (illustrated as a box), e.g., an LED display, that displays one or more of the output images 13A, 13B, 13C in real time, and/or subsequently displays the spectral cube 13.

In certain embodiments, the spectral imaging microscope 12 has a relatively high resolution, high numerical aperture ("NA"), and a relatively large field of view ("FOV"). This allows for the collection of data from relatively large samples. This will improve the speed in which the sample is analyzed. As one non-exclusive example, the spectral imaging microscope 12 can have NA of 0.7, a magnification of 12.5×, and a FOV of approximately 650 μm×650 μm, with a sample-referred pixel size of 1.36 μm.

In certain embodiments, the tunable illumination source 14 includes a laser source that emits a substantially temporally coherent illumination beam 16 (e.g., a laser beam) that is usable for illuminating and analyzing the sample 10 in transmission mode and/or in reflection mode. The illumination beam 16 is made up of a plurality of illumination rays 16A that follow a beam path from the illumination source 14 to the sample 10 and from the sample 10 to the image sensor 28. Further, the illumination rays 16A can have a single, discrete center optical frequency that is within a desired tuning range of the illumination source 14. Alternatively, the illumination source 14 can be controlled by the control system 30 to vary the discrete center optical frequency of the illumination rays 16A over time within the desired tuning range.

In certain embodiments, the optical illumination beam 16 has a spectral width that is equal to or less than a desired spectral resolution (represented by the delta v "$\Delta v$") of the spectral imaging device 12. The builder of the spectral imaging device 12 selects the desired spectral resolution and builds the system accordingly. For example, the desired spectral resolution of the spectral imaging device 12 can be four cm$^{-1}$ wavenumbers ($\Delta v=4$ cm$^{-1}$). Alternatively, for example, the desired spectral resolution can be 2, 3, 4, 4.1, 5, 5.25, 6, 7, 8, 9, 10, or 16 cm$^{-1}$ wavenumbers. However, other desired spectral resolutions can be utilized.

In certain non-exclusive embodiments, the tunable illumination source 14 is a tunable mid-infrared illumination source that directly generates and emits the illumination beam 16 having a center optical frequency that is in the mid-infrared ("MIR") range. In this example, the desired tuning range is the MIR range. Further, as used herein, term "MIR range" shall mean and include the spectral region or spectral band of between approximately two and twenty micrometers (2-20 μm) in wavelength or five thousand to 500 wavenumbers (5000-500 cm$^{-1}$). The mid-infrared range is particularly useful to spectroscopically interrogate the sample 10 since many samples 10 are comprised of molecules or groups of molecules that have fundamental vibrational modes in the MIR range, and thus present strong, unique absorption signatures within the MIR range. Alternatively, the tunable illumination source 14 can be designed to generate the illumination beam 16 having a center optical frequency of greater than twenty or less than two micrometers.

Moreover, in alternative embodiments, the tunable illumination source 14 can be either a pulsed laser or a continuous wave (CW) laser. For a pulsed illumination source 14, the illumination beam 16 will include a plurality of pulses of illumination rays 16A that follow the beam path from the tunable illumination source 14 to the sample 10 and from the sample 10 to the image sensor 28. Further, the pulses of illumination rays 16A can have a discrete center optical frequency that is within the MIR range.

In certain embodiments, the discrete center optical frequency (also referred to as "center wavenumber") of the optical illumination source 16A can vary over time over the entire or a portion of the MIR range to analyze the sample 10 over the desired spectral range. For example, for a pulsed illumination source 14, the illumination source 14 can be tuned to generate an optical illumination beam 16 that consists of a set of sequential, specific output pulses of light having different, discrete center optical frequency that span the entire or just a portion of the MIR range. For example, the illumination source 14 can be tuned to a first position and one or more pulses can be generated having approximately the same first center optical frequency ("first target optical frequency" or "first target wavenumber"). Subsequently, the illumination source 14 can be tuned to a second position and one or more pulses can be generated having approximately the same second center optical frequency ("second target optical frequency" or "second target wavenumber") that is different from the first center optical frequency. Next, the illumination source 14 can be tuned to a third position and one or more pulses can be generated having approximately the same third center optical frequency ("third target optical frequency" or "third target wavenumber") that is different from the first and second center optical frequency. This process can be repeated to a plurality of additional target optical frequencies ("target wavenumbers") throughout a portion or the entire MIR range. As non-exclusive examples, the number of pulses at each discrete optical frequency can be 1, 5, 10, 50, 100, 200, 500, 1000, 10,000 or more. Alternatively, the tunable illumination source 14 can be operated in a continuous wave fashion at each target optical frequency.

The number of discrete target optical frequencies in the set used to acquire the spectral cube 13 can also vary according to the sample 10. As non-exclusive examples, the number of discrete target optical frequencies in the mid-infrared range utilized to acquire the spectral cube 13 can be approximately 1, 2, 3, 4, 5, 6, 7, 8, 9, 10, 15, 20, 25, 40, 200, 226, 400, 552 or 4000. As provided herein, the term "target optical frequency step" shall mean the smallest allowed difference between adjacent target optical frequencies. In alternative, non-exclusive embodiments, the target optical frequency step can be approximately 0.1, 0.2, 0.25, 0.33, 0.5, 0.67, 0.7, 1.0, 2.0, 4.0, 8.0, or 16, wavenumbers.

In certain, non-exclusive embodiments, the illumination beam 16 from the MIR illumination source 14 has an optical spectral full width at half maximum (FWHM) of less than approximately 0.01, 0.05, 0.1, 0.25, 0.5, 1.0, 2.0, or 4 $cm^{-1}$.

In certain embodiments, the control system 30 can control the illumination source 14 to be tuned so that the illumination beam 16 has the first target optical frequency, and the control system 30 can control the image sensor 28 to capture the first image 13A with the sample 10 illuminated at the first target optical frequency. Subsequently, the control system 30 can control the illumination source 14 to be tuned so that the illumination beam 16 has the second target optical frequency and the control system 30 can control the image sensor 28 to capture the second image 13B with the sample 10 illuminated at the second target optical frequency. This process is repeated for each target optical frequency until a plurality of images 13A, 13B, 13C, are collected across the optical frequency range of interest, thus generating a spectral cube 13.

Additionally, the illumination source 14 of FIG. 1A can include multiple individual lasers that span a portion or all of the desired mid-infrared spectral range. A description of an illumination source 14 that includes multiple individual lasers is described in U.S. patent application Ser. No. 13/949,159, entitled "Laser Source With A Large Spectral Range" filed on Jul. 23, 2013. As far as permitted, the contents of U.S. patent application Ser. No. 13/949,159 are incorporated herein by reference. The illumination source 14 can utilize a variety of methods to rapidly switch between the target optical frequencies. These include techniques such as rapid tuning mechanisms, galvo-controlled mirrors to switch between different laser modules, or spectral beam combining techniques of multiple laser modules and subsequent time-division multiplexing of laser illumination.

In one, non-exclusive embodiment, the illumination source 14 is an external cavity laser that includes a rigid laser frame 32, a gain medium 34, a cavity optical assembly 36, an output optical assembly 38, and a wavelength selective ("WS") feedback assembly 40 (e.g., a movable grating).

The design of the gain medium 34 can be varied pursuant to the teachings provided herein. In one, non-exclusive embodiment, the gain medium 34 directly emits the illumination beam 16 without any frequency conversion. As a non-exclusive example, the gain medium 34 can be a semiconductor type laser. As used herein, the term semiconductor shall include any solid crystalline substance having electrical conductivity greater than insulators but less than good conductors. More specifically, in certain embodiments, the gain medium 34 is a Quantum Cascade (QC) gain medium, an Interband Cascade (IC) gain medium, or a mid-infrared diode. Alternatively, another type of gain medium 34 can be utilized.

In FIG. 1A, the gain medium 34 includes (i) a first facet that faces the cavity optical assembly 36 and the WS feedback assembly 40, and (ii) a second facet that faces the output optical assembly 38. In this embodiment, the gain medium 34 emits from both facets. In one embodiment, the first facet is coated with an anti-reflection ("AR") coating and the second facet is coated with a reflective coating. The AR coating allows light directed from the gain medium 34 at the first facet to easily exit the gain medium 34 as an illumination beam directed at the WS feedback assembly 40; and allows the illumination beam reflected from the WS feedback assembly 40 to easily enter the gain medium 34.

The illumination beam 16 exits from the second facet. The reflective coating on the second facet reflects at least some of the light that is directed at the second facet from the gain medium 34 back into the gain medium 34. In one non-exclusive embodiment, the AR coating can have a reflectivity of less than approximately 2 percent, and the reflective coating can have a reflectivity of between approximately 2-95 percent. In this embodiment, the reflective coating acts as an output coupler (e.g., a first end) for the external cavity.

The cavity optical assembly 36 is positioned between the gain medium 34 and the WS feedback assembly 40 along a lasing axis, and collimates and focuses the light that passes between these components. For example, the cavity optical assembly 36 can include a single lens or more than one lens. For example, the lens can be an aspherical lens having an optical axis that is aligned with the lasing axis. In one embodiment, to achieve the desired small size and portability, the lens has a relatively small diameter. The lens can comprise materials selected from the group of Ge, ZnSe, ZnS, Si, CaF2, BaF2 or chalcogenide glass. However, other materials may also be utilized.

The output optical assembly 38 is positioned along the lasing axis. In this design, the output optical assembly 38 collimates and focuses the illumination beam 16 that exits the second facet of the gain medium 34. For example, the output optical assembly 38 can include a single lens or more than one lens that are somewhat similar in design to the lens of the cavity optical assembly 36.

The WS feedback assembly 40 reflects the light back to the gain medium 34, and is used to precisely select and adjust the lasing frequency (wavelength) of the external cavity and the center optical frequency of the illumination beam 16. Stated in another fashion, the WS feedback assembly 40 is used to feed back to the gain medium 34 a relatively narrow band optical frequency which is then amplified in the gain medium 34. In this manner, the illumination beam 16 may be tuned with the WS feedback assembly 40 without adjusting the gain medium 34. Thus, with the external cavity arrangements disclosed herein, the WS feedback assembly 40 dictates what optical frequency will experience the most gain and thus dominate the optical frequency of the illumination beam 16.

A number of alternative embodiments of the WS feedback assembly 40 can be utilized. In FIG. 1A, the WS feedback assembly 40 is spaced apart from the gain medium 34 and defines a second end of the external cavity. In this embodiment, the external cavity extends from the output coupler (reflective coating) on the second facet to the WS feedback assembly 40. The term external cavity is utilized to designate the WS feedback assembly 40 is positioned outside of the gain medium 34.

In some embodiments, the WS feedback assembly 40 includes a diffraction grating 40A and a grating mover 40B that selectively moves (e.g., rotates) the diffraction grating 40A to adjust the lasing frequency of the gain medium 34 and the optical frequency of the illumination beam 16. The diffraction grating 40A can be continuously monitored with a grating measurement system 40C (e.g., an encoder) that provides for closed loop control of the grating mover 40B. With this design, the optical frequency of the illumination beam 16 can be selectively adjusted in a closed loop fashion so that the sample 10 can be imaged at many different, precise, selectively adjustable optical frequencies throughout a portion or the entire MIR spectrum.

The control system 30 controls the operation of the tunable illumination source 14 including the electrical power to the grating mover 40B, and the electrical power that is directed to the gain medium 34 (e.g., controls the gain medium 34 by controlling the electron injection current). Further, the control system 30 can control the image sensor 28 to control the timing of the capture of the images 13A, 13B, 13C. For example, the control system 30 can include one or more processors 30A (illustrated as a box) and/or storage devices 30B (illustrated as a box). In FIG. 1A, the control system 30 is illustrated as a centralized unit. Alternatively, the control system 30 can be a distributed controller.

The collection of an accurate spectral cube 13 requires that the optical frequency of the optical illumination beam be precisely known as the laser is tuned. In certain embodiments, the control system 30 directs the pulses of power to the gain medium 34 based on the position signal received from the grating measurement system 40C. Stated in another fashion, the control system 30 can direct one or more pulses of power to the gain medium 34 at each of the plurality of alternative device positions so that the laser generates the set of discrete target optical frequencies. In this embodiment, the control system 30 can direct one or more pulses of power to the gain medium 34 upon receipt of each new position signal. As a result thereof, the specific optical frequency of the pulses will not be influenced by variations in speed of the grating mover 40B.

The duration of each pulse of power directed by the control system 30 to the gain medium 34 can also be varied. In alternative, non-exclusive embodiments, the control system 30 can control each pulse of power to have a duration of approximately 10, 25, 50, 75, 100, 150, 200, 300, 400, 500, 600 or 700 nanoseconds.

Figure 1B:
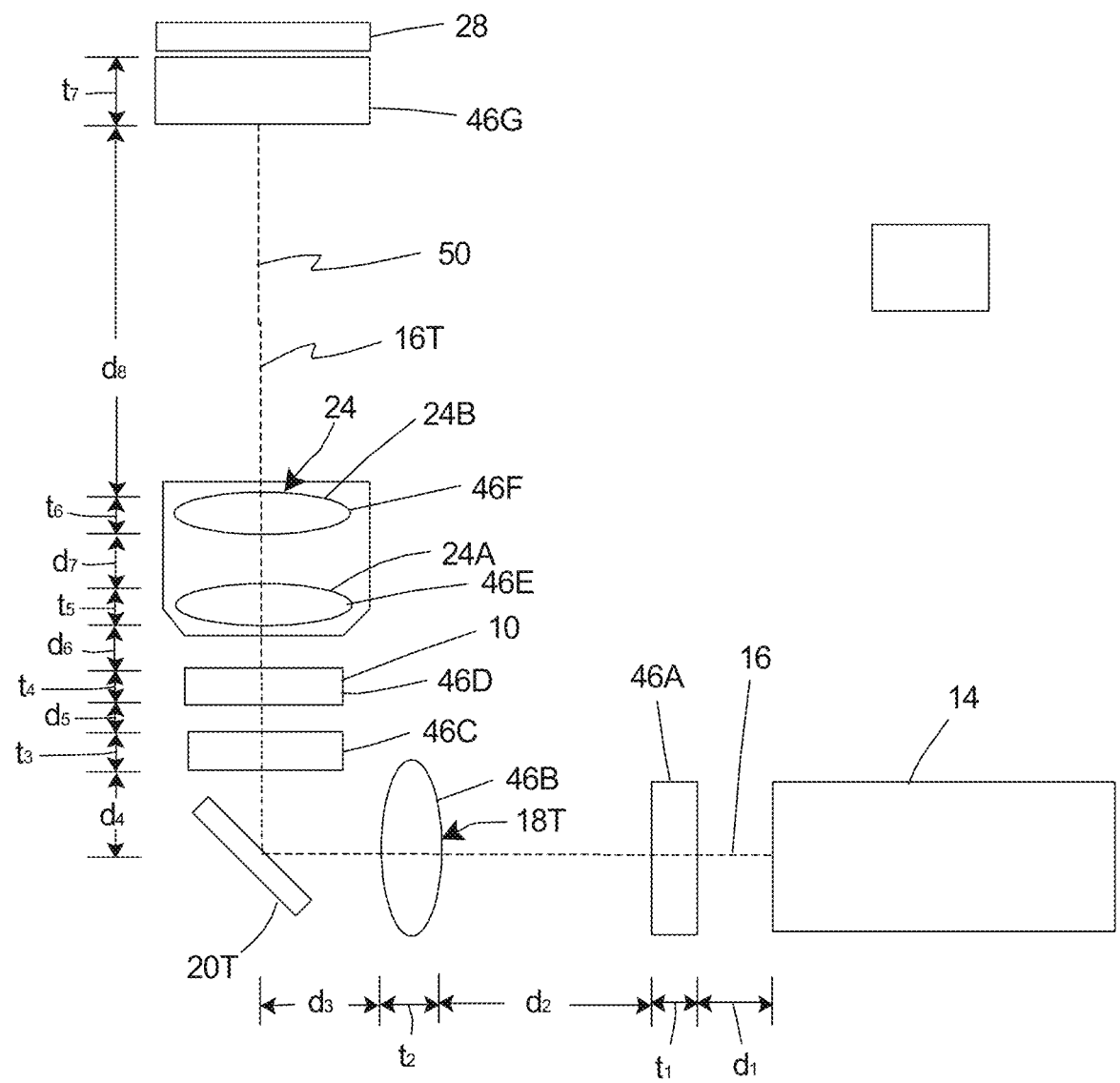
FIG. 1B is a simplified schematic illustration of the spectral imaging microscope of FIG. 1A, in a transmission mode.

Once the tunable illumination source 14 has emitted the illumination beam 16, the illumination beam 16 is directed toward the sample 10 so that the sample 10 may be properly and effectively illuminated by the illumination beam 16. For example, when the spectral imaging microscope 12 is operating in transmission mode, the illumination beam 16 is directed toward the sample 10 in order to properly and effectively illuminate the sample 10. In this example, the illumination rays 16A that are transmitted through the sample 10 are referred to as transmitted rays 16T (also illustrated more clearly in FIG. 1B). As will be discussed in further detail herein below, FIG. 1B is a simplified schematic illustration of a transmission beam path of the illumination beam 16 from the illumination source 14 of the spectral imaging microscope 12 of FIG. 1A to the image sensor 28, with the sample 10 being interrogated via transmission of the illumination beam 16 through the sample 10.

Figure 1C:
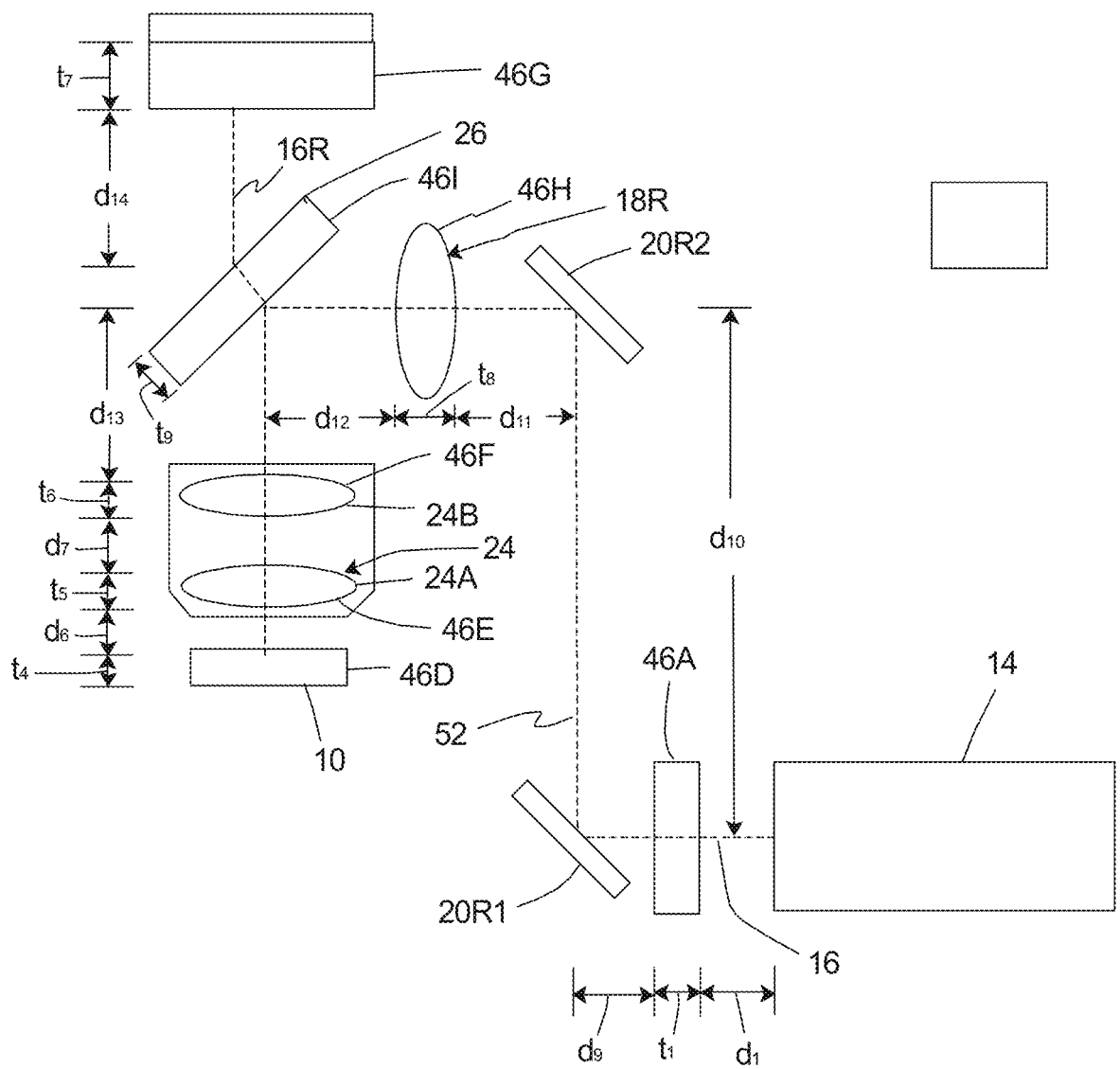
FIG. 1C is a simplified schematic illustration of the spectral imaging microscope of FIG. 1A, in a reflection mode.

In another example, when the spectral imaging microscope 12 is operating in reflection mode, the illumination beam 16 is directed toward the sample 10 in order to properly and effectively illuminate the sample 10. In this example, the illumination rays 16A that are reflected off of the sample 10 are referred to as reflected rays 16R (also illustrated more clearly in FIG. 1C). As will be discussed in further detail herein below, FIG. 1C is a simplified schematic illustration of an alternative reflection beam path of the illumination beam 16 from the tunable illumination source 14 of the spectral imaging device 12 of FIG. 1A to the image sensor 28, with the sample 10 being interrogated via reflection of the illumination beam 16 off of the sample 10.

In the embodiment illustrated in FIG. 1A, when operating in transmission mode, the illumination beam 16 exiting the tunable illumination source 14 is directed with a portion of the illumination optical assembly 18, i.e., a transmission illumination optical assembly 18T (illustrated more clearly in FIG. 1B), toward the sample 10 so as to impinge on the sample 10. In one embodiment, the transmission illumination optical assembly 18T can include one or more optical, refractive elements, e.g., lenses and/or windows (three such refractive elements are illustrated in FIG. 1A), that direct the illumination beam 16 at the sample 10. Further, in certain embodiments, the refractive elements are operable in the MIR range. Moreover, as described in greater detail herein below, pursuant to the teachings of the present invention, the refractive elements can have thicknesses and spacing (i.e., separation) that inhibit wavelength-dependent noise, e.g., parasitic etalon modulations, from adversely impacting the image quality and optical spectral resolution of the spectra generated from the set of wavelength dependent spectral images 13A, 13B, 13C of the sample 10 that are being generated.

It should be appreciated that the fluid, e.g., air or another suitable fluid, that fills the spacing between the optical elements of the transmission optical assembly 18T also functions as optical elements that can be refractive in the MIR range.

In certain embodiments, the transmission illumination optical assembly 18T can be used to transform, i.e., to increase (magnify) or decrease, the size and profile of the illumination beam 16 to match and simultaneously illuminate a desired transmission illuminated area on the sample 10. Stated another way, the transmission illumination optical assembly 18T can be used to condition and focus the illumination beam 16 so that the illumination beam 16 has the correct or desired size and beam profile on the sample 10. In certain embodiments, the size of the transmission illuminated area of the sample 10 is tailored to correspond to the design of the image sensor 28 and the objective lens assembly 24. As non-exclusive examples, the desired transmission illuminated circular area bounded by a diameter that is approximately 50, 100, 200, 250, 500, 600, 650, 700, 1000, or by 2000 um.

In the embodiment illustrated in FIG. 1A, the spectral imaging microscope 12 and/or the illumination optical assembly 18 can also include a reflection illumination optical assembly 18R (illustrated more clearly in FIG. 1C) for directing the illumination beam 16 at the sample 10 when operating in reflection mode. In one embodiment, the reflection illumination optical assembly 18R includes one or more optical, refractive elements, e.g., lenses and/or windows that direct the illumination beam 16 at the sample 10. In this embodiment, the refractive elements can be operable in the MIR range. Moreover, as described in greater detail herein below, pursuant to the teachings of the present invention, the refractive elements can have thicknesses and spacing (i.e. separation) that inhibit wavelength-dependent noise, e.g., parasitic etalon modulations, from adversely impacting the image quality and optical spectral resolution of the spectra generated from the set of wavelength dependent spectral images 13A, 13B, 13C of the sample 10 that are being generated Additionally, in certain embodiments, the reflection illumination optical assembly 18R can be used to transform, i.e., to increase (magnify) or decrease, the size and profile of the illumination beam 16 to match a desired reflection illuminated area on the sample 10. Stated another way, the reflection illumination optical assembly 18R can be used to condition and focus the illumination beam 16 so that the illumination beam 16 has the desired beam profile on the sample 10. As non-exclusive examples, the desired reflection illuminated area is approximately a circular area bounded by a diameter that is approximately 50, 100, 200, 250, 500, 600, 650, 700, 1000, or by 2000 um.

As noted above, the element assembly 20 is utilized to steer the illumination beam 16 such that the illumination beam 16 can be alternatively utilized in transmission mode or reflection mode. The design of the element assembly 20 can be varied. In one embodiment, the element assembly 20 includes a plurality of elements (e.g., beam steerers) 20T, 20R1, 20R2, e.g., mirrors (reflective in the desired optical frequency spectrum), which are positioned so as to redirect the path of the illumination beam 16 by approximately ninety degrees. Alternatively, the element assembly 20 can have a different design and/or the elements 20T, 20R1, 20R2 can be positioned so as to redirect the path of the illumination beam 16 by greater than or less than approximately ninety degrees. Still alternatively, the elements 20T, 20R1, 20R2 can include a curved mirror that conditions the illumination beam 16 (i) to complement the illumination optical assembly 18, or (ii) to allow for the elimination of a portion or all of the illumination optical assembly 18. Furthermore, the element assembly may also include one or more electrically controllable angular adjustments.

In certain implementations, it should be noted that the elements of the element assembly 20 are stationary during each data capture time. In this design, the elements of the element assembly 20 are only moved when data is not be captured.

For example, in the embodiment illustrated in FIG. 1A, when utilized in transmission mode, the illumination beam 16 only impinges on a single transmission element 20T before being directed toward the sample 10. Additionally and/or alternatively, in this embodiment, when utilized in reflection mode, the illumination beam impinges on two reflection elements, i.e. a first reflection beam element 20R1 and a second reflection beam element 20R2, before being directed toward the sample 10.

It should be appreciated that, in this embodiment, the first reflection beam element 20R1, which is positioned between the illumination source 14 and the transmission beam element 20T, includes an element mover 20M that can be controlled to selectively move the first reflection beam element 20R1 out of the way of the illumination beam 16. With such design, when the spectral imaging device 12 is being used in transmission mode, the first reflection beam element 20R1 can be selectively moved out of the beam path so that the illumination beam 16 does not impinge on the first reflection beam element 20R1.

The illumination switch 22 enables the spectral imaging microscope 12 to selectively switch between transmission mode and reflection mode. In particular, in this embodiment, the illumination switch 22 can be utilized to selectively activate the element mover 20M to move the first reflection beam element 20R1 out of the path of the illumination beam 16, i.e., when the spectral imaging microscope 12 is being utilized in transmission mode; or to move the first reflection beam element 20R1 into the path of the illumination beam 16, i.e., when the spectral imaging microscope 12 is being utilized in reflection mode.

Moreover, in reflection mode, as illustrated in FIG. 1A, the illumination beam 16 is directed at the sample 10 with the beam splitter 26. The design of the beam splitter 26 can be varied to suit the specific requirements of the spectral imaging microscope 12. In certain embodiments, the beam splitter 26, e.g., a fifty percent (50%) beam splitter, can redirect a first portion of the illumination beam 16 toward the sample 10, and transmit a second portion (not shown) of the illumination rays 16A of the illumination beam 16. The second portion of the illumination beam 16 is subsequently directed away from the system and not used by the spectral imaging microscope 12. It should be noted that the second (or discarded) portion of the illumination beam 16 that is generated from this first pass through the beam splitter 26 is not shown in FIG. 1A for purposes of clarity.

In certain embodiments, the beam splitter 26 can be made from a variety of infrared transmissive materials, such as ZnSe or Ge, or other materials. Additionally, the beam splitter 26 can be a plano-piano beam splitter, with one side anti-reflection (AR) coated, and the other coated or uncoated for partial reflectivity. The beam splitter 26 can also provide lensing action for transforming the illumination beam 16 as desired. The beam splitter 26 can also incorporate design elements to eliminate first and second surface interference effects due to the coherent nature of the illumination beam 16. As non-exclusive examples, design elements that would reduce the surface interference effects include anti-reflective coatings (for the optical frequency of the beam), wedged elements, and/or curved optical surfaces.

The objective lens assembly 24 can have any suitable design depending on the specific requirements of the spectral imaging microscope 12. When the illumination rays 16A of the illumination beam 16 are illuminating the sample 10 in transmission mode, at least a portion of the transmitted rays 16T that are transmitted through the sample 10 are received by the objective lens assembly 24 and imaged on the image sensor 28. Somewhat similarly, when the illumination rays 16A of the illumination beam 16 are illuminating the sample 10 in reflection mode, at least a portion of the reflected rays 16R that are reflected from the sample 10 are received by the objective lens assembly 24 and imaged on the image sensor 28. Stated in another fashion, the objective lens assembly 24 receives at least a portion of the transmitted rays 16T that are transmitted through the sample 10, or at least a portion of the reflected rays 16R that are reflected from the sample 10 and forms an image on the image sensor 28.

As utilized herein, the term "imaged rays" 16I shall mean the transmitted rays 16T or the reflected rays 16R that are collected by the objective lens assembly 24 and imaged on the image sensor 28. As provided herein, the objective lens assembly 24 receives the imaged rays 16I from a plurality of points on the sample 10 and forms the image on the image sensor 28.

In one embodiment, the objective lens assembly 24 can include a first refractive element 24A and a second refractive element 24B that cooperate to form an image of the sample 10 on the image sensor 28. Alternatively, the objective lens assembly 24 can include greater than two refractive elements or only one refractive element.

In one embodiment, the first refractive element 24A can be an objective lens that collects the imaged rays 16I, and focuses the imaged rays 16I on the image sensor 28. Moreover, as illustrated, the first refractive element 24A is positioned substantially between the sample 10 and the second refractive element 24B. Additionally, in one embodiment, the second refractive element 24B can be a projection lens that projects the imaged rays 16I toward the image sensor 28. Moreover, as illustrated, the second refractive element 24B is positioned substantially between the first refractive element 24A and the image sensor 28. Further, in certain embodiments, each of the refractive elements 24A, 24B can be refractive in the MIR range and/or the optical frequency of the illumination beam 16. Still further, one or both of the refractive elements 24A, 24B can be a compound lens. Moreover, as described in greater detail herein below, pursuant to the teachings of the present invention, the refractive elements 24A, 24B can have thicknesses and spacing (i.e. separation) that inhibit wavelength-dependent noise, e.g., parasitic etalon modulations, from adversely impacting the image quality and optical spectral resolution of the spectra generated from the set of wavelength dependent spectral images 13A, 13B, 13C of the sample 10 that are being generated.

In one embodiment, each refractive element in the spectral imaging device 12 has an element optical thickness, t, that is defined by either $t \geq 1/(2n\Delta v)$ or $t \leq 1/(2n(v_2-v_1))$; and the spacing (separation distance, d) between adjacent refractive elements is defined by either $d \geq 1/(2n\Delta v)$ or $d \leq 1/(2n(v_2-v_1))$; where n is refractive index of the respective refractive element, $\Delta v$ is the desired spectral resolution, $v_1$ is a lower bound of the desired tuning range, and $v_2$ is an upper bound of the desired tuning range. Alternatively, each refractive element is defined by both $t \geq 1/(2n\Delta v)$ or $t \leq 1/(2n(v_2-v_1))$; and the spacing (separation distance, d) is defined by both $d \geq 1/(2n\Delta v)$ or $d \leq 1/(2n(v_2-v_1))$.

It should be appreciated that the fluid, e.g., air or another suitable fluid that fills the spacing between the refractive elements 24A, 24B, and the spacing between the refractive elements 24A, 24B and the image sensor 28 also function as optical elements that can be refractive in the MIR range.

Each of the refractive elements 24A, 24B in the spectral imaging device 12 is operative in the desired tuning range of the spectral imaging device 12 and can be types such as plano-convex, plano-concave, meniscus, and aspherical, as well as other types. For refractive lenses in the MIR range, materials such as Ge, ZnSe, ZnS, Si, CaF, BaF or chalcogenide glass and other materials can be employed. Reflective lenses can be elliptical, paraboloid, or other shapes. The reflective surface can be dichroic coating, Au, Ag, or other surface types.

Further, as shown in the embodiment illustrated in FIG. 1A, the imaged rays 16I, i.e., the transmitted rays 16T or the reflected rays 16R, that are collected and focused by the first refractive element 24A and the second refractive element 24B of the objective lens assembly 24 are directed at the beam splitter 26. In this embodiment, if the beam splitter 26 is a fifty percent (50%) beam splitter, the transmitted rays 16T or the reflected rays 16R can be split into (i) the imaged rays 16I that are imaged on the image sensor 28, and (ii) discarded rays that are directed away from the image sensor 28.

It should be further appreciated that when the spectral imaging device 12 is being utilized in transmission mode, the illumination switch 22 can further activate a splitter mover 26M that moves the beam splitter 26 out of the way (out of the beam path) of the transmitted rays 16T, as the beam splitter 26 is not necessary for directing the illumination beam 16 toward the sample 10 (such as is required in the reflection mode in this embodiment).

In various embodiments, the image sensor 28 can include a two-dimensional array of sensors that are used to capture and accumulate a two-dimensional array of data (data at each pixel). Additionally, the design of the image sensor 28 can be varied to correspond to the optical frequency range of the illumination beam 16, i.e., of the imaged rays 16I. For example, for a MIR beam 16, the image sensor 28 can be an infrared camera that includes an image sensor that senses infrared light and converts the infrared light into an array of electronic signals that represents an image of the sample. Stated in another fashion, if the illumination beam 16 is in the MIR range, the image sensor 28 can be a MIR imager. More specifically, if the illumination beam 16 is in the infrared spectral region from two to twenty μm, the image sensor 28 is sensitive to the infrared spectral region from two to twenty μm.

Non-exclusive examples of suitable infrared image sensors 28 include (i) vanadium oxide ($VO_x$) and amorphous silicon microbolometer arrays such as the FPA in the FLIR Tau 640 infrared camera that are typically responsive in the seven to fourteen μm spectral range; (ii) mercury cadmium telluride (HgCdTe or MCT) arrays such as those in the FLIR Orion SC7000 Series cameras that are responsive in the 7.7 to 11.5 μm spectral range; (iii) indium antimonide (InSb) arrays such as those in the FLIR Orion SC7000 Series cameras that are responsive in the 1.5 to 5.5 μm spectral range; (iv) indium gallium arsenide (InGaAs); (v) uncooled hybrid arrays involving $VO_x$ and other materials from DRS that are responsive in the two to twenty μm spectral range; or (vi) any other type of image sensor that is designed to be sensitive to infrared light in the two to twenty μm range and has electronics allowing reading out of each element's signal level to generate a two-dimensional array of image information (data).

In one specific embodiment, the image sensor 28 is a microbolometer that includes a two-dimensional array of photosensitive elements (pixels) that are sensitive to the optical frequency of the illumination beam 16. Stated in another fashion, in one embodiment, the image sensor 28 is a micro-electromechanical systems (MEMS) device fabricated in such a way as to create a plurality of small bolometer pixel elements that is thermally isolated from the underlying substrate. The spacing between the pixel elements is referred to as the pitch of the array. As non-exclusive examples, the two-dimensional array can include approximately 640×480; 320×240; 480×480; 80×60; 1080× 720; 120×120; 240×240; or 480×640 pixels. It should be noted that the information from the pixels can be used to generate the output images 13A, 13B, 13C and/or the spectral cube 13.

During use of the spectral imaging device 12, it is desired to improve the spectral resolution and quality of the two-dimensional data of images of the sample 10 and the spectral cube. More specifically, in various applications, it is desired to inhibit various noise sources from adversely impacting the quality of the two-dimensional data of the images 13A, 13B, 13C of the sample 10 that are being generated. Stated in another manner, in such applications, it is desired to improve the signal-to-noise ratio (SNR) of the ratioed images of the sample 10.

Unfortunately, in real systems, various random and systematic noise sources may exist which can cause a diminished and/or undesired SNR. Examples of random noise sources include, but are not limited to, quantum (Shot) and thermal (Johnson) noise in the image sensor 28, amplitude and frequency fluctuations of the illumination source, and random fluctuations in the transmittance of components contained within the spectral imaging device 12. Examples of systematic noise sources include, but are not limited to, the drift in illumination intensity, frequency, and the directional pointing of the source between trials.

An additional wavelength-dependent noise source in spectroscopic imaging systems can arise as a result from multiple reflections from surfaces and edges of the refractive elements within the spectral imaging device 12. For spectral imaging devices 12 which employ temporally coherent illumination sources 14 such as a laser or optically filtered broad band sources, the complex electric fields of the multiple reflected beams will add coherently to produce an optical frequency dependent transmittance as a result of constructive and destructive interference.

Figure 2:
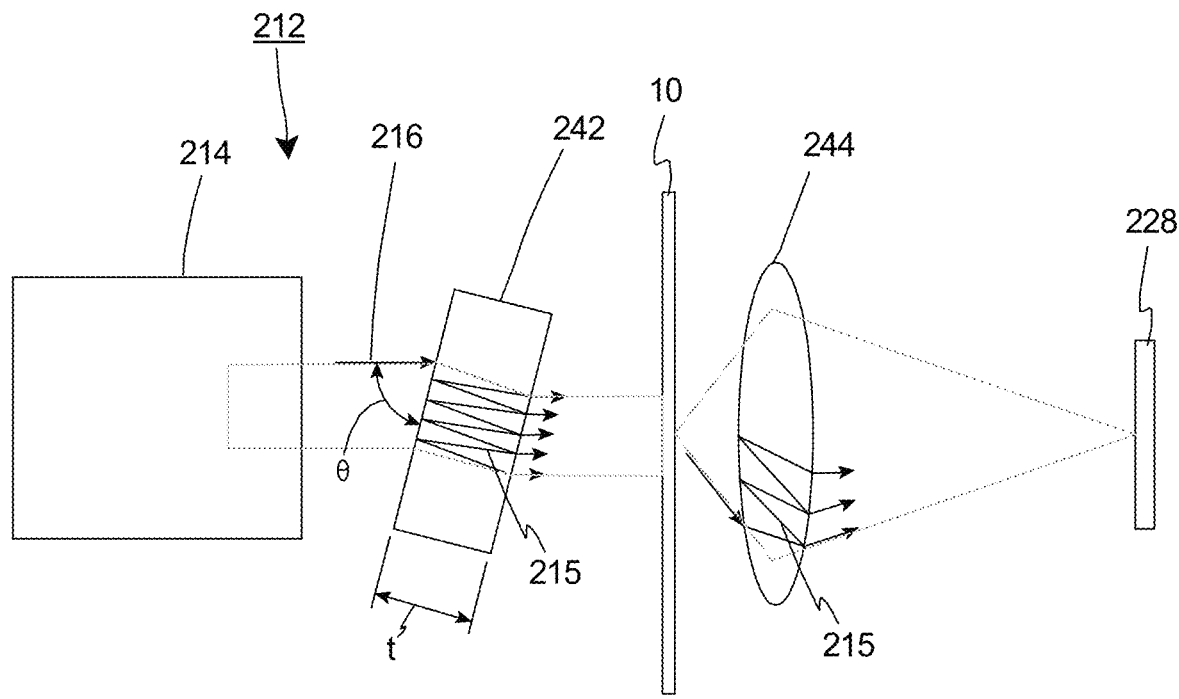
FIG. 2 is a simplified schematic illustration of a spectral imaging device.

FIG. 2 is an illustration of a simplified spectral imaging device 212 that facilitates the discussion of examples of situations where such multiple reflections can adversely impact the quality of the images (not shown in FIG. 2) being generated of the sample 10 with an image sensor 228. More particularly, FIG. 2 is a simplified schematic illustration of reflections 215 being generated when an illumination beam 216 from an illumination source 214 is transmitted through refractive elements. One example is that of a transparent window 242 having a physical thickness of "t" along the beam path and two surfaces each having a small but finite reflectance, R. Typically these surfaces are coated with anti-reflection coatings which are designed to minimize the magnitude of reflectance for all optical frequencies contained within the instrument measurement band. However, it is difficult in practice to achieve surface reflectivity values that are sufficiently low across the entire tuning range of the illumination source without increasing the cost of the system substantially and therefore some amount of reflectivity must be tolerated. As a result of the small but finite residual reflectivity of the component surfaces, multiple reflections will add up on the image plane of the image sensing device 228 to produce an optical frequency-dependent intensity modulation. In this case, the window 242, e.g., refractive element, acts as a parasitic Fabry-Perot etalon (FPE).

In another example, refractive elements such as lenses 244 having curved surfaces and finite thicknesses and separation distances between elements, may also act as sources of multiple reflections 215 and as a consequence produce undesired optical frequency dependent intensity modulation. Though the exact optical frequency-dependent intensity modulation characteristic for lenses 244 differs from that of the Fabry-Perot etalon, the general principle of the Fabry-Perot etalon captures the essence of the physical principles.

It should be appreciated that the examples illustrated in FIG. 2 are non-exclusive, and that reflections can occur as a result of any of the refractive elements in the path of the illumination beam 16 including air gap spacings between refractive elements.

For the embodiment illustrated in FIG. 2, the transmittance of an etalon depends on the optical frequency (wavenumber) of the illumination beam 216, the index of refraction of the material (n) of the refractive element 242, the angle of incidence (θ) of the illumination beam 216 on the refractive element 242, the surface reflectance (R) of the refractive element 242, and the physical thickness (t) of refractive element 242 along the beam path. Since the thickness and index of refraction are temperature dependent, the transmittance therefore also depends on the ambient temperature.

The optical frequency dependence of a Fabry-Perot etalon can be described using the Airy function as follows:

$$T = \frac{T_{max}}{1 + F \cdot \sin^2(\delta/2)}. \quad \text{Equation (1)}$$

In Equation (1) and elsewhere, (i) T is the transmittance; (ii) $T_{max}$ is maximum transmittance; (iii) F is Finesse; and (iv) δ is the Airy function argument. $T_{max}$ can be calculated as provided below:

$$T_{max} = \left(1 - \frac{A}{1-R}\right)^2. \quad \text{Equation (2)}$$

In Equation (2) and elsewhere, (i) A is the absorbance of the refractive element and (ii) R is the surface reflectance.

The Finesse, F can be calculated as follows:

$$F = \frac{4R}{(1-R)^2}. \quad \text{Equation (3)}$$

Further, the Airy function argument δ can be calculated as follows:

$$\delta = 2\beta. \quad \text{Equation (4)}$$

In Equation (4) and elsewhere, β is a parameter that can be calculated as follows:

$$\beta = \frac{2\pi}{\lambda} \Lambda \cos(\theta). \quad \text{Equation (5)}$$

In Equation (5) and elsewhere, λ is the optical frequency of the illumination beam, and Λ is the optical thickness of the refractive element. The optical thickness Λ and can be calculated as follows:

$$\Lambda = n \cdot t. \quad \text{Equation (6)}$$

In Equation (6) and elsewhere, n is the index of refraction of the refractive element and t is the physical thickness of the refractive element. Thus, the optical thickness of the material, Λ, (optical path length through element) is calculated by the product of the index of refraction, n, and the physical thickness of the transparent material, t of the refractive element.

Further, an optical frequency period of modulation $\Delta v_{mod}$ of the transmittance function can be expressed in units of wavenumbers ($cm^{-1}$) as follows:

$$\Delta v_{mod} = \frac{1}{2\Lambda}.$$ Equation (7)

Thus, the modulation of the transmittance is periodic in optical frequency space and is given by the reciprocal of twice the optical thickness of the material, $\Lambda$. Further, the strength of the modulation depends on the reflectivity R of the surfaces and in the range of small values of R (<5%), the peak-to-peak modulation is approximately four times that of the value of surface reflectance. Therefore, for a refractive element, e.g. window, having a reflectance of 2.5%, the peak-to-peak modulation will be approximately 10% and would limit the SNR to about 10:1. As an approximation, the modulation of a refractive element can be estimated by treating it as a Fabry-Perot etalon with an equivalent thickness (t) given by its center thickness.

Figure 3:
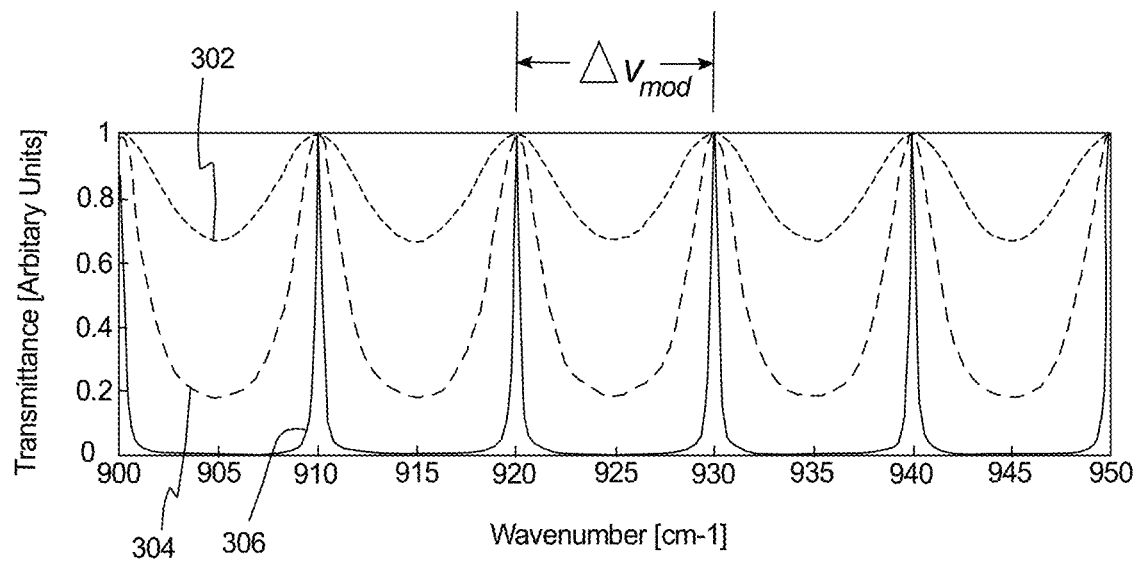
FIG. 3 is a simplified graph that illustrates transmittance versus wavenumber for a refractive element having two surfaces with varying degree of surface reflectances.

FIG. 3 is a simplified graph that illustrates transmittance versus wavenumber for refractive elements having three alternative reflectances, R. Curve 302 (short dashed line) plots the transmittance versus wavenumber for a refractive element having a reflectance of 0.1 (R=0.1); Curve 304 (long dashed line) plots the transmittance versus wavenumber for a refractive element having a reflectance of 0.4 (R=0.4); and Curve 306 (solid line) plots the transmittance versus wavenumber for a refractive element having a reflectance of 0.9 (R=0.9).

In FIG. 3, the optical frequency period of the modulation of the transmittance $\Delta v_{mod}$ is equal to ten cm$^{-1}$ wavenumbers. However, the amount of change in the transmittance varies significantly based on the reflectivity R.

As provided herein, if the background normalization is not performed, the transmittance modulation associated with this refractive element will directly corrupt the spectral data SNR and produce undesirable artifacts in the images. One way to mitigate this effect is to ratio the spectral cube with a background spectral cube. This approach is effective if the optical frequency dependent component modulation and the source optical frequency are highly repeatable from run-to-run. However, in practice, the optical thickness of the parasitic etalons of the system will vary by a small amount due to changes in the environmental temperature, pressure, or stress of the system so as to cause small but significant changes in the transmittance function whose exact dependence on time may not be known a priori. Also, the optical frequency of the coherent light source may vary from run-to-run because of stochastic laser dynamics or imperfections in the tuning mechanisms. These small differences in either the source optical frequency or the parasitic etalon modulation function will result in changes in the transmittance value and therefore limit the SNR of the ratioed images captured by the system. Therefore, further techniques are required to improve the SNR of the system.

Figure 4A:
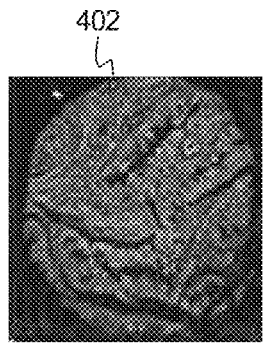
FIG. 4A is a simplified illustration of an ideal image a sample.
Figure 4B:
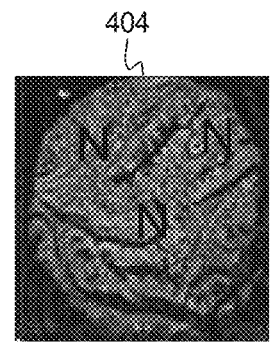
FIG. 4B is a simplified illustration of a first non-ideal image of the sample.

FIG. 4A illustrates an ideal image 402 of the sample that would be captured by the image sensor if all of the noise is eliminated from the spectral imaging device. However, each refractive element will create noise in the captured image. As provided herein, for a given material, reflectance and optical frequency, a thicker refractive element produces a high-Fourier space frequency spectral artifact in the image cube, whereas a thinner refractive element produces a low-Fourier space frequency spectral artifact in the image. FIG. 4B illustrates a first non-ideal image 404 (the image from FIG. 4A plus "N's" that represent noise) of the sample that would be captured by the image sensor if a thin refractive element is in the optical path. FIG. 4B illustrates the concept that if the thin element is used in the system, the resulting first non-ideal image 404 will be somewhat equivalent to the ideal image 402 plus the spectral noise introduced as a result of the thin refractive element (thin parasitic etalon).

Figure 4C:
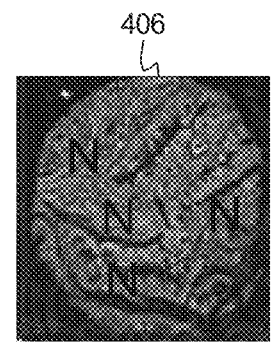
FIG. 4C is a simplified illustration of a second non-ideal image of the sample.

FIG. 4C illustrates a second non-ideal image 406 (the image from FIG. 4A plus "N's" that represent noise) of the sample that would be captured by the image sensor if a thick refractive element is in the optical path. FIG. 4C illustrates the concept that if the thick element is used in the system, the resulting second non-ideal image 406 will be somewhat equivalent to the ideal image 402 plus the spectral noise introduced as a result of the thick refractive element (thick parasitic etalon).

Figure 5A:
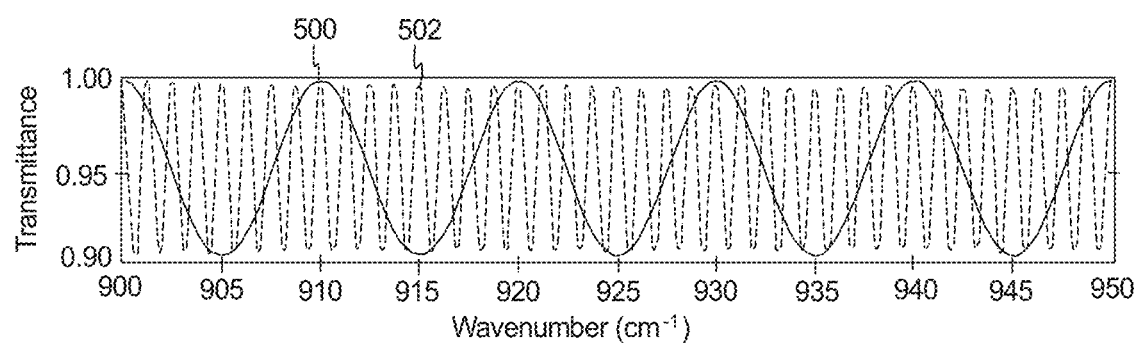
FIG. 5A is a graph of transmittance versus wavenumber in the optical frequency space for two different thickness of refractive elements.

FIG. 5A is a graph of transmittance versus wavenumber in the optical frequency space, that includes a first curve 500 (solid line) that illustrates the transmittance modulation of a refractive element having an optical thickness of 0.5 millimeters ($\Lambda$=0.5 mm.), and a second curve 502 (short dashes) that illustrates the transmittance modulation of a refractive element having an optical thickness of 4 millimeters ($\Lambda$=4 mm.). In this example, the reflectivity (2.5%) and material are the same for both refractive elements. The only difference is the optical thickness. Comparing curve 500 to curve 502, in the optical frequency space, the transmittance modulation has a longer period between maxima for the thinner element than for the thicker element.

Figure 5B:
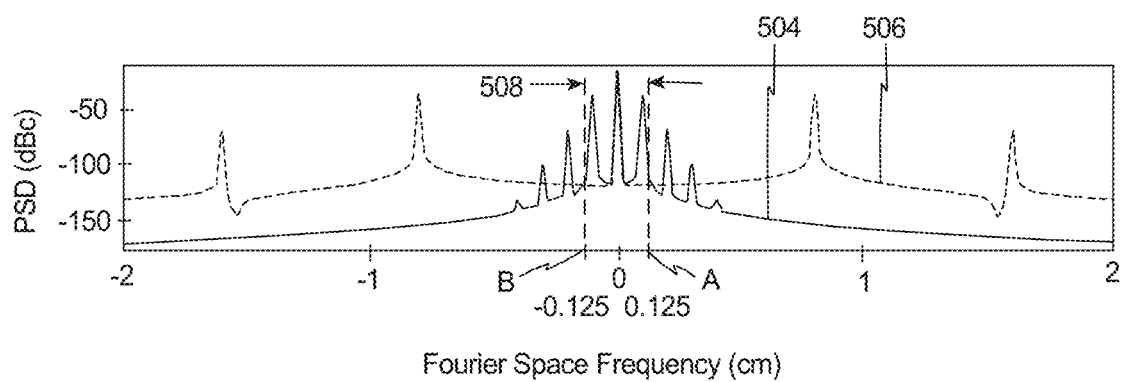
FIG. 5B is a graph that illustrates the power spectral density versus Fourier space frequency in the Fourier Space of the two refractive elements shown in FIG. 5A.

A useful way to analyze the effects of the parasitic etalon caused by the refractive elements (e.g., lens and other elements in the optical path) of the spectral imaging device is to examine the optical frequency modulation function in the reciprocal Fourier frequency space having units of inverse wavenumber of centimeter (cm). This can be accomplished by applying a Fourier transform to the modulation transfer function of the etalon from FIG. 5A. More specifically, FIG. 5B is a graph that illustrates the Fourier space power spectral density ("PSD") versus Fourier space frequency in the Fourier Space, that includes a first curve 504 (solid line) that illustrates the transmittance modulation of the refractive element having the optical thickness of 0.5 millimeters ($\Lambda$=0.5 mm.), and a second curve 506 (short dashes) that illustrates the transmittance modulation of the refractive element having an optical thickness of 4 millimeters ($\Lambda$=4 mm.). Again, in this example, the reflectivity (2.5%) and material are the same for both refractive elements. The only difference is the optical thickness.

Comparing curve 504 to curve 506, in the Fourier space frequency, the transmittance modulation of the thinner refractive element is concentrated near zero centimeters, and transmittance modulation of the thicker refractive element is spread out along the Fourier space and not concentrated near zero centimeters. Further, when the refractive element is optically thinner (0.5 mm versus 4 mm), the Fourier frequency space components of the parasitic etalon are lower.

As provided above, the spectral imaging device 12 includes a Fourier space measurement pass band 508 (also referred to as the "pass band") which is the reciprocal of the desired spectral resolution. In one embodiment, the upper limit A, and lower limit B, of the pass band 508 are given by A=1/(2$\Delta v$), and B=−1/(2$\Delta v$), where $\Delta v$, is the desired spectral resolution that the spectral imaging device is designed to achieve. For example, in this non-exclusive example, the desired spectral resolution is 4 cm$^{-1}$ ($\Delta v$=4 cm$^{-1}$). The Fourier measurement pass band for this non-exclusive embodiment would therefore have an upper limit A, and the lower limit B of the pass band 508 in Fourier space 0.125 cm (2 cm$^{-1}$) and −0.125 cm (−2 cm$^{-1}$), respectively.

As illustrated in FIG. 5B, the Fourier space representation of the modulation shows that the thinner etalon produces non-dc components within a typical measurement pass band of 0.25 cm.

With reference to both FIGS. 5A and 5B, the thinner refractive element ($\Lambda=0.5$ mm) has Fourier components (curve 504) that fall squarely within the pass band 508, whereas many of the Fourier components (curve 506) of the thicker refractive element ($\Lambda=4$ mm) fall outside of the pass band 508.

Figure 6A:
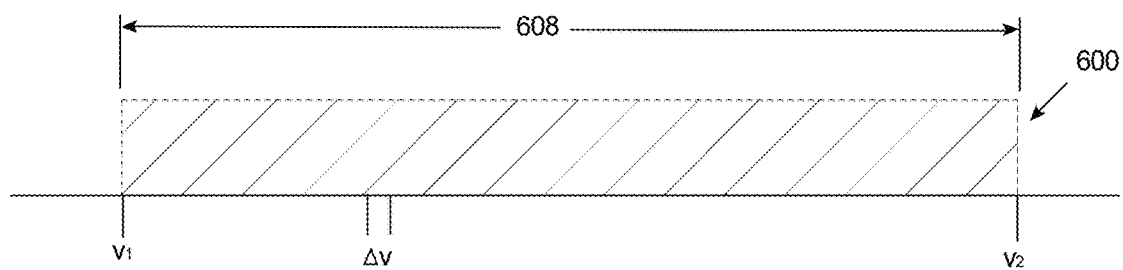
FIG. 6A is a simplified illustration of the optical frequency space for an spectral imaging device.

FIG. 6A is a simplified illustration of the optical frequency space 600 for an spectral imaging device. FIG. 6A also illustrates the spectral measurement range 607, the desired spectral resolution $\Delta v$; the lower bound of the spectral band $v_1$; and the upper bound of the spectral band, $v_2$.

Figure 6B:
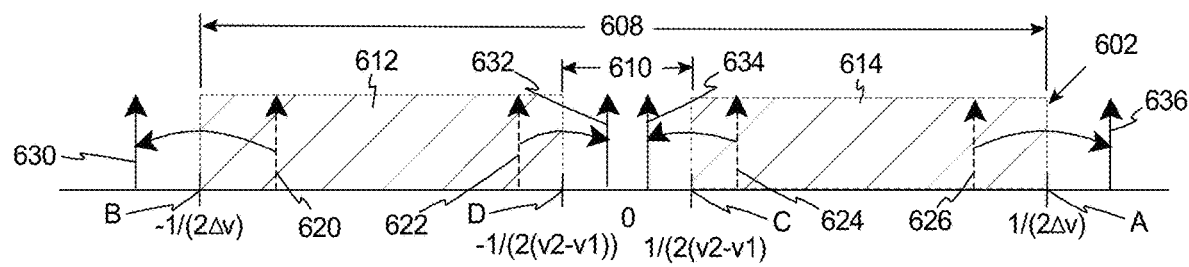
FIG. 6B is a simplified illustration of the corresponding Fourier space for the spectral imaging device.

FIG. 6B is a simplified illustration of the corresponding Fourier space 602 for the spectral imaging device, including the pass band 608. As provided herein, the pass band 608 includes a gap 610 in the pass band 608 that exists near the origin of Fourier space 602 due to the finite optical frequency range of the spectral imaging system. Because of the gap 610, the pass band 608 includes a negative Fourier space partition 612 and a positive Fourier space partition 614 that are spaced apart and separated by the gap 610.

This gap 610 has upper limit C, determined with equation $C=1/(2(2(v_2-v_1))$ and a lower limit D, determined with equation $D=-1/(2(v_2-v_1))$, where $v_2$ and $v_1$ are the upper and lower bounds of the optical frequency range covered by the spectroscopic imaging system. Further, as provided above, the upper limit A, and lower limit B, of the pass band 508 are given by $A=1/(2\Delta v)$, and $B=-1/(2\Delta v)$.

In one, non-exclusive embodiment, for an IR imaging system covering the 900-1800 cm$^{-1}$ spectral range and having a spectral resolution of 4 cm$^{-1}$, the pass band will have the following four values: A=1.25 mm; B=-0.125 mm; C=+5.55 um; and D=-5.5 um.

As provided herein, the architecture of the spectral imaging device can be adjusted and designed so that parasitic etalon modulation Fourier space components fall outside of the negative Fourier space partition 612 and the positive Fourier space partition 614 of the measurement pass band 608. This can be accomplished by designing and positioning the refractive elements in the spectral imaging device so that the optical thickness of parasitic etalons are outside the negative Fourier space partition 612 and the positive Fourier space partition 614.

FIG. 6B illustrates a non-optimized design that includes (i) a Fourier space component of a first parasitic etalon component 620 (illustrated with a dashed arrow); (ii) a Fourier space component of a second parasitic etalon component 622 (illustrated with a dashed arrow); (iii) a Fourier space component of a third parasitic etalon component 624 (illustrated with a dashed arrow); and (iv) a Fourier space component of a fourth parasitic etalon component 626 (illustrated with a dashed arrow). In this non-optimized design, (i) the first and second etalon components 620, 622 are in the negative Fourier space partition 612 of the pass band 608; and (ii) the third and fourth etalon components 624, 626 are in the positive Fourier space partition 614 of the pass band 608.

As provided herein, the architecture of the spectral imaging device can be adjusted and designed to move the (i) the first and second etalon components 620, 622 out of the negative Fourier space partition 612 of the pass band 608; and (ii) the third and fourth etalon components 624, 626 out of the positive Fourier space partition 614 of the pass band 608. More specifically, the architecture of the spectral imaging device can be adjusted to shift and move (i) the first etalon component 620 out the negative Fourier space partition 612 of the pass band 608 as illustrated by solid arrow 630; (ii) the second etalon component 622 out the negative Fourier space partition 612 of the pass band 608 as illustrated by solid arrow 632 into the gap 610; (iii) the third etalon component 624 out the positive Fourier space partition 614 of the pass band 608 as illustrated by solid arrow 634 into the gap 610; and (iv) the fourth etalon component 626 out the positive Fourier space partition 614 of the pass band 608 as illustrated by solid arrow 636.

Stated in another fashion, the architecture of the refractive elements of the spectral imaging device are (i) sufficiently thick to move the Fourier space components of the first and fourth parasitic etalon components 620, 626 higher than the pass band upper and lower limits; or (ii) sufficiently thin so as to push the Fourier space components of the second and third parasitic etalon components 622, 624 between the positive and negative pass band regions. In FIG. 6B, the dashed arrows 620, 622, 624, 626 illustrate parasitic etalon components prior to shifting, while the solid line arrows illustrate parasitic etalon components 630, 632, 634, 634 after shifting.

Thus, in certain embodiments, by properly designing the system, parasitic etalon components 620, 622, 624, 626 are shifted out of the operating pass band by forcing optical path length of parasitic etalons to be greater than ½$\Delta v$. A non-exclusive example, of typical parameter values for a mid-infrared spectroscopic imaging system are $\Delta v=4$ cm$^{-1}$, v1=900 cm$^{-1}$, v2=1800 cm$^{-1}$. In this example, in Fourier space, these parameters create a positive and negative pass band range of +5.56 to +1250 μm and -5.56 to -1250 μm respectively.

Returning back to FIG. 1B, as noted above, FIG. 1B is a simplified schematic illustration of a transmission beam path 50 of the illumination beam 16 from the illumination source 14 of the spectral imaging microscope 12, with the sample 10 being interrogated via transmission of the illumination beam 16 through the sample 10. In particular, FIG. 1B illustrates the various components of the spectral imaging microscope 12 that are utilized when the sample 10 is being interrogated in transmission mode. It should be appreciated that the additional components of the spectral imaging microscope 12 that are only utilized when the sample 10 is being interrogated in reflection mode have been omitted from FIG. 1B for purposes of clarity and ease of description.

As illustrated in FIG. 1B, when being utilized in transmission mode, the components of the spectral imaging microscope 12 include the illumination source 14 which generates and/or emits the illumination beam 16, the transmission beam steerer 20T, the image sensor 28, and various optical elements, e.g., refractive elements, including such refractive elements that make up the transmission illumination optical assembly 18T and the objective lens assembly 24. As utilized herein, such optical elements, including the refractive elements that make up the transmission illumination optical assembly 18T and the objective lens assembly 24, can be referred to generally as a "transmission optical assembly".

More specifically, as shown, the transmission optical assembly can include (i) a first refractive element 46A, e.g., a window; (ii) a second refractive element 46B, e.g., a refractive lens; (iii) a third refractive element 46C, e.g., a window; (iv) a fourth refractive element 46D, e.g., including the sample 10 and/or any slide that can be utilized for the sample 10; (v) a fifth refractive element 46E, e.g., the first refractive lens 24A of the objective lens assembly 24; (vi) a sixth refractive element 46F, e.g., the second refractive lens 24B of the objective lens assembly 24; and (vii) a seventh refractive element 46G, e.g., a window positioned near to and/or in front of the image sensor 28. Moreover, each of the refractive elements 46A-46G are spaced apart from one another, as well as being spaced apart from the illumination source 14 and the transmission beam steerer 20T.

As illustrated in this embodiment, when being used in transmission mode, the transmission beam path 50 of the illumination beam 16 follows from the illumination source 14 to the first refractive element 46A, to the second refractive element 46B, to the transmission beam steerer 20T, to the third refractive element 46C, to the fourth refractive element 46D (including the sample 10), to the fifth refractive element 46E, to the sixth refractive element 46F, to the seventh refractive element 46G, and finally to the image sensor 28.

Additionally, as provided herein, the thickness of each of the refractive elements 46A-46G, as well as the spacing (also referred to herein as a "separation distance") between each of the components is specifically designed such that Fourier space components of the transmittance function for each of the refractive elements 46A-46G and each of the separation distances fall outside the measurement pass band. For example, (i) the first refractive element 46A has a first element optical thickness, $t_1$; (ii) the second refractive element 46B has a second element optical thickness, $t_2$; (iii) the third refractive element 46C has a third element optical thickness, $t_3$; (iv) the fourth refractive element 46D has a fourth element optical thickness, $t_4$; (v) the fifth refractive element 46E has a fifth element optical thickness, $t_5$; (vi) the sixth refractive element 46F has a sixth element optical thickness, $t_6$; and (vii) the seventh refractive element 46G has a seventh element optical thickness, $t_7$, which are each designed to have a Fourier space component of the transmittance function that falls outside the measurement pass band.

Further, (i) a first separation distance, $d_1$, between the illumination source 14 and the first refractive element 46A; (ii) a second separation distance, $d_2$, between the first refractive element 46A and the second refractive element 46B; (iii) a third separation distance, $d_3$, between the second refractive element 46B and the transmission beam steerer 20T; (iv) a fourth separation distance, $d_4$, between the transmission beam steerer 20T and the third refractive element 46C; (v) a fifth separation distance, $d_5$, between the third refractive element 46C and the fourth refractive element 46D; (vi) a sixth separation distance, $d_6$, between the fourth refractive element 46D and the fifth refractive element 46E; (vii) a seventh separation distance, $d_7$, between the fifth refractive element 46E and the sixth refractive element 46F; and (viii) an eighth separation distance, $d_8$, between the sixth refractive element 46F and the seventh refractive element 46G, are also each designed to have a Fourier space component of the transmittance function that falls outside the measurement pass band.

Additionally, as noted above, FIG. 1C is a simplified schematic illustration of a reflection beam path 52 of the illumination beam 16 from the illumination source 14 of the spectral imaging microscope 12, with the sample 10 being interrogated via reflection of the illumination beam 16 off of the sample 10. In particular, FIG. 1C illustrates the various components of the spectral imaging microscope 12 that are utilized when the sample 10 is being interrogated in reflection mode. It should be appreciated that the additional components of the spectral imaging microscope 12 that are only utilized when the sample 10 is being interrogated in transmission mode have been omitted from FIG. 1C for purposes of clarity and ease of description.

As illustrated in FIG. 1C, when being utilized in reflection mode, the components of the spectral imaging microscope 12 include the illumination source 14 which generates and/or emits the illumination beam 16, the reflection beam steerers 20R1, 20R2, the image sensor 28, and various optical elements, e.g., refractive elements, including the beam splitter 26 and such refractive elements that make up the reflection illumination optical assembly 18R and the objective lens assembly 24. As utilized herein, such optical elements, including the beam splitter 26 and the refractive elements that make up the reflection illumination optical assembly 18R and the objective lens assembly 24, can be referred to generally as a "reflection optical assembly".

More specifically, as shown, the reflection optical assembly can include (i) the first refractive element 46A, e.g., a window; (ii) an eighth refractive element 46H, e.g., a refractive lens; (iii) a ninth refractive element 46I, e.g., the beam splitter 26; (iv) the fourth refractive element 46D, e.g., including the sample 10 and/or any slide that can be utilized for the sample 10; (v) the fifth refractive element 46E, e.g., the first refractive lens 24A of the objective lens assembly 24; (vi) the sixth refractive element 46F, e.g., the second refractive lens 24B of the objective lens assembly 24; and (vii) the seventh refractive element 46G, e.g., a window positioned near to and/or in front of the image sensor 28. Moreover, each of the refractive elements 46A, 46D-46I are spaced apart from one another, as well as being spaced apart from the illumination source 14 and the reflection beam steerers 20R1, 20R2.

As illustrated in this embodiment, when being used in reflection mode, the reflection beam path 52 of the illumination beam 16 follows from the illumination source 14 to the first refractive element 46A, to the first reflection beam steerer 20R1, to the second reflection beam steerer 20R2, to the eighth refractive element 46H, to the ninth refractive element 46I (the beam steerer 26), to the sixth refractive element 46F, to the fifth refractive element 46E, to the fourth refractive element 46D (including the sample 10), back to the fifth refractive element 46E, to the sixth refractive element 46F, to the ninth refractive element 46I (the beam splitter 26), to the seventh refractive element 46G, and finally to the image sensor 28.

Additionally, as provided herein, the thickness of each of the refractive elements 46A, 46D-46I, as well as the spacing (i.e., the "separation distance") between each of the components is specifically designed such that Fourier space components of the transmittance function for each of the refractive elements 46A, 46D-46I and each of the separation distances fall outside the measurement pass band. For example, (i) the first refractive element 46A has the first element optical thickness, $t_1$; (ii) the fourth refractive element 46D has the fourth element optical thickness, $t_4$; (iii) the fifth refractive element 46E has the fifth element optical thickness, $t_5$; (iv) the sixth refractive element 46F has the sixth element optical thickness, $t_6$; (v) the seventh refractive element 46G has the seventh element optical thickness, $t_7$, (vi) the eighth refractive element 46H has an eighth element optical thickness, $t_8$; and (iii) the ninth refractive element 46I has a ninth element optical thickness, $t_9$, which are each designed to have a Fourier space component of the transmittance function that falls outside the measurement pass band.

Further, (i) the first separation distance, $d_1$, between the illumination source 14 and the first refractive element 46A;

(ii) a ninth separation distance, $d_9$, between the first refractive element 46A and the first reflection beam steerer 20R1; (iii) a tenth separation distance, $d_{10}$, between the first reflection beam steerer 20R1 and the second reflection beam steerer 20R2; (iv) an eleventh separation distance, $d_{11}$, between second reflection beam steerer 20R2 and the eighth refractive element 46H; (v) a twelfth separation distance, $d_{12}$, between the eighth refractive element 46H and the ninth refractive element 46I; (vi) the sixth separation distance, $d_6$, between the fourth refractive element 46D and the fifth refractive element 46E; (vii) the seventh separation distance, $d_7$, between the fifth refractive element 46E and the sixth refractive element 46F; and (viii) a thirteenth separation distance, $d_{13}$, between the ninth refractive element 46I and the seventh refractive element 46G, are also each designed to have a Fourier space component of the transmittance function that falls outside the measurement pass band.

Additionally, as provided herein, in certain embodiments, the position (i.e. spacing) of the components and the design (i.e. thickness) of the various components in the spectral imaging device 12 can be adjusted and designed to insure that parasitic etalon modulation occurs outside of the pass band.

Table 1, shown below, provides one, non-exclusive example, of possible element-to-element separation distances ("$d_1$" through "$d_{14}$") and element optical thicknesses ("$t_1$" through "$t_9$") which meet design criteria for the spectral imaging microscope 12. It should be noted that the numbers in Table 1 are based on the spectral imaging microscope 12 being designed to provide a 4 cm$^{-1}$ spectral resolution in each of the embodiments, i.e. in each of the transmission mode and the reflection mode. Additionally, it should be noted that the separation distances and element optical thicknesses may need to be different than those specifically provided in Table 1 to desirably manage the parasitic etalon components, if the design and characteristics of the spectral imaging microscope 12 are changed.

TABLE 1

| Distance/ Thickness Parameter | Minimum Design Criteria | Optimum Design Criteria | Typical range of values in practice |
|---|---|---|---|
| $d_1$ | >1.25 mm | >10 mm | 1.25-500 mm |
| $d_2$ | >1.25 mm | >10 mm | 1.25-500 mm |
| $d_3$ | >1.25 mm | >10 mm | 1.25-500 mm |
| $d_4$ | >1.25 mm | >10 mm | 1.25-500 mm |
| $d_5$ | >1.25 mm | >10 mm | 1.25-500 mm |
| $d_6$ | >1.25 mm | >10 mm | 1.25-500 mm |
| $d_7$ | >1.25 mm | >10 mm | 1.25-500 mm |
| $d_8$ | >1.25 mm | >10 mm | 1.25-500 mm |
| $d_9$ | >1.25 mm | >10 mm | 1.25-500 mm |
| $d_{10}$ | >1.25 mm | >10 mm | 1.25-500 mm |
| $d_{11}$ | >1.25 mm | >10 mm | 1.25-500 mm |
| $d_{12}$ | >1.25 mm | >10 mm | 1.25-500 mm |
| $d_{13}$ | >1.25 mm | >10 mm | 1.25-500 mm |
| $d_{14}$ | >1.25 mm | >10 mm | 1.25-500 mm |
| $t_1$ | >(1.25 mm)/n | >(10 mm)/n | 1-5 mm (n = 1.3-43) |
| $t_2$ | >(1.25 mm)/n | >(10 mm)/n | 1-5 mm (n = 1.3-43) |
| $t_3$ | >(1.25 mm)/n | >(10 mm)/n | 1-5 mm (n = 1.3-43) |
| $T_4$ | >(1.25 mm)/n | >(10 mm)/n | 1-5 mm (n = 1.3-43) |
| $t_5$ | >(1.25 mm)/n | >(10 mm)/n | 1-5 mm (n = 1.3-43) |
| $t_6$ | >(1.25 mm)/n | >(10 mm)/n | 1-5 mm (n = 1.3-43) |
| $t_7$ | >(1.25 mm)/n | >(10 mm)/n | 1-5 mm (n = 1.3-43) |
| $t_8$ | >(1.25 mm)/n | >(10 mm)/n | 1-5 mm (n = 1.3-43) |
| $t_9$ | >(1.25 mm)/n | >(10 mm)/n | 1-5 mm (n = 1.3-43) |

Additionally, as provided herein, the influence of parasitic etalon components can be reduced and managed in other unique ways. For example, with reference to FIG. 1A, as provided above, the spectral imaging device 12 can be controlled to generate a separate output image 13A, 13B, 13C at a plurality of distinct target optical frequencies. With this design, each target optical frequency includes a corresponding output image 13A, 13B, 13C. Subsequently, the control system 30 uses the output images 13A, 13B, 13C to generate the spectral cube 13.

Because the noise is optical frequency dependent, as provided herein, for each target optical frequency, the spectral imaging device 12 can capture a plurality of preliminary images at optical frequencies near or equal to the target optical frequency. Subsequently, for each target optical frequency, the corresponding plurality of preliminary images can be used to generate a corresponding output image having reduced noise for that target optical frequency.

Figure 7A:
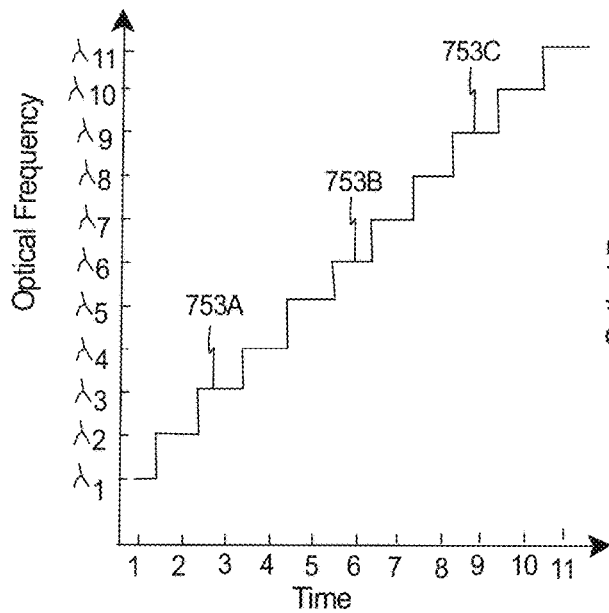
FIG. 7A is a graph that illustrates optical frequency versus time.
Figure 7B:
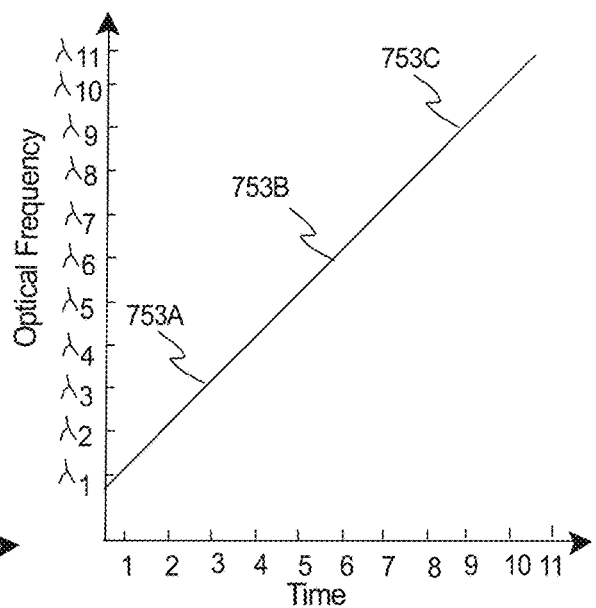
FIG. 7B is another graph that illustrates optical frequency versus time.

FIG. 7A is a graph that illustrates optical frequency versus time. As provided herein, the control system 30 (illustrated in FIG. 1A) can control the tunable illumination source 14 (illustrated in FIG. 1A) to generate an illumination beam 16 (illustrated in FIG. 1A) having a center optical frequency that changes in a stepped pattern from a first optical frequency to an eleventh optical frequency over time. Somewhat similarly, FIG. 7B is a graph that illustrates optical frequency versus time. In this example, the control system 30 (illustrated in FIG. 1A) controls the tunable illumination source 14 (illustrated in FIG. 1A) to generate an illumination beam 16 (illustrated in FIG. 1A) having a center optical frequency that changes in a linear fashion from a first optical frequency to an eleventh optical frequency over time. It should be noted that the optical frequency can be adjusted in another fashion than illustrated in FIGS. 7A and 7B.

In these examples, the first through eleventh optical frequencies are each within the desired tuning range of the spectral imaging device 12 (illustrated in FIG. 1A). Further, in these simplified examples, (i) at time one the illumination beam 16 has a center optical frequency of one; (ii) at time two the illumination beam 16 has a center optical frequency of two; (iii) at time three the illumination beam 16 has a center optical frequency of three; (iv) at time four the illumination beam 16 has a center optical frequency of four; (v) at time five the illumination beam 16 has a center optical frequency of five; (vi) at time six the illumination beam 16 has a center optical frequency of six; (vii) at time seven the illumination beam 16 has a center optical frequency of seven; (viii) at time eight the illumination beam 16 has a center optical frequency of eight; (ix) at time nine the illumination beam 16 has a center optical frequency of nine; (x) at time ten the illumination beam 16 has a center optical frequency of ten; and (xi) at time eleven the illumination beam 16 has a center optical frequency of eleven.

It should be noted that one or more of the optical frequencies can be a target optical frequency 753A, 753B, 753C. In this non-exclusive example, optical frequencies three, six and nine are target optical frequencies 753A, 753B, 753C.

Figure 7C:
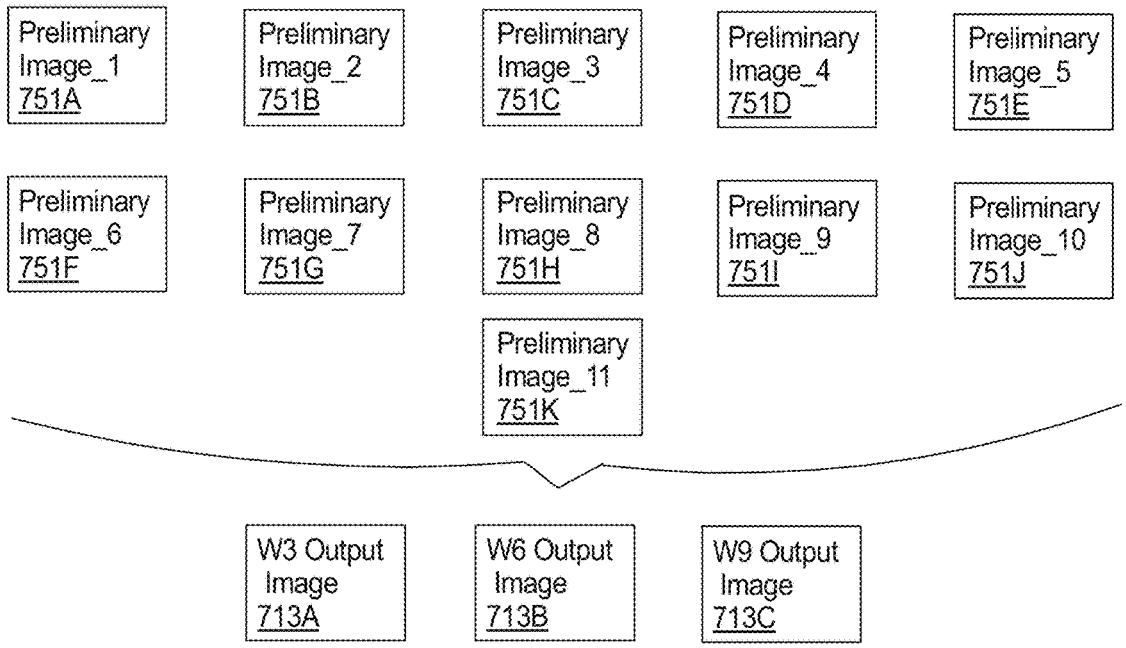
FIG. 7C illustrates a plurality of preliminary images used to generate a separate output image for each target optical frequency.

FIG. 7C illustrates a plurality of preliminary images 751A, 751B, 751C, 751D, 751E, 751F, 751G, 752H, 751I, 751J, 751K that can be used to generate a separate output image 713A, 713B, 713C for each target optical frequency 753A, 753B, 753C (illustrated in FIGS. 7A and 7B)

In this simplified example, with reference to FIGS. 7A-7C, the spectral imaging device 12 (illustrated in FIG. 1A) is controlled to (i) capture a first preliminary ("sampling") image 751A while illuminating the sample 10 (illustrated in FIG. 1A) with the illumination beam 16 (illustrated in FIG. 1A) having the first center optical frequency (at time=1); (ii) capture a second preliminary image 751B while illuminating the sample 10 with the illumination beam 16 having the second center optical frequency (at time=2); (iii) capture a third preliminary image 751C while illuminating the sample 10 with the illumination beam 16 having the third center optical frequency (at time=3); (iv) capture a fourth preliminary image 751D while illuminating the sample 10 with the illumination beam 16 having the fourth center optical frequency (at time=4); (v) capture a fifth preliminary image 751E while illuminating the sample 10 with the illumination beam 16 having the fifth center optical frequency (at time=5); (vi) capture a sixth preliminary image 751F while illuminating the sample 10 with the illumination beam 16 having the sixth center optical frequency (at time=6); (vii) capture a seventh preliminary image 751G while illuminating the sample 10 with the illumination beam 16 having the seventh center optical frequency (at time=7); (viii) capture an eighth preliminary image 751H while illuminating the sample 10 with the illumination beam 16 having the eighth center optical frequency (at time=8); (ix) capture a ninth preliminary image 751I while illuminating the sample 10 with the illumination beam 16 having the ninth center optical frequency (at time=9); (x) capture a tenth preliminary image 751J while illuminating the sample 10 with the illumination beam 16 having the tenth center optical frequency (at time=10); and (xi) capture an eleventh preliminary image 751K while illuminating the sample 10 with the illumination beam 16 having the eleventh center optical frequency (at time=11).

Subsequently, the spectral imaging device 12 uses one or more of the preliminary ("sampling") images 751A-751K to generate the separate target output image 713A, 713B, 713C for each target optical frequency 753A, 753B, 753C. The number of preliminary images 751A-751K used to generate the separate output images 713A, 713B, 713C can vary. As non-exclusive examples, 2, 3, 4, 5, 6, 7 or 8 preliminary images 751A-751K can be used to generate each of the output images 713A, 713B, 713C. Typically, the preliminary images 751A-751K utilized are captured near or at the target optical frequency.

In one example, if five preliminary images 751A-751K are used, (i) the first through fifth preliminary images 751A-751E are used to generate the output image 713A for target optical frequency 753A at optical frequency three; (ii) the fourth through eighth preliminary images 751D-751H are used to generate the output image 713B for target optical frequency 753B at optical frequency six; and (iii) the seventh through eleventh preliminary images 751G-751K are used to generate the output image 713C for target optical frequency 753C at optical frequency nine.

The method used to combine the multiple preliminary images to generate the respective output images can vary. In one, non-exclusive embodiment, the corresponding multiple preliminary images are passed through a low-pass filter to generate the respective output image. Stated in another fashion, a low-pass filter is subsequently applied to the spectral response of each pixel in the respective preliminary images to create an output spectral image at a lower spectral resolution with less noise. In this example, (i) the first through fifth preliminary images 751A-751E are passed through a low-pass filter to generate the output image 713A for target optical frequency 753A at optical frequency three; (ii) the fourth through eighth preliminary images 751D-751H are passed through a low-pass filter to generate the output image 713B for target optical frequency 753B at optical frequency six; and (iii) the seventh through eleventh preliminary images 751G-751K are passed through a low-pass filter to generate the output image 713C for target optical frequency 753C at optical frequency nine.

As non-exclusive examples, the low-pass filter can utilize either a running average or Gaussian filter, and optionally followed by sub-sampling through decimation. One such method is to perform a simple average of the collected data points. Another method is to perform a simple average of the data points after the extreme values are removed from the data set. Extreme values may be defined, for example, as those falling outside of a predefined multiple of the root-mean-square of the collection. Another method is to pass a low-pass filter over the data set, such as a Chebyshev filter. The low-pass filter may be applied in optical frequency space or in Fourier frequency space and may be performed before or after any ratio taken between a data collection and background data collection.

It should be noted that a sampling optical frequency sampling period (or inverse of the optical frequency sampling rate) between each of the first through eleventh optical frequencies in which preliminary images are captured can be varied pursuant to the teachings provided herein. In certain embodiments, the optical frequency step size is the reciprocal of the sampling rate. In one embodiment, the optical frequency step size is sufficiently small such that it does not produce aliasing of the Fourier frequency components of the optical frequency dependent transmittance function of the parasitic etalons contained along the beam path into the measurement pass band. For example, the optical frequency step size should be less than or equal to the free spectral range (FSR) of the refractive element in the spectral imaging device 12 having the shortest free spectral range of a refractive element in the beam path divided by two.

Stated in another fashion, in certain embodiments, for this method to be effective, the sampling rate must be sufficiently high, and the sampling period, $\Delta v_{sampling}$, sufficiently small, so as to inhibit aliasing of the spurious spectral signal into the measurement pass band. As used herein, the term "sampling rate" shall mean the inverse of the optical frequency sampling period, and the term "sampling period" shall mean optical frequency sampling period $\Delta v_{sampling}$. Aliasing may cause the Fourier frequency components of the spurious spectral signals to shift from outside of the pass band to into the measurement pass band. In such a case, removal of the spurious signals by filtering can be achieved, but at the expense of sacrificing spectral resolution of the system, which is undesired. As non-exclusive examples, the optical frequency sampling period can be approximately within the range 0.1-10 cm$^{-1}$, and specific values of 0.1, 0.25, 0.33, 0.5, 0.67, 0.7, 1.0, 1.5, 2.0, 2.5, 3.33, 5.0, and 10 cm$^{-1}$.

As provided herein, the parasitic etalons have Fourier components which repeat at integer multiples of their free-spectral-range (FSR), and is given by ½ nL in units of wavenumbers. In order to ensure that each spurious component falls outside of the pass band, the measurement samples should be collected at interval optical spacing, $\Delta v_{sampling}$, which are at least as small as half the FSR associated with the parasitic etalon. The FSR should also be smaller than the minimum spectral resolution, $\Delta v$, of the system in order that the spectral resolution is not compromised by the filtering of the spurious signal.

$$\Delta v_{sampling} \leq FSR/2 \leq \Delta v. \quad\quad \text{Equation (8)}$$

Stated in yet another fashion, the control system 30 controls the tunable illumination source 14 to generate a set of discrete sampling optical frequencies near a target optical frequency, with adjacent sampling optical frequencies of the set being spaced apart a sampling optical frequency step, and the sampling optical frequency step being sufficiently small such that it does not produce aliasing of the Fourier components of the optical frequency dependent transmittance function of the parasitic etalons contained along the beam path into the measurement pass band. Further, the control system controls the image sensor to capture or construct a separate, two dimensional sampling image at each discrete sampling optical frequency, and the control system constructs a target output image of the sample for the target optical frequency using the separate two dimensional sampling images at each discrete sampling optical frequency.

As provided herein, the term "sampling optical frequency step" shall mean the smallest allowed difference between adjacent sampling optical frequencies. In alternative, non-exclusive embodiments, the sampling optical frequency step can be approximately 0.1, 0.2, 0.25, 0.33, 0.5, 0.67, 0.7, 1.0, 2.0, 4.0, 8.0, or 16, wavenumbers. In this example, the target optical frequency step (difference between target optical frequencies) is larger than the sampling optical frequency step.

In summary, as provided herein, the influence of parasitic etalon components can be reduced and managed by discrete sampling, filtering, and decimation. First, a plurality of preliminary ("sampling") images are captured. Subsequently, the preliminary images are filtered to create a lower spectral resolution image that can optionally be sub-sampled (e.g., via decimation) to remove the redundant information from now being oversampled. Thus, a collection of spectral images is captured at multiple discrete optical frequencies in the neighborhood of the desired measurement frequency. This collection of data points is then mathematically filtered so as to produce a single higher-fidelity data point.

Figure 8A:
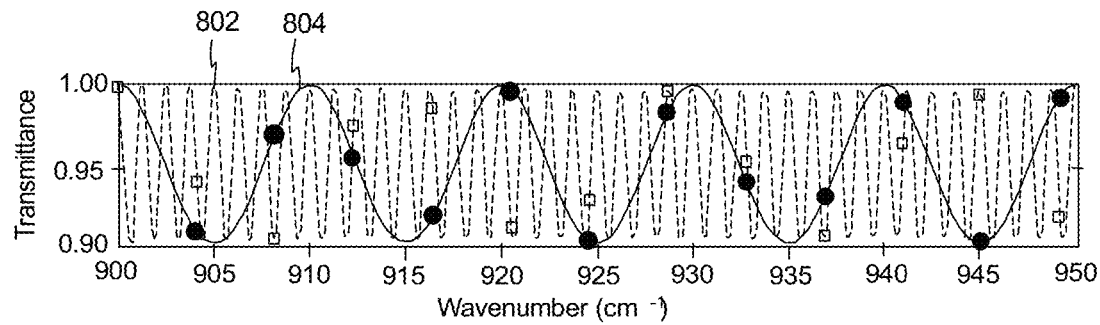
FIG. 8A is a graph of transmittance versus wavenumber in the optical frequency space for two different refractive elements having different thickness with solid circles and open squares showing sampled data points.
Figure 8B:
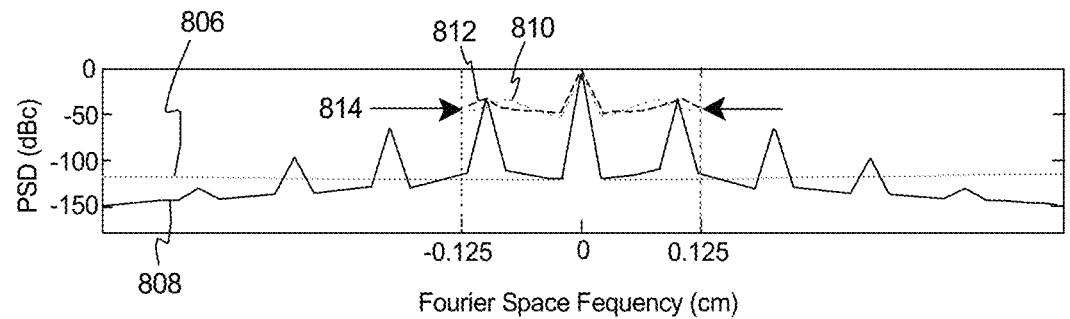
FIG. 8B is a graph in the Fourier frequency space of the sampled transmittance versus wavenumber plots shown in FIG. 8A.

FIGS. 8A and 8B are useful for the further discussion of the method of filtering the coherent noise caused by a parasitic etalon by means of discrete sampling, filtering, and subsequent decimation. The optical frequency sampling period is set by the prescription and is chosen to be sufficiently fine, so as not to introduce spectral leakage due to aliasing into the measurement pass band.

More specifically, FIG. 8A is a graph of transmittance versus wavenumber in the optical frequency space that illustrates (i) the modulation 802 (illustrated with a dashed line) of the first parasitic etalon components for a first refractive element having a first thickness (e.g. t=4 mm), and (ii) the modulation 804 (illustrated with a solid line) of the second parasitic etalon components for a second refractive element having a second thickness (e.g. t=0.5 mm) which is less than the first thickness. In this example, the first element has an optical path that is longer than the second element. The graph in FIG. 8A includes (i) circles that represent discrete samplings of the first parasitic etalon components 1012 sampled at 4.1 $cm^{-1}$, and (ii) solid dots that represent discrete samplings of the of the second etalon components. As a non-exclusive example, the sampling intervals are 4.1 $cm^{-1}$.

FIG. 8B is a graph in the Fourier space frequency that illustrates (i) the modulation 806 (illustrated with a solid gray line) of the first parasitic etalon components of the first refractive element (e.g. t=4 mm), and (ii) the modulation 808 (illustrated with a solid black line) of the second parasitic etalon components of the second optical element (e.g. t=0.5 mm). The graph of FIG. 8B also includes (i) discrete samplings 810 (illustrated with a gray dashed line) of the first parasitic etalon components sampled at 4.1 $cm^{-1}$, and (ii) discrete sampling 812 (illustrated with a black dashed line) of the second etalon components sampled at 4.1 $cm^{-1}$.

A pass band 814 (e.g. a 0.250 cm passband) is also illustrated in FIG. 8B. It should be noted that insufficient sampling at 4.1 $cm^{-1}$ of the first refractive element (t=4 mm) can cause Fourier components of the first parasitic etalon components to leak into the pass band 814.

Figure 9:
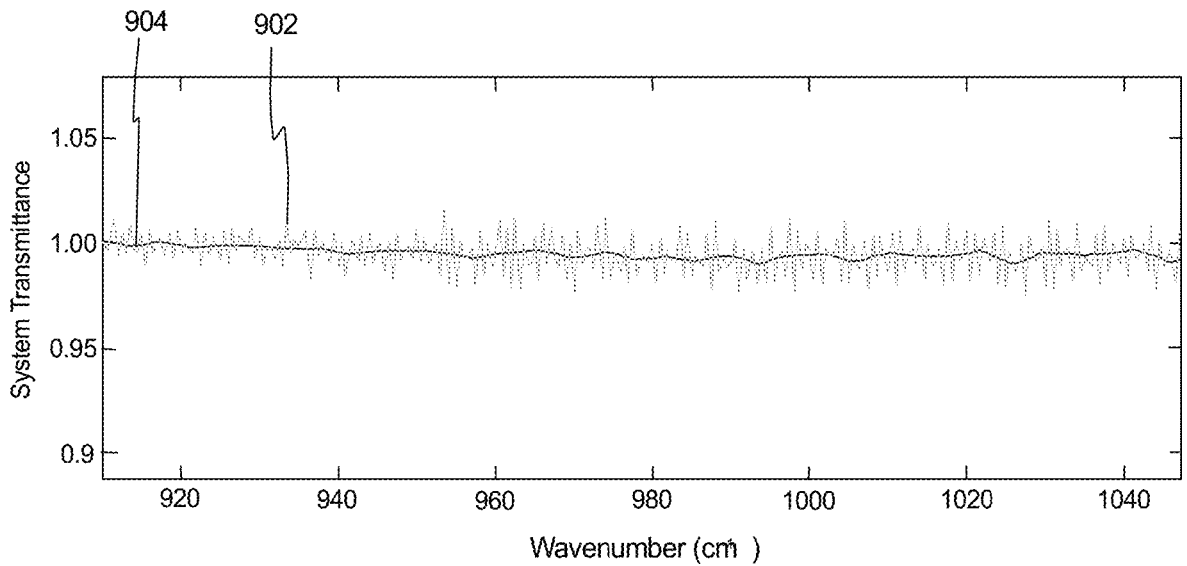
FIG. 9 is a graph in the optical frequency space of a sampled raw signal data and a sampled, averaged, and decimated signal data.

FIG. 9 is a graph in the optical frequency space of a sampled raw signal data 902 (illustrated with a gray line) and a sampled and filtered signal data 904 (illustrated with a black line). As can be seen from FIG. 9, the variation in signal data 902 cause by the parasitic etalon components is greatly reduced by sampling, filtering, and subsequent decimation as seen by line 904. Thus, as provided herein, coherent noise produced by a parasitic etalon can be filtered by means of discrete sampling and filtering.

In yet another embodiment, as provided herein, a reduction in spurious spectral artifacts in the output image can also be achieved through fast source frequency modulation and real-time detector averaging. Stated in another fashion, a reduction in noise can be achieved by rapidly tuning the illumination source 14 to generate an illumination beam 16 having a rapidly varying center optical frequency or optical frequency near a target optical frequency (optical frequency), and slowly capturing the output image with the image sensor 28 during the optical frequency (optical frequency) variation. With this design, for each target optical frequency (optical frequency), the spectral imaging device 12 can dither the optical frequency (optical frequency) of the illumination beam during the capture of the respective output image.

Figure 10A:
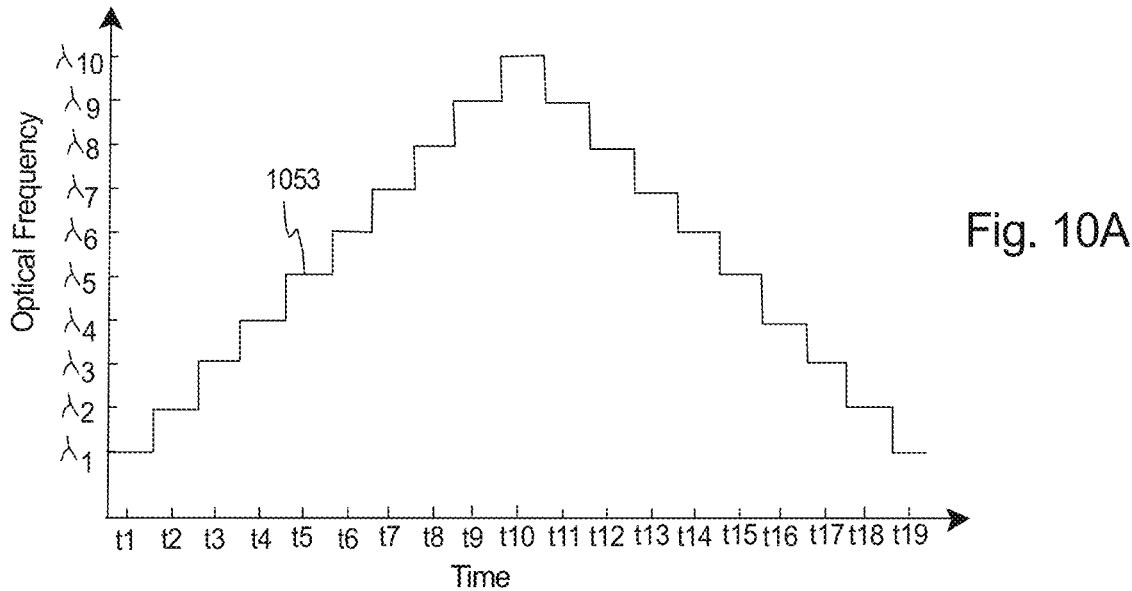
FIG. 10A is a graph that illustrates optical frequency versus time.
Figure 10B:
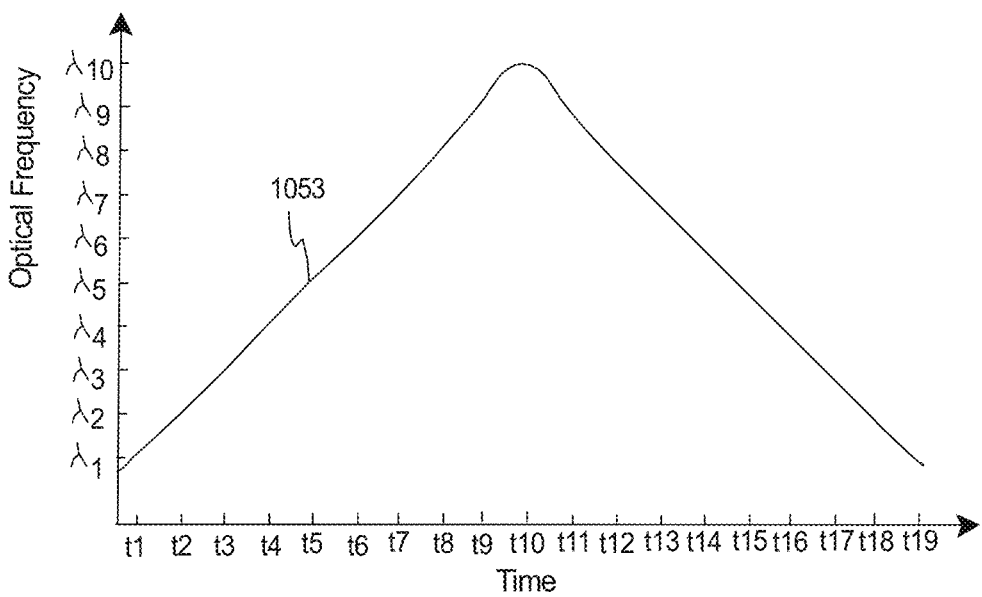
FIG. 10B is another graph that illustrates optical frequency versus time.

FIG. 10A is a graph that illustrates optical frequency versus time. As provided herein, the control system 30 (illustrated in FIG. 1A) can control the tunable illumination source 14 (illustrated in FIG. 1A) to generate an illumination beam 16 (illustrated in FIG. 1A) having a center optical frequency that changes in a stepped pattern from a first optical frequency to a tenth optical frequency and back to the first optical frequency over time. Somewhat similarly, FIG. 10B is a graph that illustrates optical frequency versus time. In this example, the control system 30 (illustrated in FIG. 1A) controls the tunable illumination source 14 (illustrated in FIG. 1A) to generate an illumination beam 16 (illustrated in FIG. 1A) having a center optical frequency that changes in a linear fashion from the first optical frequency to the tenth optical frequency and back to the first optical frequency over time. It should be noted that the optical frequency can be adjusted in another fashion than illustrated in FIGS. 10A and 10B.

In these examples, the first through tenth optical frequencies are each within the desired tuning range of the spectral imaging device 12 (illustrated in FIG. 1A). Further, in these simplified examples, (i) at time one the illumination beam 16 has a center optical frequency of one; (ii) at time two the illumination beam 16 has a center optical frequency of two; (iii) at time three the illumination beam 16 has a center optical frequency of three; (iv) at time four the illumination beam 16 has a center optical frequency of four; (v) at time five the illumination beam 16 has a center optical frequency of five; (vi) at time six the illumination beam 16 has a center optical frequency of six; (vii) at time seven the illumination beam 16 has a center optical frequency of seven; (viii) at time eight the illumination beam 16 has a center optical frequency of eight; (ix) at time nine the illumination beam 16 has a center optical frequency of nine; (x) at time ten the illumination beam 16 has a center optical frequency of ten; (xi) at time eleven the illumination beam 16 has a center optical frequency of nine; (xii) at time twelve the illumination beam 16 has a center optical frequency of eight; (xiii) at time thirteen the illumination beam 16 has a center optical frequency of seven; (xiv) at time fourteen the illumination beam 16 has a center optical frequency of six; (xv) at time fifteen the illumination beam 16 has a center optical frequency of five; (xvi) at time sixteen the illumination beam 16 has a center optical frequency of four; (xvii) at time seventeen the illumination beam 16 has a center optical frequency of three; (xviii) at time eighteen the illumination beam 16 has a center optical frequency of two; and (xiv) at time nineteen the illumination beam 16 has a center optical frequency of one.

It should be noted that one or more of the optical frequencies can be a target optical frequency 1053. In this non-exclusive example, optical frequency five is the target optical frequency 1053.

Figure 10C:
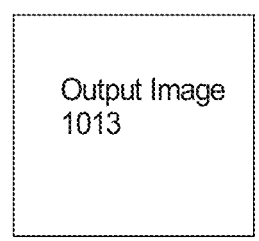
FIG. 10C illustrates an output image.

FIG. 10C illustrates an output image 1013 that is captured while the illumination beam 16 (illustrated in FIG. 1A) is cycled from the first through tenth optical frequency (first half of the cycle) and back from the tenth optical frequency to the first optical frequency (second half of the cycle). In this simplified example, with reference to FIGS. 10A-10C, the spectral imaging device 12 (illustrated in FIG. 1A) is controlled to capture the output image 1013 for the target optical frequency 1053 of optical frequency five while the center optical frequency of the illumination beam 16 is varied (dithered) cycled twice between one and ten optical frequencies. Alternatively, the tunable illumination source 14 can be controlled to dither the optical frequency only one cycle or more than two cycles during the capturing of the output image 1013. As non-exclusive examples, the number of cycles can be approximately 1, 2, 3, 4, 5, 10, 20, 40, 50, 100, or more cycles (but the desired number of cycles is more than 10) during a capture time of the image by the image sensor.

In certain embodiments, the control system 30 (illustrated in FIG. 1A) modulates the tunable light source 14 (illustrated in FIG. 1A) to generate a set of discrete modulation optical frequencies near a target optical frequency to produce a maximum optical frequency modulation, $\Delta v_{modulation}$, about the target optical frequency set point which satisfies the following prescription: $\Delta v_{modulation} = \pm \eta \Delta v/2$, where n is a constant having a value of greater than or equal to 0.1 and less than or equal to 100, and $\Delta v$ is the desired spectral resolution. Further, in this embodiment, the image sensor 28 (illustrated in FIG. 1A) captures the output image during a capture time that is greater than the frequency modulation.

As a non-exclusive examples, the amount of dithering about the target optical frequency of the modulation optical frequencies during the capture time can be approximately plus or minus 0.1, 0.25, 0.33, 0.5, 1, 2, 3, 4, 5, 6, 7, 10, or more wavenumbers.

In summary, the control system can modulate the tunable light source to generate a set of discrete modulation optical frequencies about and through a target optical frequency with an optical frequency modulation rate, and the image sensor can be controlled to capture the target output image during a capture time that is longer than the inverse of the optical frequency modulation rate.

Figure 11:
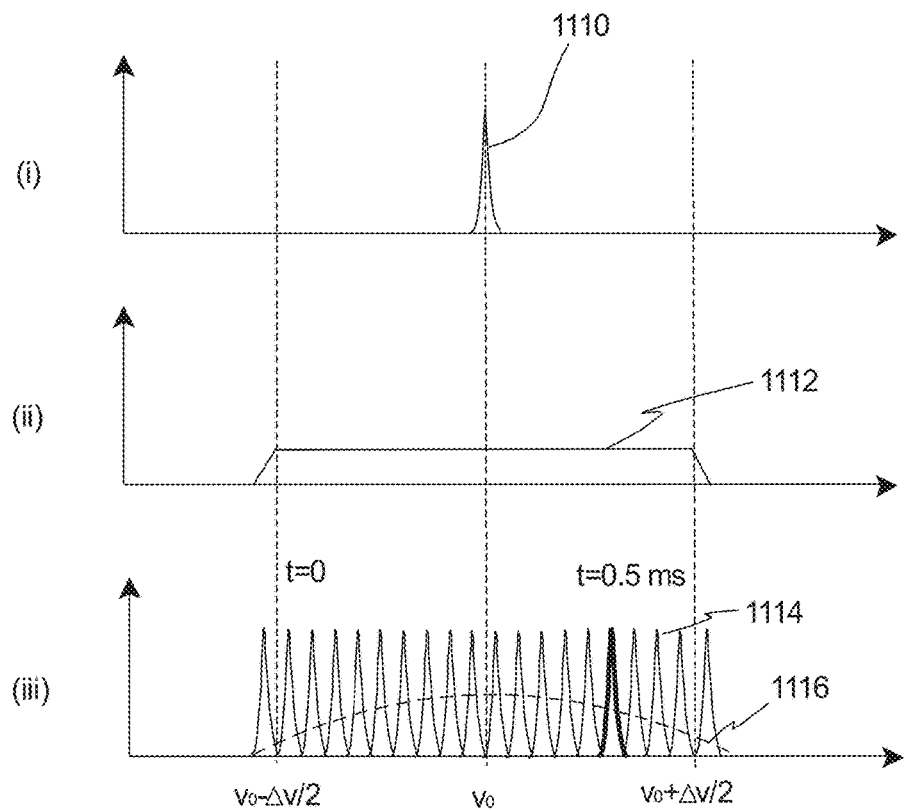
FIG. 11 includes an upper graph with an illustration of a narrow optical frequency distribution, a middle graph with an illustration of a very broad optical frequency distribution of an output beam, and a lower graph having a schematic illustration of a plurality of narrow optical frequency pulses of energy generated in a relatively short period of time and the dashed line showing the time-averaged optical frequency of the series of pulses.

FIG. 11 includes (i) an upper graph 1110 having a schematic illustration of a narrow optical frequency distribution (line with narrower than the interference that we are trying to ignore) of a typical laser output beam; (ii) a middle graph 1112 having a schematic illustration of a very broad optical frequency distribution of an output beam (an ideally broadened laser line to be approximate a top hat); and (iii) a lower graph 1114 having a schematic illustration of a plurality of narrow optical frequency pulses of energy generated in a relatively short period of time (a laser line whose center value is shifted over time in time to produce a desired time-averaged optical frequency distribution which fills the spectral band $\Delta v$). Thus, provided herein, the output of the laser source can be extrinsically broadened using dynamic optical frequency modulation of laser line (dithering the laser) to produce the desired, time-averaged optical frequency distribution 1116 (dashed line).

Thus, as provided herein, the modulation of the parasitic etalons can be filtered by fast optical frequency modulation of the laser source and real-time detector averaging. This has an effect of averaging out the parasitic etalons and improving the resulting image quality and spectral fidelity. This embodiment has a distinct advantage in live video discrete frequency imaging with coherent illumination since it is becomes unnecessary to acquire multiple frames at different optical frequencies and the implementation of digital signal processing to remove the noise. In many instances, the features of interest are broader than a narrow line width. Additionally, the parasitic etalons can be finer than the features of interest. Thus, it can be advantageous to average the unwanted spectral noise that manifests itself as a fringe pattern in the spatial domain by using a broad optical frequency (e.g. modulate optical frequency over time). This can be done with either a CW laser or a pulsed laser.

Figure 12A:
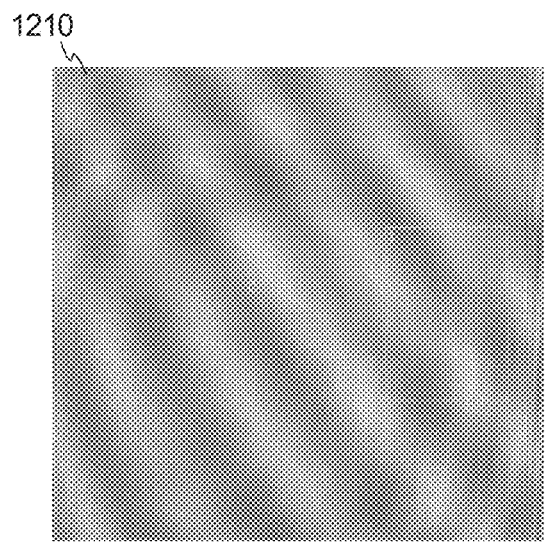
FIG. 12A is an image captured without noise reduction methods provided herein.

FIG. 12A is an image 1210 captured without noise reduction methods provided herein. It should be noted that this image 1210 includes a plurality of fringes that adversely influence the quality of the image 1210.

Figure 12B:
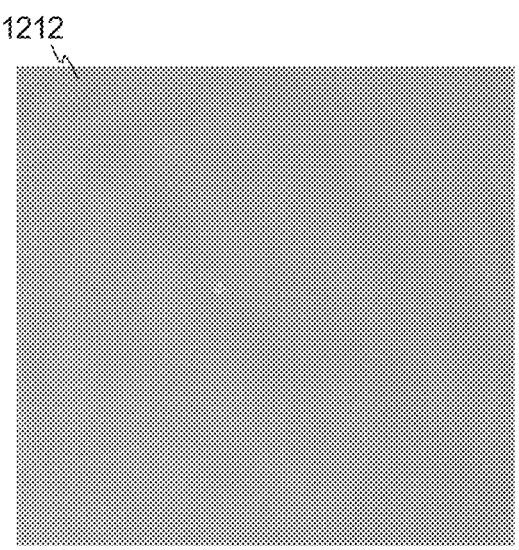
FIG. 12B is a captured image using the spectral image device provided herein.

FIG. 12B is a captured image 1212 using the spectral image device 12 provided herein. The image 1212 of FIG. 12B is less influenced by the fringes.

Figure 13:
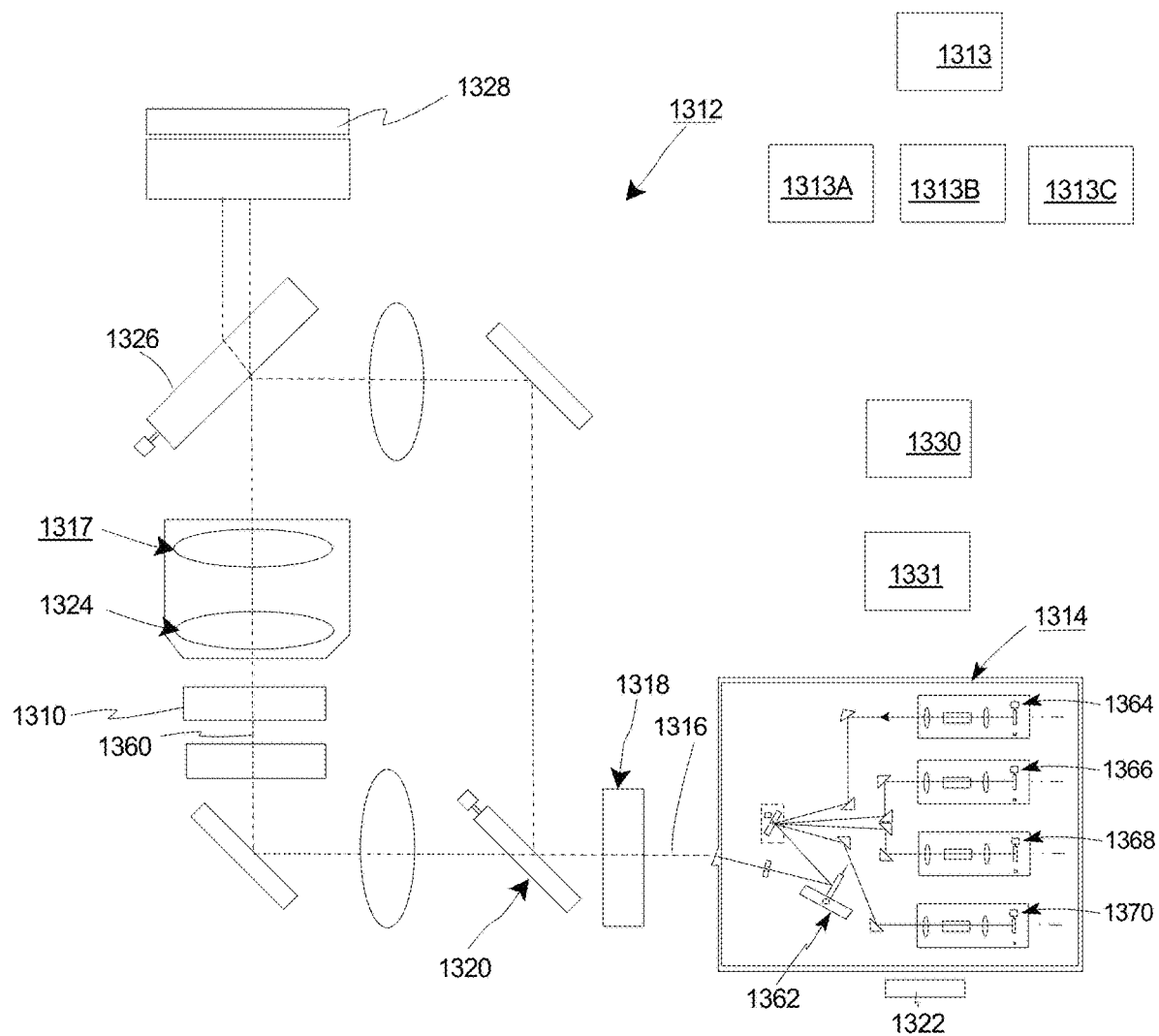
FIG. 13 is another simplified schematic illustration of a sample and another implementation of the spectral imaging device.

FIG. 13 is simplified schematic illustration of a sample 1310, and another implementation of the spectral imaging microscope 1312 for capturing a plurality of spectral images 1313A-1313C (only three are illustrated) of the sample 1310. In FIG. 13, the sample 1310 can be similar to the sample 10 describe above with reference to FIG. 1A, and the spectral imaging device 1312 is somewhat similar to the spectral imaging device 12 describe above with reference to FIG. 1A. With this design, the spectral imaging device 1312 can be used to quickly and accurately acquire the spectral cube 1313 (illustrated as a box) of the sample 1310 using the plurality of high resolution, two-dimensional, spectral images 1313A, 1313B, 1313C.

In the non-exclusive embodiment illustrated in FIG. 13, the spectral imaging microscope 1312 includes (i) an optical assembly 1317 with an illumination optical assembly 1318 and an objective lens assembly 1324; (ii) a element assembly 1320; (iii) an illumination switch 1322; (iv) a beam splitter 1326; (v) an image sensor 1328; (vi) a display 1331; and (vii) a control system 1330 that are similar to the corresponding components described above in reference to FIG. 1A. However, in FIG. 13, the spectral imaging microscope 1312 includes an illumination source 1314 that is different from the corresponding component described above, and the spectral imaging microscope additionally includes a beam path adjuster 1362. The spectral imaging microscope 1312 can be designed with more or fewer components than are illustrated in FIG. 13, and/or the components can be organized in a different fashion than illustrated in FIG. 13.

As provided herein, in real systems, various random and systematic noise sources may exist which can cause a diminished and/or undesired SNR. Examples of random noise sources include, but are not limited to, quantum (Shot) and thermal (Johnson) noise in the image sensor 1328, amplitude and frequency fluctuations of the illumination source 1314, and random fluctuations in the transmittance of components contained within the spectral imaging device 1312. Examples of systematic noise sources include, but are not limited to, the drift in illumination intensity, frequency, and the directional pointing of the source between trials.

An additional wavelength-dependent noise source in spectroscopic imaging systems can arise as a result from multiple reflections from surfaces and edges of the refractive elements within the spectral imaging device 1312. For spectral imaging devices 1312 which employ temporally coherent optical sources 1314 such as a laser or optically filtered broad band sources, the complex electric fields of the multiple reflected beams will add coherently to produce an optical frequency dependent transmittance as a result of constructive and destructive interference.

It should be noted that in the implementation of FIG. 13, a reduction in spurious spectral artifacts in the spectral images 1313A-1313C is achieved through fast movement (modulation) of an incident sample beam path 1360 of the illumination beam 1316 generated by the illumination source 1314 relative to the sample 1310 during each image capture time to randomize the spatial coherence pattern. Stated in another fashion, a reduction in noise can be achieved by rapidly moving (dithering) the illumination beam 1316 relative to the sample 1310, and slowly capturing the spectral images 1313A-1313C with the image sensor 1328 during the rapid movement of the illumination beam 1316. This intentional (deliberate) movement (adjustment) of the position of the illumination beam 1316 in the sample plane during the data capture time is independent and not tied to the wavenumber of the illumination beam 1316. Further, the fast movement of the illumination beam 1316 on the sample 1310 can result in a more uniform illumination of the sample 1310 during each image capture time. This can improve the quality of each spectral image 1313A-1313C.

The term "incident sample beam path" 1360 shall mean the central beam path of the illumination beam 1316 that is incident on the sample 1310. In FIG. 13, the illumination beam 1316 is incident on the sample 1310 at approximately ninety degrees. However, other angles of incidence are possible.

The rapid adjustment of the incident sample beam path 1360 can be used individually to reduce the spurious spectral artifacts. Alternatively, the rapid adjustment of the incident sample beam path 1360 can be used in conjunction with one or more of the other methods for reducing spurious spectral artifacts. As a non-exclusive example, the rapid adjustment of the incident sample beam path 1360 can be used in conjunction with the dithering of the optical frequency ("wavenumber") of the illumination beam 1316 (as described in reference to FIGS. 10A-10C) during the capture of each spectral images 1313A-1313C to further reduce the spurious spectral artifacts. As yet another, non-exclusive example, the rapid adjustment of the incident sample beam path 1360 can be used in conjunction with capturing a plurality of preliminary images and subsequently using the plurality of preliminary images to generate a corresponding spectral image (as described in reference to FIGS. 7A-7C). As still another, non-exclusive example, the rapid adjustment of the incident sample beam path 1360 can be used in conjunction with rapidly modulating one or more effective optical path segments of the beam path (as described in U.S. Pat. No. 10,365,158) during the data capture time for one or more of spectral images 1313A-1313C. As far as permitted, the contents of U.S. Pat. No. 10,365,158 are incorporated herein by reference.

In one non-exclusive implementation, the beam path adjuster 1362 is controlled by the control system 1330 to rapidly adjust the incident sample beam path 1360 of the illumination beam 1316 during the data capture time of one or more of the spectral images 1313A-1313C. Stated in another fashion, the beam path adjuster 1362 is controlled to selectively steer the pointing of the illumination beam 1316 on the sample 1310. In FIG. 13, the beam path adjuster 1362 is integrated into the tunable illumination source 1314. Alternatively, the beam path adjuster 1362 can be located at a different location in the spectral imaging device 1312.

As mentioned above, in FIG. 13, the tunable illumination source 1314 is different from the corresponding component described above in reference to FIG. 1A. For example, the tunable illumination source 1314 can include one or more laser modules. In FIG. 13, the illumination source 1314 includes four, spaced apart laser modules, namely a first laser module 1364, a second laser module 1366, a third laser module 1368, and a fourth laser module 1370. Alternatively, the laser source 1314 can be designed to include more than four or fewer than four laser modules.

In one implementation, during a first capture time of the image sensor 1328 for the first spectral image 1313A, (i) the illumination source 1314 is tuned to a first center wavelength ("first target wavelength" or "first target wavenumber"); and (ii) the beam path adjuster 1362 is controlled to modulate the incident sample beam path 1360. Subsequently, during a second data capture time of the image sensor 1328 for the second spectral image 1313B, (i) the illumination source 1314 is tuned to a second center wavelength ("second target wavelength" or "second target wavenumber") that is different from the first center wavelength; and (ii) the beam path adjuster 1362 is controlled to modulate the incident sample beam path 1360. Next, during a third data capture time of the image sensor 1328 for the third spectral image 1313C, (i) the illumination source 1314 is tuned to a third center wavelength ("third target wavelength" or "third target wavenumber") that is different from the first and second center wavelength; and (ii) the beam path adjuster 1362 is controlled to modulate the incident sample beam path 1360. This process can be repeated to for a plurality of data capture times, with different target wavelengths throughout a portion or the entire tunable range. The number of discrete target wavelengths in the tunable range can be varied according to the application. As non-exclusive examples, the number of discrete target wavelengths utilized can be approximately 1, 2, 3, 4, 5, 6, 7, 8, 9, 10, 15, 20, 25, 40, 200, 226, 400, 552 or 4000 within the tunable range.

For each target wavelength, the illumination beam 1316 can be pulsed. As non-exclusive examples, the number of pulses at each discrete target wavelength can be 1, 5, 10, 50, 100, 200, 500, 1000, 10000 or more.

Figure 14A:
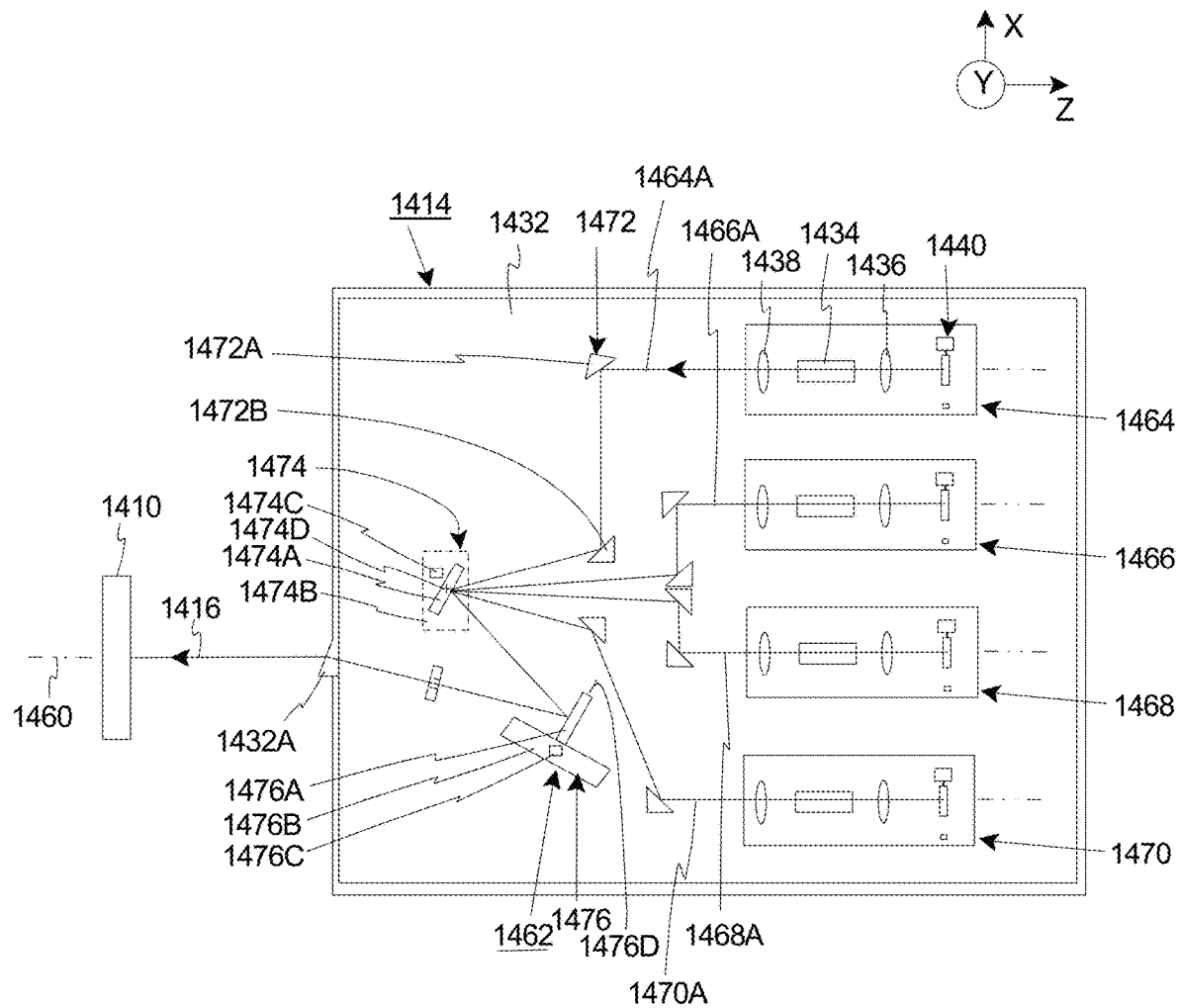
FIG. 14A is a simplified top schematic illustration of a sample, and an illumination source having features of the present invention.

FIG. 14A is a simplified top schematic illustration of a sample 1410, an illumination source 1414 and a beam path adjuster 1462 that can be used in the spectral imaging device 1312 of FIG. 13 or the other spectral imaging devices 12 disclosed herein. In this design, the beam path adjuster 1462 is a beam steerer assembly that is controlled to actively steer the illumination beam 1416 to rapidly adjust the incident sample beam path 1460 of the illumination beam 1416 on the sample 1410 during one or more data capture times, thereby actively changing the intensity of the illumination beam 1416 on different portions of the sample 1410 during one or more data capture times while the image sensor is accumulating the information for the images.

In one embodiment, the illumination source 1414 is designed to generate and be tuned so that the illumination beam 1416 has a center wavelength that is varied over time to span the entire or just a portion of the MIR range. In FIG.

14A, the illumination source 1414 includes a rigid frame 1432; a first laser module 1464; a second laser module 1466; a third laser module 1468, and a fourth laser module 1470.

In one embodiment, the frame 1432 can be designed to create a sealed chamber around the components within the frame 1432. In certain embodiments, the chamber can be filled with an inert gas, or another type of fluid, or subjected to vacuum. Additionally, in certain embodiments, the frame 1432 can include a window 1432A that allows the illumination beam 1416 to exit the frame 1432. In the non-exclusive embodiment illustrated in FIG. 14A, the window 1432A is a wedge-shaped element that redirects the illumination beam 1416.

In one, non-exclusive embodiment, each of the laser modules 1464, 1466, 1468, 1470 is somewhat similar in design, except for its respective spectral output. For example, each of the laser modules 1464, 1466, 1468, 1470 can be specifically designed to generate a different portion (or partly overlapping portion) of the predetermined wavelength range. Thus, the number of laser modules 1464, 1466, 1468, 1470 can be increased to increase the predetermined wavelength range, with each laser module 1464, 1466, 1468, 1470 generating a separate portion of the predetermined wavelength range.

As provided herein, in one embodiment, power can be sequentially directed to (i) the first laser module 1464 ("first channel") to generate a first beam 1464A that consists of a plurality of sequential first pulses of light that span a first range portion; (ii) the second laser module 1466 ("second channel") to generate a second beam 1466A that consists of a plurality of sequential second pulses of light that span a second range portion; (iii) the third laser module 1468 ("third channel") to generate a third beam 1468A that consists of a plurality of sequential third pulses of light that span a third range portion; and (iv) the fourth laser module 1470 ("fourth channel") to generate a fourth beam 1470A that consists of a plurality of sequential fourth pulses of light that span a fourth range portion. It should be noted that the order of firing of the laser modules 1464, 1466, 1468, 1470 can be any arrangement.

In one non-exclusive embodiment, each laser module 1464, 1466, 1468, 1470 is an external cavity, mid infrared laser that includes a gain medium 1434, a cavity optical assembly 1436, an output optical assembly 1438, and a wavelength selective ("WS") feedback assembly 1440 that are similar to the corresponding components described above. It should be noted that the gain medium 1434 for each laser module 1464, 1466, 1468, 1470 can be formed slightly different from each other so that the laser modules 1464, 1466, 1468, 1470 have different spectral output ranges.

As provided herein, in certain embodiments, for each laser module 1464, 1466, 1468, 1470, there is a corresponding director assembly 1472 that directs the beams at the beam path adjuster 1462. The director assembly 1472 for each laser module 1464, 1466, 1468, 1470 can include one or more adjustable, beam directors 1472A, 1472B (e.g., mirrors) that precisely direct the respective beam 1464A, 1466A, 1468A, 1470A at the beam path adjuster 1462. In FIG. 14A, the director assembly 1472 for each laser module 1464, 1466, 1468, 1470 includes an adjustable first beam director 1472A, and an adjustable second beam director 14728 that is spaced apart from the first beam director 1472A.

In one embodiment, each beam 1464A, 1466A, 1468A, 1470A is incident on the beam path adjuster 1462 at a different angle, at approximately the same location ("zero point"). With the present design, the director assembly 1472 of each laser module 1464, 1466, 1468, 1470 can be used to correct the direction, pitch and yaw of the respective beams 1464A, 1466A, 1468A, 1470A so that each beam 1464A, 1466A, 1468A, 1470A is directed at the zero point on the beam path adjuster 1462.

The beam path adjuster 1462 is controlled by the control system 1330 (illustrated in FIG. 13) to individually select which of the beams 1464A, 1466A, 1468A, 1470A becomes the illumination beam 1416. Further, the beam path adjuster 1462 is controlled by the control system 1330 to actively steer the illumination beam 1416 to actively control the incident sample beam path 1460 on the sample 1410. Stated in another fashion, the beam path adjuster 1462 can be actively controlled to rapidly adjust the incident sample beam path 1460 of the illumination beam 1416 on the sample 1410, thereby actively changing the intensity of the illumination beam 1416 on different portions of the sample 1410. With this design, the beam path adjuster 1462 can be controlled so that the illumination beam 1416 illuminates the sample 1410 more uniformly (e.g., uniformly distributes the illumination beam 1416 on the sample 1410) during each data capture time, and/or the beam path adjuster 1462 can be controlled to frustrate the unresolved coherent artifacts (e.g., minimize coherent artifacts) in the information collected during each data capture time. This will result in improved spectral images 1313A-1313C (illustrated in FIG. 13).

In one embodiment, the beam path adjuster 1462 can actively steer the illumination beam 1416 to actively move and dither the incident sample beam path 1460 during the capturing of each spectral image 1313A-1313C. The design of the beam path adjuster 1462 can be varied to achieve the design requirements of the assembly.

In non-exclusive implementation of FIG. 14A, the beam path adjuster 1462 is a beam steering assembly that includes a first path adjuster 1474 and a second path adjuster 1476 that is spaced apart from the first path adjuster 1474. The design of each path adjuster 1474, 1476 can be varied. In FIG. 14A, (i) the first path adjuster 1474 is a first beam steerer that includes a first reflector 1474A, a first mover 14748 that selectively moves (e.g. rotates) the first reflector 1474A, and a first position sensor 1474C (illustrated as a box) that monitors the position of the first reflector 1474A; and (ii) the second path adjuster 1476 is a second beam steerer that includes a second reflector 1476A, a second mover 1476B that selectively moves (e.g. rotates) the second reflector 1476A, and a second position sensor 1476C (illustrated as a box) that monitors the position of the second reflector 1476A. With this design, the control system 30 (i) controls the first mover 1474B to precisely position the first reflector 1474A using feedback from the first position sensor 1474C; and (ii) controls the second mover 1476B to precisely position the second reflector 1476A using feedback from the second position sensor 1476C.

Figure 14B:
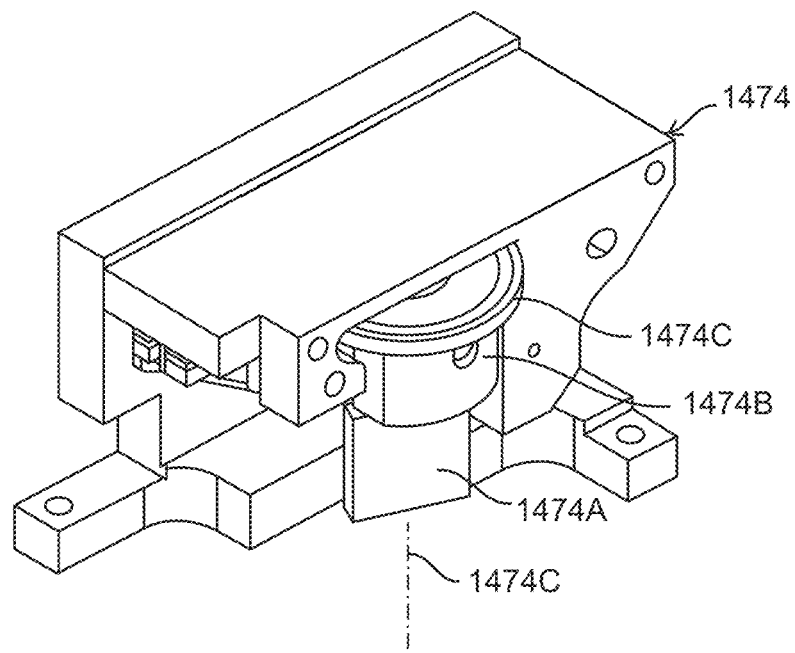
FIG. 14B is a perspective view of a first path adjuster.

FIG. 14B is a perspective view of the first path adjuster 1474 including the first reflector 1474A, the first mover 1474B, and the first position sensor 1474C. In this embodiment, (i) the first reflector 1474A is a flat, rectangular shaped mirror, (ii) the first mover 1474B is a voice coil motor that selectively rotates the first reflector 1474 about a first rotational axis 1474D, and (iii) the first position sensor 1474C is an encoder or Hall type sensor that provides the rotational position of the first reflector 1474A. Alternatively, each of these components can have a different design. For example, the first reflector 1474A can be a multifaceted polygonal mirror.

Figure 14C:
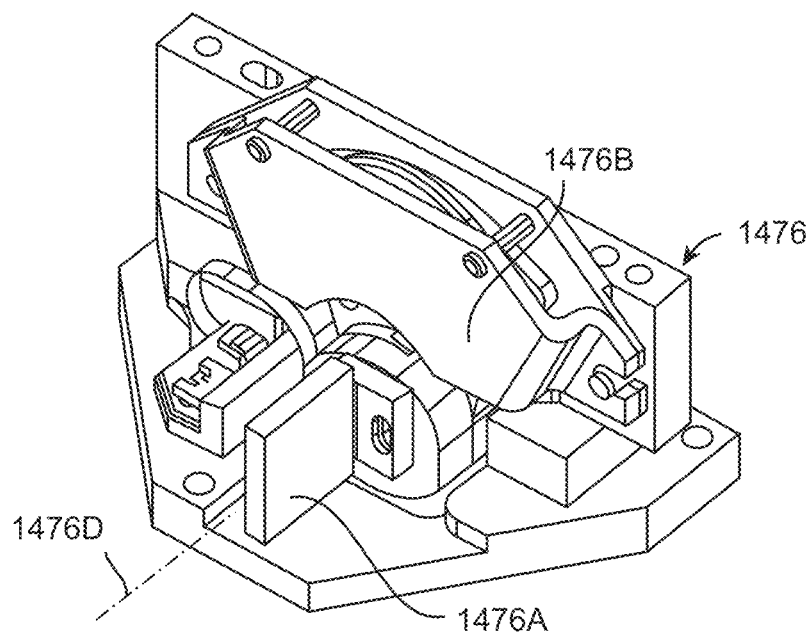
FIG. 14C is a perspective view of a second path adjuster.

Somewhat similarly, FIG. 14C is a perspective view of the second beam steerer 1476 including the second reflector 1476A, the second mover 1476B, and the second position sensor 1476C (not visible in FIG. 14C). In this embodiment, (i) the second reflector 1476A is a flat, rectangular shaped mirror, (ii) the second mover 1476B is a voice coil motor that selectively rotates the second reflector 1476A about a second rotational axis 1476D, and (iii) the second position sensor 1476C is an encoder or Hall type sensor that provides the rotational position of the second reflector 52A. Alternatively, each of these components can have a different design. For example, the second reflector 1476A can be a multifaceted polygonal mirror.

Referring back to FIG. 14A, the individual beams 1464A, 1466A, 1468A, 1470A are directed at the first path adjuster 1474 at different angles, and the first path adjuster 1474 is selectively positioned to select which of the beams 1464A, 1466A, 1468A, 1470A is directed at the second path adjuster 1476 to become the illumination beam 1416. With this design, the first mover 1474B can selectively position the first reflector 1474A at alternative rotational positions about the first rotational axis 1474D (illustrated as a plus sign in FIG. 14A because the first rotational axis is orthogonal to the page) to redirect (select) one of the beams 1464A, 1466A, 1468A, 1470A at the second path adjuster 1476.

With this design, the movement of the first reflector 1474A about the first rotational axis 1474D (a single axis movement) is used to select the beam 1464A, 1466A, 1468A, 1470A that forms the illumination beam 1416. In FIG. 14A, all of the beams 1464A, 1466A, 1468A, 1470A are illustrated as being directed at the beam path adjuster 1462 at once. This occurs when sufficient power is directed to all of the laser modules 1464, 1466, 1468, 1470 at the same time. Typically, however, sufficient power will be directed to only one laser module 1464, 1466, 1468, 1470 at any given time. With this example, only one of the beams 1464A, 1466A, 1468A, 1470A will be directed at the beam path adjuster 1462 at any given time.

Additionally, the path adjusters 1474, 1476 can be controlled to actively steer the illumination beam 1416 relative to the sample 1410. In FIG. 14A, the first path adjuster 1474 is controlled to steer the illumination beam 1416 in the horizontal plane, and the second path adjuster 1476 is controlled to steer the illumination beam 1416 in the vertical plane. Stated in another fashion, the first reflector 1474A is rotated about the first rotational axis 1474D and the second reflector 1476A is rotated about the second rotational axis 1476D to precisely steer the illumination beam 1416 along the desired beam path 1460 during the data capture (capture) times. In FIG. 14A, the first rotational axis 1474D is orthogonal to the second rotational axis 1476D. With this design, rotation of two reflectors 1474A, 1476A about separate axes 1474D, 1476D results in the ability to rapidly adjust (move) the incident sample beam path 1460.

It should be noted that (i) the first reflector 1474A can be moved within a small, first range of rotational positions and still direct the first beam 1464A at the second reflector 1476A to become the illumination beam 1416; (ii) the first reflector 1474A can be moved within a small, second range of rotational positions and still direct the second beam 1466A at the second reflector 1476A to become the illumination beam 1416; (iii) the first reflector 1474A can be moved within a small, third range of rotational positions and still direct the third beam 1468A at the second reflector 1476A to become the illumination beam 1416; and (iv) the first reflector 1474A can be moved within a small, fourth range of rotational positions and still direct the fourth laser beam 1470A at the second reflector 1476A to become the illumination beam 1416.

As a result thereof, (i) the first reflector 1474A can be moved within the first range of rotational positions to actively steer the first beam 1464A as the illumination beam 1416; (ii) the first reflector 1474A can be moved within the second range of rotational positions to actively steer the second beam 1466A as the illumination laser beam 1416; (iii) the first reflector 1474A can be moved within the third range of rotational positions to actively steer the third beam 1468A as the illumination laser beam 1416; and (iv) the first reflector 1474AA can be moved within the fourth range of rotational positions to actively steer the fourth laser beam 1470A as the illumination laser beam 1416.

Similarly, the second reflector 1476A can be moved within a small, span of rotational positions to actively steer the illumination laser beam 1416. Thus, the reflectors 1474A, 1476A can be individually rotated as necessary to provide active pointing (position modulation) of the illumination beam 1416. Stated in another fashion, the reflectors 1474A, 1476A can be individually rotated as necessary to provide modulation of the incident sample beam path 1460 during one or more of the data capture times.

Additionally, the beam path adjuster 1462 can be calibrated using a measurement device (e.g. a camera, not shown) during manufacturing. More specifically, with the illumination source 1414 activated, each laser module 1464, 1466, 1468, 1470 can be sequentially operated while monitoring the incident sample beam path 1460 of the illumination beam 1416. For each targeted wavelength, the reflectors 1474A, 1476A can be rotated as necessary to achieve the desired, modulated incident sample beam path 1460. With this design, the rotational position of each reflector 1474A, 1476A (measured by the position sensors 1474C, 1476C) necessary to achieve the desired incident sample beam path 1460 can be wavelength calibrated, and the control system 30 can position each reflector 1474A, 1476A as necessary to achieve the desired, modulated incident sample beam path 1460 during the image capture time.

Stated in another fashion, the illumination source 1414 can be steering calibrated by determining for each target wavelength the corresponding rotational positions of each reflector 1474A, 1476A necessary to achieve the desired, modulated incident sample beam path 1460. Each separate wavelength can have a corresponding set of first reflector 1474A positions and/or a corresponding set of second reflector 1476A positions. This information can be put into a lookup table. Subsequently, the control system 1330 can use this information from the lookup table to actively steer the illumination beam 1416 along the desired incident sample beam path 1460.

FIG. 15A is a simplified schematic of a sample 1510, and the illumination beam 1516a that is directed at the sample 1510 during a first time segment of the first capture time for the first spectral image 1313A (illustrated in FIG. 13). In this schematic, the sample 1510 is illustrated as a box having a sample center 1510a (illustrated with an "X"), and the illumination beam 1516a is illustrated as a dashed circle with a first incident beam center 1517a (also referred to as "first beam center position") that is represented with a dashed plus sign. At this time, the beam path adjuster 1462 (illustrated in FIG. 14A) had steered the illumination beam 1516a so that the first incident beam center 1517a is coaxial with the sample center 1510a. It should be noted that the first incident beam center 1517a represents the incident sample beam path at this particular time.

FIG. 15B is a simplified schematic of the sample 1510, and the illumination beam 1516b that is directed at the sample 1510 during a second time segment of the first capture time for the first spectral image 1313A (illustrated in FIG. 13). The second time segment is different from the first time segment. In this schematic, the illumination beam 1516b is illustrated as a dashed circle with a second incident beam center 1517b (also referred to as "second beam center position") that is represented with a dashed plus sign. At this time, the beam path adjuster 1462 (illustrated in FIG. 14A) had steered the illumination beam 1516b so that the second incident beam center 1517b is offset from the sample center 1510a and the first incident beam center 1517a. It should be noted that the second incident beam center 1517b represents the incident sample beam path at this particular time.

FIG. 15C is a simplified schematic of the sample 1510, and the illumination beam 1516c that is directed at the sample 1510 during a third time segment of the first capture time for the first spectral image 1313A (illustrated in FIG. 13). The third time segment is different from the first time segment and the second time segment. In this schematic, the illumination beam 1516c is illustrated as a dashed circle with a third incident beam center 1517c (also referred to as "third beam center position") that is represented with a dashed plus sign. At this time, the beam path adjuster 1462 (illustrated in FIG. 14A) had steered the illumination beam 1516c so that the third incident beam center 1517c is offset with the sample center 1510a, the first incident beam center 1517a, and the second incident beam center 1517b. It should be noted that the third incident beam center 1517c represents the incident sample beam path at this particular time.

FIG. 15D is a simplified schematic of the sample 1510, and the illumination beam 1516d that is directed at the sample 1510 during a fourth time segment of the first capture time for the first spectral image 1313A (illustrated in FIG. 13). The fourth time segment is different from the first time segment, the second time segment, and the third time segment. In this schematic, the illumination beam 1516d is illustrated as a dashed circle with a fourth incident beam center 1517d (also referred to as "fourth beam center position") that is represented with a dashed plus sign. At this time, the beam path adjuster 1462 (illustrated in FIG. 14A) had steered the illumination beam 1516d so that the fourth incident beam center 1517d is offset with the sample center 1510a, the first incident beam center 1517a, the second incident beam center 1517b, and the third incident beam center 1517c. It should be noted that the fourth incident beam center 1517d represents the incident sample beam path at this particular time.

Figure 15E:
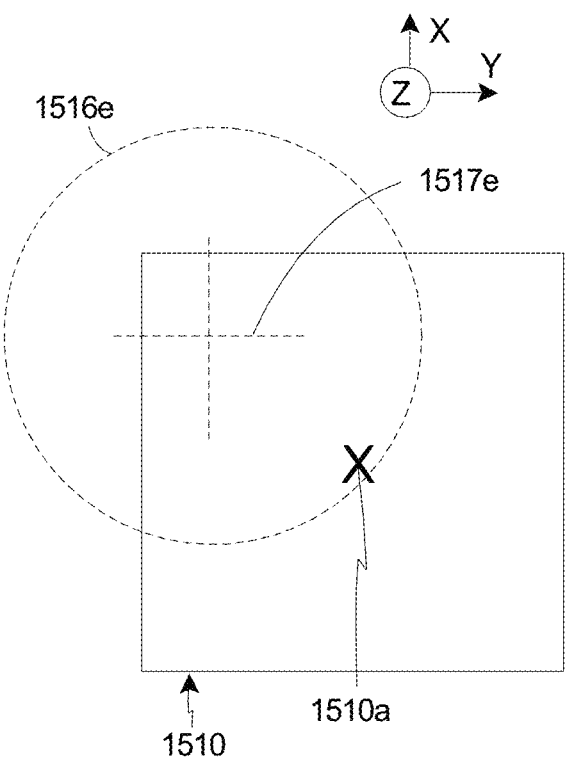

FIG. 15E is a simplified schematic of the sample 1510, and the illumination beam 1516e that is directed at the sample 1510 during a fifth time segment of the first capture time for the first spectral image 1313A (illustrated in FIG. 13). The fifth time segment is different from the first time segment, the second time segment, the third time segment, and the fourth time segment. In this schematic, the illumination beam 1516e is illustrated as a dashed circle with a fifth incident beam center 1517e (also referred to as "fifth beam center position") that is represented with a dashed plus sign. At this time, the beam path adjuster 1462 (illustrated in FIG. 14A) had steered the illumination beam 1516e so that the fifth incident beam center 1517e is offset with the sample center 1510a, the first incident beam center 1517a, the second incident beam center 1517b, the third incident beam center 1517c, and the fourth incident beam center 1517d. It should be noted that the fifth incident beam center 1517e represents the incident sample beam path at this particular time.

Figure 15F:
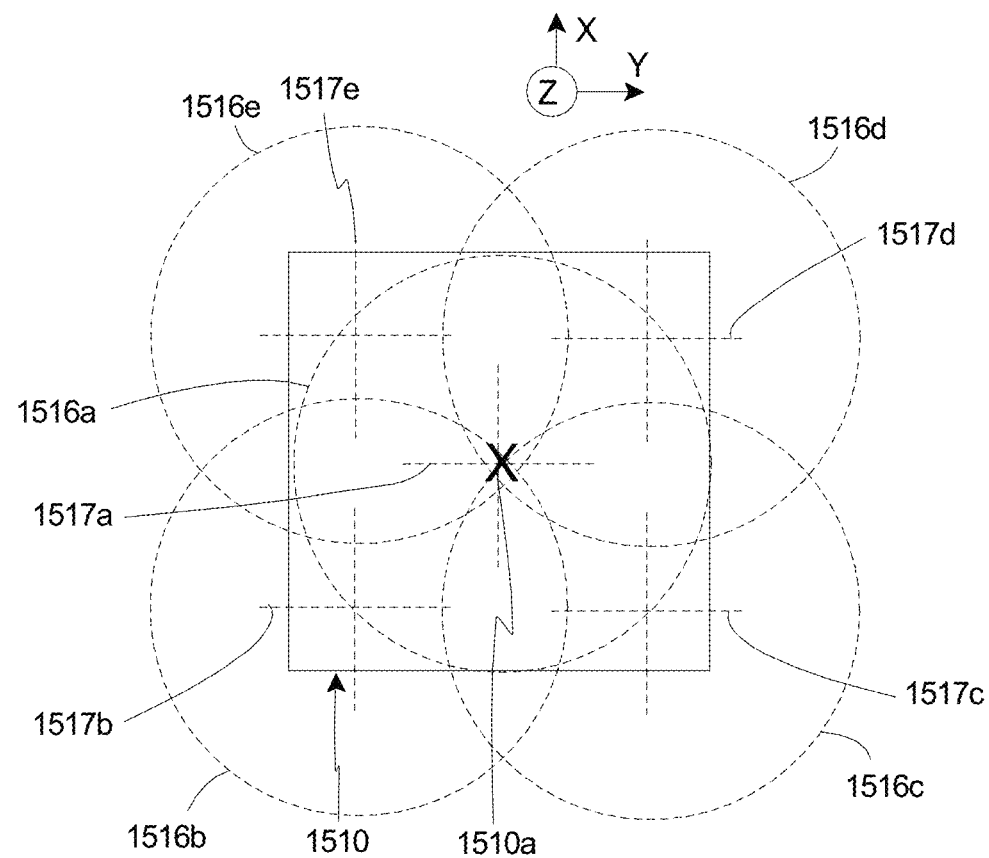
FIG. 15F is simplified schematic of the sample, and the illumination beam at different times during a capture time.

FIG. 15F is a simplified schematic of the sample 1510, and the illumination beam 1516a-1516e that is directed at the sample 1510 during the first-fifth time segments of the first capture time for the first spectral image 1313A (illustrated in FIG. 13). Basically, FIG. 15F is a compilation of FIG. 15A-15E that illustrates the illumination beam 1516a-1516e at different times during the data capture time relative to the sample 1510. As illustrated, the position of the incident beam center 1517a-1517f is varied over time relative to a sample plane of the sample 1510 during the data capture time because the beam path adjuster 1462 (illustrated in FIG. 14A) has steered the illumination beam 1516a-1516e as a function of time. Stated in another fashion, each incident beam center 1517a-1517f will have a different X and/or Y axis position as the illumination beam 1516a-1516e is dynamically moved by the beam path adjuster 1462 along the X axis and/or the Y axis relative to the sample 1510 during each data capture time.

With the present design, the control system 1330 (illustrated in FIG. 13) dynamically adjusts the beam path adjuster 1462 (illustrated in FIG. 14A) to vary the X axis and/or Y axis position of the illumination beam 1516a-1516e on the sample 1510 object as over time. It should be noted that each incident beam center 1517a-1517f represents a different incident sample beam path. Stated in another fashion, the control system 1330 dynamically adjusts the beam path adjuster 1462 to dynamically adjust the incident sample beam path (modulate the pointing position of the illumination beam) during one or more of the data capture times.

As provided herein, the control system 1330 (illustrated in FIG. 13) controls the beam path adjuster 1462 to selectively move an incident beam center 1517a-1517e relative to a sample plane of the sample 1510 during one or more of the data capture times. The amount of movement between incident beam centers 1517a-1517e can be varied and will depend upon the design characteristics of the spectral imaging device 1312 (illustrated in FIG. 13). In alternative, non-exclusive examples, the minimum amount of deviation between at least two of the incident beam centers 1517a-1517e is at least 1, 2, 3, 5, 10, 25, 50, 100, 250, 500, 650, 1000, 2000, or 5000 micrometers (um) during one or more of the data capture times. Stated in another fashion, in alternative, non-exclusive examples, the first beam center position is spaced apart from the second beam center position at least 1, 2, 3, 5, 10, 25, 50, 100, 250, 500, 650, 1000, 2000, or 5000 micrometers (um) during one or more of the data capture times. Stated in yet another fashion, in alternative, non-exclusive examples, the minimum amount of deviation between at least one of the incident beam centers 1517a-1517e and the sample center 1510a is at least 1, 2, 3, 5, 10, 25, 50, 100, 250, 500, 650, 1000, 2000 or 5000 micrometers (um) during one or more of the data capture times. In certain implementations, the upper possible movement limit is the size of the frame (image field of view) being captured. As a non-exclusive implementation, the field of view is between 100 and 200 micrometers.

It should be noted that FIG. 15F illustrates only five separate incident beam centers 1517a-1517e. However, the beam path adjuster 1462 can be controlled so that the illumination beam 1516a-1516e has more than five or fewer than five separate incident beam centers 1517a-1517e. As non-exclusive examples, the beam path adjuster 1362 can be controlled so the illumination beam 1516a-1516e has at least 2, 5, 10, 20, 50, 100, 200, 500, 750, or 1000 separate incident beam centers 1517a-1517e during each data capture time.

In one implementation, the illumination beam 1516a-1516e (and incident sample beam path) is constantly being moved (e.g., steered) during each data capture time. In this implementation, each discrete position of the incident beam centers 1517a-1517e represents the center position at a different, particular moment in time. Further, in this implementation, because the illumination beam 1516a-1516e is being constantly moved, the illumination beam 1516a-1516e is not being moved in discrete steps.

Alternatively, in another implementation, the illumination beam 1516a-1516e (and incident sample beam path) is being moved (e.g., steered) in a stepped fashion during each data capture time. In this implementation, each discrete position of the incident beam centers 1517a-1517e represents the center position at a different step and a different particular moment in time.

It should be noted that in certain implementations, the illumination source 1414 (illustrated in FIG. 14A) is controlled to generate light while the illumination beam 1516a-1516e is being moved (either continuously or in stepped fashion), including at each of the incident beam centers 1517a-1517e and therebetween. For example, the illumination source 1414 (illustrated in FIG. 14A) can be controlled to generate one or more pulses of light at each of the incident beam centers 1517a-1517e and each location therebetween.

Figure 15G:
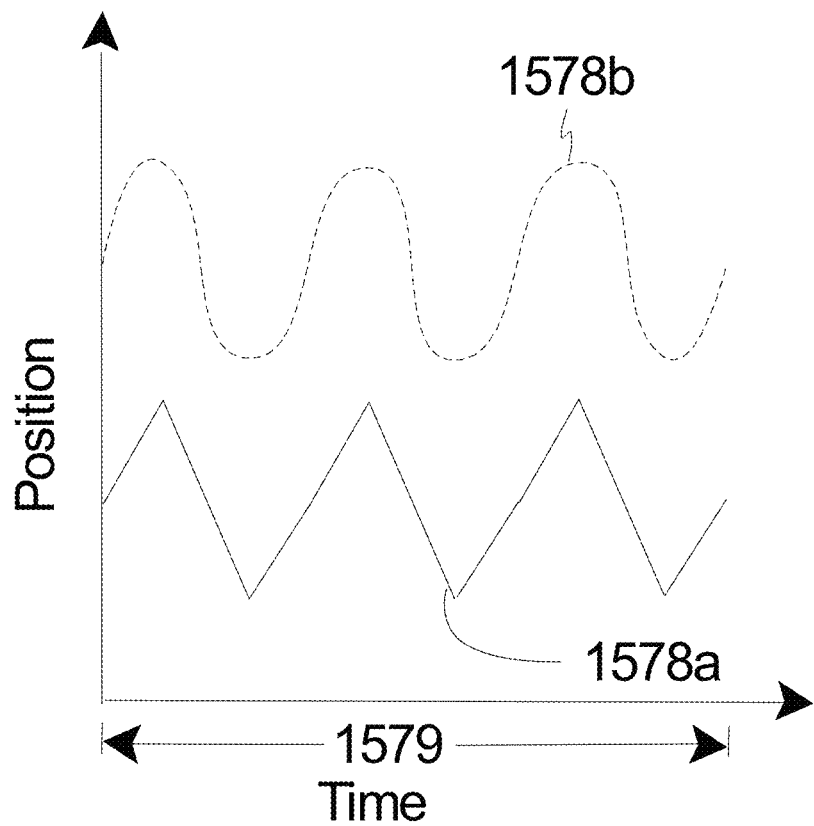
FIG. 15G is a graph that plots a position of the incident beam center of the illumination beam on the sample plane versus time during a capture time.

FIG. 15G is a graph that plots a position of the incident beam center of the illumination beam on the sample plane versus time during a first capture time 1579. In FIG. 15G, solid line 1578a represents the X axis position of the incident beam center on the sample plane, and dashed line 1578b represents the Y axis position of the incident beam center on the sample plane. In this example, the control system 1330 (illustrated in FIG. 13) controls the beam path adjuster 1362 (illustrated in FIG. 13) to vary the X axis and Y axis position of the incident beam center 1517a-1517e on the sample over time during each data capture time.

With reference to FIGS. 15F and 15G, it should noted that the control system 1330 can control the beam path adjuster 1362 so that the incident beam center 1517a-1517e is moved in a movement pattern during the first capture time 1579. As a non-exclusive example, the movement pattern of the illumination beam 1516a-1516e over time can sequentially include the first incident beam center 1517a, the second incident beam center 1517b, the third incident beam center 1517c, the fourth incident beam center 1517d, the fifth incident beam center 1517e, and back to the fourth incident beam center 1517d, to the third incident beam center 1517c, to the second incident beam center 1517b, and to the first incident beam center 1517a to complete one cycle during the data capture time. With this design, the beam path adjuster 1362 can be controlled so that the incident beam center dithers in the movement pattern that includes the first through fifth incident beam centers 1517a-1517e.

In one implementation, that the beam path adjuster 1362 can be controlled so that the illumination beam 1516a-1516e is moved in a substantially periodic movement pattern (trajectory or path) during each data capture time. In a specific, non-exclusive implementation, regardless of the trajectory of the beam path, the illumination beam 1516a-1516e always traces the same course and finishes where it began during one or more (e.g., each) data capture time. As a result thereof, the illumination beam 1516a-1516e is ready to trace the same movement pattern for one or more of the data capture times. In one, non-exclusive implementation, the periodic movement pattern is arbitrary.

Alternatively, for example, the beam path adjuster 1362 can be controlled so that (i) the illumination beam 1516a-1516e is moved in a first movement pattern (trajectory or path) during a first data capture time, and (ii) the illumination beam 1516a-1516e is moved in a second movement pattern (trajectory or path) during a second data capture time. The second movement pattern can be different from the first movement pattern. Further, additional, different movement patterns can be used for one or more of the subsequent data capture times.

It should be noted that this movement pattern can be repeat for at least two or more cycles each data capture time. As non-exclusive examples, the number of cycles of the movement pattern can be approximately 1, 2, 3, 4, 5, 10, 20, 40, 50, 100, or more cycles during each data capture time. In certain designs, the number of cycles can be more than ten during each data capture time.

Generally speaking, the quality of the spectral images will improve as the number of cycles per data capture time is increased. As provided herein, the additional cycles of the position of the illumination beam will have a low pass filtering effect on the image sensor 1328 (illustrated in FIG. 13) because the image sensor 1328 cannot respond fast enough to faithfully reproduce the amplitude noise arising from the modulating spatial interference pattern. Further, because the spectral imaging device 1312 does not have perfect wavelength dependent illumination position repeatability, the weighting of that error will be reduced as number of cycles is increases.

Figure 16:
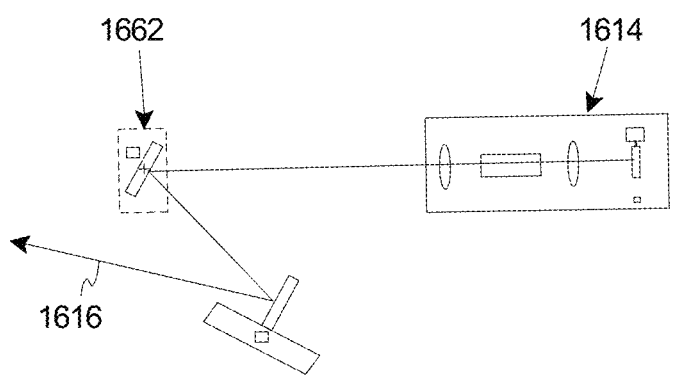
FIG. 16 is a simplified top schematic illustration another implementation of the illumination source and the beam path adjuster.

FIG. 16 is a simplified top schematic illustration another implementation of the illumination source 1614 and the beam path adjuster 1662 that can be used in the spectral imaging device 1312 of FIG. 13 or the other spectral imaging devices 12 disclosed herein. In this design, the illumination source 1614 is a single channel system, and the beam path adjuster 1662 is again a beam steerer assembly that is controlled to actively steer the illumination beam 1616. However, in FIG. 16, the beam path adjuster 1662 is positioned outside of the illumination source 1614.

It should be noted that in any of the implementations provided herein, that the beam path adjuster can include other methods for modulating the incident sample beam path, such as crystal modulators, mems devices, shake the lens, or diffuser plate(s).

Figure 17:
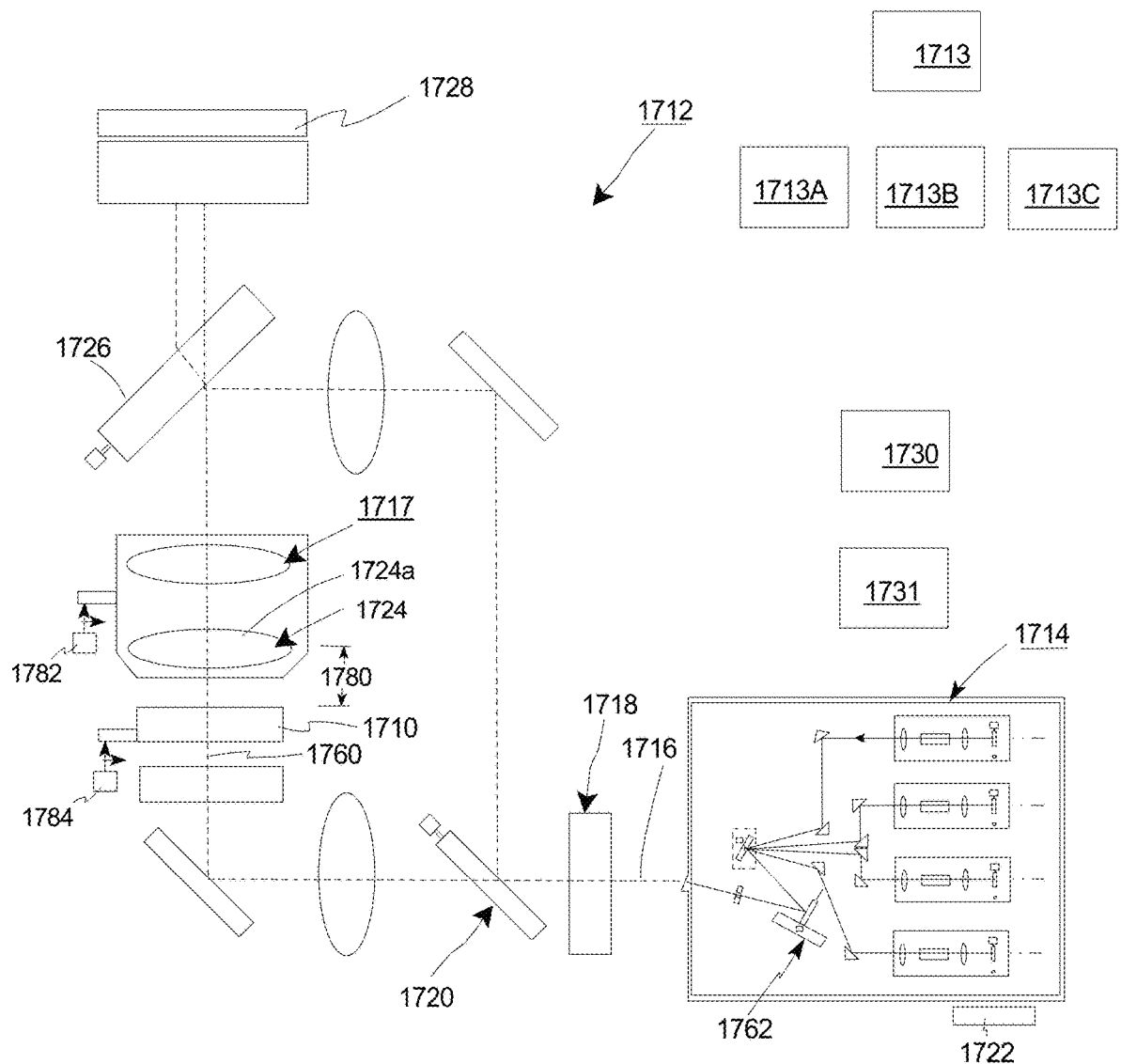
FIG. 17 is another simplified schematic illustration of a sample and yet another implementation of the spectral imaging device.

FIG. 17 is simplified schematic illustration of a sample 1710, and another implementation of the spectral imaging microscope 1712 for capturing a plurality of spectral images 1713A-1713C (only three are illustrated) for the spectral cube 1713. In FIG. 17, the sample 1710 can be similar to the sample 10 describe above with reference to FIG. 1A, and the spectral imaging device 1712 is somewhat similar to the spectral imaging device 1312 describe above with reference to FIG. 13. With this design, the spectral imaging device 1312 can be used to quickly and accurately acquire the spectral cube 1313 (illustrated as a box) of the sample 1310 using the plurality of high resolution, two-dimensional, spectral images 1313A, 1313B, 1313C.

In the non-exclusive embodiment illustrated in FIG. 17, the spectral imaging microscope 1712 includes (i) an optical assembly 1717 with an illumination optical assembly 1718 and an objective lens assembly 1724; (ii) a element assembly 1720; (iii) an illumination switch 1722; (iv) a beam splitter 1726; (v) an image sensor 1728; (vi) a display 1731; (vii) an illumination source 1714; (viii) a beam path adjuster 1762, and (ix) a control system 1730 that are similar to the corresponding components described above in reference to FIG. 13. However, in FIG. 17, the spectral imaging device 1712 is also designed to rapidly modulating one or more effective optical path segments 1780. The spectral imaging microscope 1712 can be designed with more or fewer components than are illustrated in FIG. 17, and/or the components can be organized in a different fashion than illustrated in FIG. 17.

It should be noted that in the implementation of FIG. 17, a reduction in spurious spectral artifacts in the spectral images 1713A-1713C is achieved through fast movement (modulation) of an incident sample beam path 1760 of the illumination beam 1716 in conjunction with rapidly modulating one or more effective optical path segments of the beam path during the data capture time for one or more of spectral images 1713A-1713C.

In one implementation, in FIG. 17, the spectral imaging device 1712 can include a mover assembly that selectively moves at least one of the sample 1710 and an optical element 1724A along the beam path to change the effective optical path segment 1780 by changing a separation distance between the sample 1710 and the optical element 1724A during the capturing of one or more of the images 1713A, 1713B, 1713C. Stated in another fashion, the present invention modulates one or more effective optical path segments 1780 during the data capture times to frustrate the standing waves by averaging out the noise caused by the standing waves.

The term "beam path" shall mean the central beam path of (i) the illumination beam 1716 as it travels from the illumination source 1714 to the sample 1710, and (ii) the collected light as it travels from the sample 1710 to the image sensor 1728.

Further, the rays of the illumination beam 1716 and the collected light that follow the beam path have a total effective optical path length. As provided herein, the term "total effective optical path length" shall mean the effective distance that any ray of light travels through each element in the beam path from the output of the gain medium of the illumination source 1714 to the image sensor 1728 during operation of the spectral imaging device 1712. The difference between the total physical length and the total effective optical path length is that the total effective optical path length takes into account the index of refraction of each of the elements along the beam path.

In the embodiment illustrated in FIG. 1, the total effective optical path length includes a plurality of effective optical path segments 1750 (only one is referenced in FIG. 17). The effective optical path segments 1750 of all of the elements along the beam path can be added together to determine the total effective optical path length.

In the non-exclusive implementation of FIG. 17, as alternative examples, (i) the first refractive element 1724a can be moved relative to the sample 1710 to modulate the effective optical path segment 1780 using an optical mover assembly 1782, (ii) the sample 1710 can be moved relative to the first refractive element 1724a to modulate the effective optical path segment 1780 using a sample stage mover assembly 1784, or (iii) both the first refractive element 1724a and the sample 1710 can be moved to modulate the effective optical path segment 1780. It should be noted that other methods for modulating one or more of the effective optical path segments is provided in U.S. Pat. No. 10,365,158.

Figure 18:
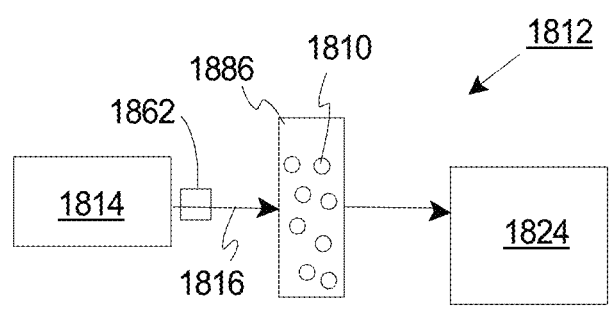
FIG. 18 is another simplified schematic illustration of a sample and still another implementation of the spectral imaging device.

FIG. 18 is simplified illustration of a substance sensor system 1270 that utilizes the assembly 1210 to analyze a substance 1272 e.g. an emitting gas. In this embodiment, the sensor system 1270 includes (i) the assembly 1210 similar to that disclosed herein that generates an laser beam 1212 that illuminates the area near the emitting gas 1272, and (ii) an imager 1274 (i.e. an infrared camera) that captures real-time, high resolution thermal images of the emitting gas 1272 that can be displayed or recorded for future viewing. As non-exclusive examples, the sensor system 1270 is useful for locating substances 1272 (i.e. leaks) in the oil, gas, utility, chemical industries, as well as locating emitting gas for homeland security. In one embodiment, the type of substance 1272 detectable by the sensor system 1270 can include any gas having molecules that absorb ("absorption features") in the MIR range.

FIG. 18 is simplified illustration of another embodiment of the spectral imaging device 1812 having features of the present invention. In this embodiment, the spectral imaging device 1812 is a spectrometer that includes (i) an illumination source 1814 (similar to those described above) that generates the illumination beam 1816, (ii) a flow cell 1886 that receives the sample 1810 (e.g. a liquid, gas or solid), (iii) a beam path adjuster 1862 (illustrated as a box), and (iv) an image sensor 1828. These components can be similar to corresponding components described above. In this embodiment, the illumination beam 1816 is directed through the flow cell 1886 while modulating the incident sample beam path, and the imager 1824 captures images of the light that is transmitted through the flow cell 1886. Alternatively, for example, the spectral imaging device 1813 can be a reflective system.

It is understood that although a number of different embodiments of a spectral imaging device 12 have been illustrated and described herein, one or more features of any one embodiment can be combined with one or more features of one or more of the other embodiments, provided that such combination satisfies the intent of the present invention.

While the particular spectral imaging device 12 as herein shown and disclosed in detail is fully capable of obtaining the objects and providing the advantages herein before stated, it is to be understood that it is merely illustrative of some of the presently preferred embodiments of the invention and that no limitations are intended to the details of construction or design herein shown other than as described in the appended claims.

What is claimed is:

1. A spectral imaging device for capturing one or more, two-dimensional, spectral images of a sample having a sample plane, including a first spectral image during a first capture time, the spectral imaging device comprising:
   an image sensor that includes a two-dimensional array of sensors that are adapted to capture information;
   an illumination source that generates an illumination beam that is directed along an incident sample beam path at the sample;
   a beam path adjuster that selectively adjusts the incident sample beam path; and
   a control system including a processor that (i) controls the illumination source to generate the illumination beam during the first capture time, (ii) controls the image sensor during the first capture time to capture first information for the first spectral image, and (iii) controls the beam path adjuster to selectively adjust the incident sample beam path relative to the sample, and selectively move an incident beam center of the illumination beam in a movement pattern relative to the sample plane during the first capture time while the image sensor is accumulating the information for the first spectral image; wherein the movement pattern is repeated at least one cycle during the first capture time.

2. The spectral imaging device of claim 1 wherein the control system controls the beam path adjuster to selectively move the incident beam center between a first beam center position on the sample, and a second beam center position on the sample during the first capture time, and wherein the first beam center position is spaced apart from the second beam center position at least one micrometer.

3. The spectral imaging device of claim 1 wherein the control system controls the beam path adjuster to selectively move the incident beam center between a first beam center position on the sample, and a second beam center position on the sample during the first capture time, and wherein the first beam center position is spaced apart from the second beam center position at least two micrometers.

4. The spectral imaging device of claim 1 wherein the control system controls the beam path adjuster to selectively move the incident beam center between a first beam center position on the sample, a second beam center position on the sample, and back to the first beam center position during the first capture time.

5. The spectral imaging device of claim 1 wherein the control system controls the beam path adjuster to selectively move the incident beam center of the illumination beam on the sample plane of the sample in a modulating fashion during the first capture time.

6. The spectral imaging device of claim 1 wherein the control system (i) controls the illumination source to generate the illumination beam during a second capture time, (ii) controls the image sensor during the second capture time to capture second information for a second spectral image, the second capture time being different from the first capture time, and (ii) controls the beam path adjuster to selectively adjust the incident sample beam path relative to the sample during the second capture time.

7. The spectral imaging device of claim 6 wherein the control system controls the illumination source so that the illumination beam has a first target wavenumber during the first capture time, and a second target wavenumber during the second capture time, and wherein the first target wavenumber is different from the second target wavenumber.

8. The spectral imaging device of claim 1 wherein the beam path adjuster includes a beam steering assembly that selectively steers the illumination beam, and wherein the control system controls the beam steering assembly to selectively adjust the incident sample beam path relative to the sample during the first capture time.

9. The spectral imaging device of claim 1 wherein the control system controls the tunable illumination source so that the illumination beam has a center wavenumber that is modulated at least one cycle from a first center wavenumber to a second center wavenumber, and back to the first center wavenumber during the first capture time; wherein a difference between the first center wavenumber and the second center wavenumber is at least one wavenumber.

10. The spectral imaging device of claim 1 wherein the control system (i) controls the image sensor to capture a first preliminary image while controlling the tunable illumination source so that the illumination beam has a first center wavenumber; (ii) controls the image sensor to capture a second preliminary image while controlling the tunable illumination source so that the illumination beam has a second center wavenumber that is different than the first center wavenumber; and (iii) generates the first spectral image using the first preliminary image and the second preliminary image.

11. The spectral imaging device of claim 1 further comprising an objective lens assembly that collects light from the sample and forms a two-dimensional spectral image of the sample on the image sensor; wherein the illumination beam and the collected light follow an overall beam path having an effective optical path segment; and wherein the effective optical path segment is adjusted during the first capture time.

12. A method for spectrally analyzing a sample having a sample plane, the method comprising:
generating an illumination beam having an incident beam center during a first capture time that is directed along an incident sample beam path at the sample with an illumination source;
capturing a two-dimensional array of first information with an image sensor during the first capture time; and
selectively moving the incident sample beam path and the incident beam center on the sample in a movement pattern relative to the sample plane with a beam path adjuster during the first capture time while the image sensor is accumulating the first information; wherein the movement pattern completes at least one cycle during the first capture time.

13. The method of claim 12 wherein selectively moving includes selectively moving the incident beam center between a first beam center position on the sample, and a second beam center position on the sample during the first capture time, and wherein the first beam center position is spaced apart from the second beam center position at least one micrometer.

14. The method of claim 12 wherein selectively moving includes selectively moving the incident beam center between a first beam center position on the sample, and a second beam center position on the sample during the first capture time, and wherein the first beam center position is spaced apart from the second beam center position at least two micrometers.

15. The method of claim 12 wherein selectively moving includes selectively moving the incident beam center between a first beam center position on the sample, a second beam center position on the sample, and back to the first beam center position during the first capture time.

16. The method of claim 12 wherein selectively moving includes selectively moving the incident beam center of the illumination beam relative to the sample plane of the sample in a modulating fashion during the first capture time.

17. The method of claim 12 wherein (i) generating an illumination beam includes generating the illumination beam a second capture time; (ii) capturing a two-dimensional array includes capturing second information with the image sensor during the second capture time; and (iii) selectively moving the incident sample beam path includes moving the incident sample beam path with the beam path adjuster during the second capture time while the image sensor is accumulating the second information.

18. The method of claim 17 wherein selectively moving the incident sample beam path includes moving the incident sample beam path along the movement pattern during the second capture time while the image sensor is accumulating the second information.

19. The method of claim 17 wherein generating an illumination beam includes controlling the illumination source so that the illumination beam has a first target wavenumber during the first capture time, and a second target wavenumber during the second capture time, and wherein the first target wavenumber is different from the second target wavenumber.

20. The method of claim 12 wherein selectively moving the incident sample beam path includes the beam path adjuster having a beam steering assembly that selectively steers the illumination beam to selectively adjust the incident sample beam path relative to the sample.

\* \* \* \* \*